United States Patent [19]
Haneda et al.

[11] Patent Number: 5,698,822
[45] Date of Patent: Dec. 16, 1997

[54] INPUT AND DISPLAY APPARATUS FOR HANDWRITTEN CHARACTERS

[75] Inventors: Isamu Haneda, Soraku-gun; Naoki Shiraishi, Shiki-gun; Toshihiro Takenaka, Yamatokooriyama; Satoru Miyamoto, Tenri; Eichika Matsuda, Yamatotakada; Yasushi Murasaki, Soraku-gun, all of Japan

[73] Assignee: Sharp Kabushiki Kaisha, Osaka, Japan

[21] Appl. No.: 440,709

[22] Filed: May 15, 1995

[30] Foreign Application Priority Data

May 16, 1994 [JP] Japan ...................... P6-126964

[51] Int. Cl.$^6$ .................. G08C 21/00; G09G 3/02; G06K 9/00; G06K 9/62
[52] U.S. Cl. .................. 178/18; 178/19; 345/173; 345/179; 382/187; 382/189
[58] Field of Search .................. 178/18, 19; 345/143, 345/156, 157, 173, 177, 179; 382/119, 187, 189

[56] References Cited

U.S. PATENT DOCUMENTS

| | | | |
|---|---|---|---|
| 5,347,589 | 9/1994 | Meeks | 178/18 |
| 5,365,598 | 11/1994 | Sklarew | 178/18 |
| 5,414,228 | 5/1995 | Yamashita | 178/19 |
| 5,426,711 | 6/1995 | Kitamura | 382/187 |
| 5,513,278 | 4/1996 | Hashizume | 345/143 |

FOREIGN PATENT DOCUMENTS

| | | |
|---|---|---|
| 62-229365 | 10/1987 | Japan . |
| 1114967 | 5/1989 | Japan . |
| 02077825 | 3/1990 | Japan . |

Primary Examiner—Curtis Kuntz
Assistant Examiner—Vijay Shankar

[57] ABSTRACT

An input/display apparatus for handwritten characters is capable of quickly inputting handwritten characters, freely editing characters inputted, and storing a lot of handwritten characters with a limited storing capacity. On a display panel provided with a display surface, the orthogonal coordinates of which are preset, a touch panel provided. An input surface of the touch panel, the orthogonal coordinates of which are preset, is disposed in such a way that the display surface and the input surface overlap each other. When the input surface is indicated with an input pen, the indicated coordinate point is outputted. At the time of handwriting input, when the input surface in the input/display area for characters is continuously indicated, coordinate points on the display surface corresponding to the plurality of indicated coordinate points are displayed. After the handwriting input is over, stroke data consisting of coordinate points extracted on the basis of predetermined references from among a plurality of coordinate points outputted from the touch panel at the time of handwriting input are prepared. The stroke data are displayed by being converted to a size corresponding to the width of the line set in the area after the display position of the cursor.

14 Claims, 48 Drawing Sheets

Fig. 8

| LIST | ∧ ∨ BLANK |
|---|---|
| 1994.2.12 | Today, by Shinkansen at 13:00 |
| 1994.2.12 | Tomorrow, at 10:00, with A company, |
| 1994.2.13 | Next time, the day to visit A company |
| 1994.2.14 | Functional comparison of product X |
| 1994.2.14 | Call up A company. |
| 1994.2.15 | Explain functions to Mr. X |

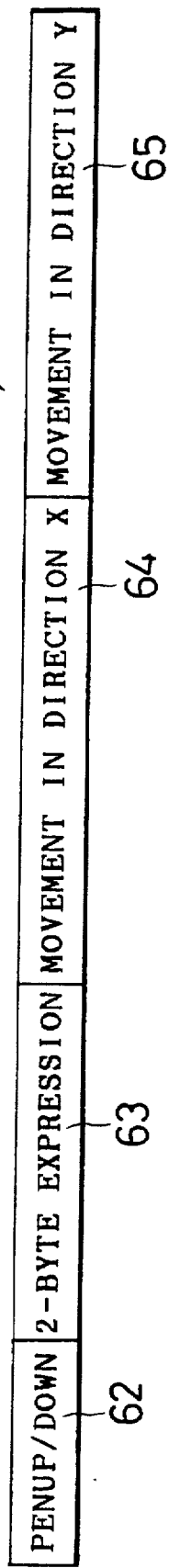
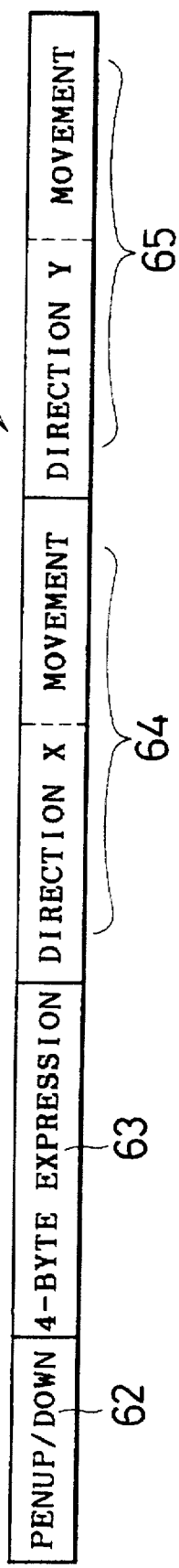
Fig.11A
Fig.11B

Fig.16

| | 62 | 63 | 64 | 65 |
|---|---|---|---|---|
| Q1 | PENUP | 2-BYTE | 00h | 00h |
| . | PENDOWN | 2-BYTE | 14h | 05h |
| . | PENDOWN | | 1Eh | 0Fh |
| . | PENUP | | -12h | 0Fh |
| | PENDOWN | | -05h | -0Ch |
| | PENDOWN | | -04h | -11h |
| | PENDOWN | | 01h | -1Ah |
| | PENDOWN | | 02h | -0Eh |
| | PENDOWN | | 09h | -0Eh |
| | PENUP | | 0Bh | 35h |
| | PENDOWN | | -21h | -37h |
| | PENDOWN | | -0Ah | 06h |
| | PENDOWN | | -03h | 0Ah |
| | PENDOWN | | 07h | 0Ch |
| | PENDOWN | | 08h | 06h |
| | PENDOWN | | 20h | 0Bh |
| . | PENDOWN | | 14h | -02h |
| . | PENDOWN | | 08h | -09h |
| . | PENDOWN | | 01h | -0Ch |
| Q20 | PENDOWN | 2-BYTE | -12h | -17h |

| | |
|---|---|
| DISPLAY INFORMATION IN 1ST LINE | 111a |
| DISPLAY INFORMATION IN 2ND LINE | 111b |
| DISPLAY INFORMATION IN 3RD LINE | 111c |
| | |
| DISPLAY INFORMATION IN LAST LINE | 111z |
| FFFFh | 112 |

| | |
|---|---|
| 3RD LINE DISPLAYED | 23a |
| 4TH LINE DISPLAYED | 23b |
| 5TH LINE DISPLAYED | 23c |
| 6TH LINE DISPLAYED | 23d |
| 7TH LINE DISPLAYED | 23e |
| 8TH LINE DISPLAYED | 23f |

INPUT AND DISPLAY APPARATUS FOR HANDWRITTEN CHARACTERS

BACKGROUND OF THE INVENTION

1. Field of the Invention

The present invention relates to an input and display apparatus (hereinafter described as input/display apparatus) for handwritten characters of electronic pocket notebooks, word processors, personal computers, etc.

2. Description of the Related Art

As input/display apparatuses of handwritten characters capable of input and display of handwritten characters are known in commercialized, for example, electronic pocket notebooks (PA-9500, PA-9700), new portable information tools (PV-F1, Pi-3000), a word processor (WD-850) of Sharp Corporation. In those conventional input/display apparatuses of handwritten characters, the characters entered on the input board, realized by a tablet or the like, are inputted in an input/display apparatus of handwritten characters as a set of coordinate pints on the input board. The handwritten characters inputted as a set of coordinate points are then registered and displayed in the size and shape as they are inputted.

Moreover, another input/display apparatus is disclosed in Japanese Unexamined Patent Publications JPA 1-114967 (1989) and 2-77825 (1990). The Japanese Unexamined Patent Publication JPA 1-114967 (1989) discloses that the input of handwritten characters is made in units of single character. The prior art of Japanese Unexamined Patent Publication JPA 2-77825 (1990) discloses that handwritten characters inputted as a set of coordinate points are arithmetically operated on the basis of prescribed conditions so that the intervals among the coordinate points become smaller, and as a result, the inputted characters are corrected so that the characters inputted in handwriting with a pen are reproduced more accurately.

With the prior art of commercialized electronic pocket notebooks or the like, since characters inputted in handwriting are registered and displayed in the size and shape as they are inputted, it is impossible to change the character size, etc. when editing the handwritten characters. In such a case incapable of changing the character size, etc., sufficient editing can not be achieved.

Moreover, with the prior art of Japanese Unexamined Patent Publication JPA 1-114967 (1989), a plurality of handwritten characters can not be inputted at a time, but only character by character. While it is necessary to quickly input characters when inputting a memo, etc., it takes much time for inputting because the input is made only character by character and this is inconvenient for practical use.

Furthermore, with the prior art of Japanese Unexamined Patent Publication JPA 2-77825 (1990), the number of coordinate points per character to be stored increases because the coordinate points constituting the handwritten characters inputted are subdivided. As the number of coordinate points to be stored increases, it becomes necessary to have a storing device of a large capacity as such as RAM (random access memory) for storing handwritten characters inputted, resulting in the increase in cost.

SUMMARY OF THE INVENTION

The object of the present invention is to provide an input/display apparatus for handwritten characters capable of quickly inputting handwritten characters, freely editing handwritten characters inputted and storing a lot of handwritten characters with a limited storing capacity.

The present invention provides an input/display apparatus for handwritten characters, including display means provided with a display surface in which orthogonal coordinates are defined, and input means having a light transmitting input surface in which orthogonal coordinates are defined, which outputs coordinate points indicated by special indicating means, on the input surface disposed so as to overlap with the display surface, and displaying the coordinate points on the display surface of the display means, corresponding to a plurality of coordinates points indicated at the time of input in handwriting when the input surface discontinuously indicate by the indicating means, the input/display apparatus for hand written characters comprising:

cursor display means for displaying a cursor indicating the position for input/display on the display surface of the display means, stroke data preparing means for preparing stroke data consisting of coordinate points which are extracted after the end of input in handwriting from among a plurality of coordinate points outputted from the input means at the time of input in handwriting on the basis of a predetermined reference, and normalization display means for displaying the stroke data on an orthogonal coordinates having predetermined dimensions which are defined in the area after the position of the cursor displayed on the display surface of the display means.

Moreover, the input/display apparatus is characterized by comprising storing means for storing a plurality of stroke data as a set of independent data.

Furthermore, the input/display apparatus is characterized in that the stroke data preparing means designates a plurality of coordinate points outputted from the input means as P0 to PN, respectively, in the order of output, of which the coordinate point P0 is extracted as a starting point, determines angles θ2 to θN contained by the line segment connecting the coordinate point PO and the coordinate point P1 and the line segment connecting the coordinate point P0 and each of the coordinate points P2–PN, extracts the coordinate point Pi when the angles θ2–θi (i>2) are equal to or less than the predetermined angle φ and the angle θ(i+1) is more than the angle φ, and repeats the same extraction of coordinate points as mentioned above with the extracted coordinate point Pi as a starting point.

Still more, the invention is characterized in that the stroke data preparing means changes the set value of the predetermined angle φ.

Moreover, the present invention is characterized in that a plurality of lines having a predetermined width are set on the display surface of the display means, that the cursor display means displays a cursor along the lines, and that the normalization display means displays the stroke data in the next line of a line on which the cursor is displayed in the case where the stroke data cannot be fully displayed in the area after the cursor position of the line on which the cursor is displayed.

Moreover, the invention is characterized in that a plurality of lines having a predetermined width are set on the display surface of the display means, that the cursor display means displays the cursor along the lines, and that the normalization display means displays the stroke data by contracting the length of the stroke data in the direction of the line in the case where the stroke data cannot be fully displayed in the area after the cursor position of the line on which the cursor is displayed.

Moreover, the invention is characterized in that a plurality of lines having a predetermined width are set on the display surface of the display means and that a ruled line is displayed between the respective lines.

Moreover, the invention is characterized in that the stroke data preparing means judges that the input in handwriting is over when the coordinate points from the input means are not detected for a predetermined time.

Moreover, the invention is characterized in that the stroke data preparing means judges that the input in handwriting is over when the coordinate points included in the predetermined area of the input surface of the input means are detected.

Moreover, the invention is characterized in that the stroke data preparing means judges that the input in handwriting is over when the two coordinate points continuously outputted from the input means have a length equal to or more than a predetermined length.

Moreover, the invention is characterized in that the normalization display means changes the dimensions of the orthogonal coordinates set after the position of the cursor displayed on the display surface of the display means.

Moreover, the invention is characterized in that the normalization display means displays stroke data by moving the stroke data to a position on the display surface corresponding to a coordinate point on the input surface indicated by the indicating means.

Moreover, the invention is characterized in that the normalization display means erases the displayed stroke data including the coordinate point on the display surface corresponding to the coordinate point on the input surface indicated by the indicating means and displays the stroke data before and after the erased data by contracting the intervals of the stroke data before and after the erased stroke data.

Moreover, the present invention is characterized in that the normalization display means erases the displayed stroke data including the coordinate point on the display surface corresponding to the coordinate point on the input surface indicated by the indicating means and leaves in blank the area where the stroke data was displayed before.

According to the invention, the display means and the input means are provided with a display surface and an input surface, respectively, in which orthogonal coordinates are defined in advance, and the input surface of the input means is light transmitting and is disposed so as to overlap with the display surface of the display means. If the input surface with predetermined indicating means is indicated, the indicated coordinate point on the input surface is outputted. During input in handwriting when the input surface is continuously indicated with the indicating means, the coordinate point on the display surface of the display means which agrees with the indicated plural number of coordinate points is displayed. After the input in handwriting is over, stroke data consisting of coordinate points extracted on the basis of predetermined references from among the plural number of coordinate points outputted from the input means at the time of input in handwriting is prepared. This stroke data is displayed on the orthogonal coordinates of prescribed size set after the cursor position displayed on the display surface of the display means. Preferably a plurality of stroke data are stored as independent data.

As explained above, in the present invention, the prepared stroke data is displayed on the orthogonal coordinates of prescribed dimensions set after the cursor position displayed on the display surface of the display means. By selecting the dimensions of the orthogonal coordinates, the size of the characters to be displayed can be selected. Therefore, the characters inputted in handwriting can be displayed in the desired size and their editing also becomes easy. Since the stroke data is prepared not in units of single character but after the end of input in handwriting, a plurality of characters can be inputted continuously. The data volume can be reduced because the stroke data consists of coordinate points extracted on the basis of predetermined references from a plurality of coordinate points outputted from the input means. Consequently, it becomes possible to store a larger volume of handwritten characters compared with a case where no extraction of coordinate points is made or a case when the coordinate points are subdivided as with the prior art. Moreover, the manufacturing cost can be reduced because there is no need of any storing means of a large storing capacity.

Moreover, according to the present invention, the stroke data is prepared as follows. Namely, a plurality of coordinate points outputted from the input means are designated as P0 to PN respectively in the order of output and P0 is extracted as starting point. Next, the angle $\theta 2$ to $\theta N$ formed by the line segment connecting P0 and P1 and the line segment connecting P0 and P2 to PN are determined respectively, and Pi is extracted when $\theta 2$ to $\theta i$ (i>2) is no larger than the predetermined angle $\phi$ and that $\theta$ (i+1) is larger than the angle $\phi$. The coordinate points are extracted in the same as above with the extracted Pi as starting point.

Moreover, according to the present invention, the angle $\phi$ can be changed and this makes it possible to select the number of coordinate points to be extracted and control the data volume.

Moreover, according to the present invention, a plurality of lines of a predetermined width are set on the display surface, and the cursor is displayed along the lines. The stroke data is displayed in the area after the cursor position of the line on which the cursor is displayed but in the next line in the case where the stroke data cannot be fully displayed in that line. In addition, the stroke data is displayed in the area after the cursor position of the line on which the cursor is displayed but displayed by being contracted in length in the direction of line in the case where the stroke data cannot be fully displayed in that line. Therefore, the stroke data is displayed in a way to be given in a single line. This makes the handwritten characters easy to read and facilitates editing.

Moreover, according to the present invention, ruled lines are displayed between the lines set on the display surface. Therefore, the operator can easily know the size of the characters displayed after being submitted to normalization. It also becomes possible to input handwritten characters without distortion by using the ruled lines as reference lines, and this facilitates preparation of stroke data and improves the visibility of the prepared stroke data on display.

Moreover, according to the present invention, the stroke data preparing means judges that the input in handwriting is over when the coordinate points from the input means are not detected for a predetermined time. Therefore, the stroke data can be prepared even without instruction by the operator. By changing the set value of the time for judging the end of input in handwriting, it becomes possible to set the optimal operating conditions for the operator.

Moreover, the input in handwriting is judged as over when the coordinate points included in the predetermined area on the input surface of the input means are detected. Therefore, it is possible to prepare stroke data based on the operator's instruction.

Moreover, the input in handwriting is judged as over when the coordinate points of the input means are of a length larger than the predetermined length. That is a case where the input in handwriting has been made ranging over a plurality of lines. In the case where the input in handwriting has been made ranging over a plurality of lines during input in handwriting, the stroke data is prepared by considering a plurality of lines as a single line, spoiling the visibility of the data when it is displayed on the display means. By judging that the input in handwriting is over when the coordinate points of the input means are of a length larger than the predetermined length, it becomes possible to turn the characters inputted in handwriting into stroke data in units of a line and avoid spoiling the visibility of the data when it is displayed.

Moreover, according to the present invention, it is possible to display the stroke data by moving it to a position on the display surface corresponding to the coordinate point on the input surface indicated by the indicating means.

Moreover, according to the present invention, it is possible to erase stroke data displayed including the coordinate point on the input surface corresponding to the coordinate point on the input surface indicated by the indicating means and display that data by contracting the interval of the stroke data before and after the erased stroke data.

Moreover, according to the present invention, it is possible to erase stroke data displayed including the coordinate point on the input surface corresponding to the coordinate point on the input surface indicated by the indicating means and leave in blank the area where the stroke data was displayed before.

According to the present invention, stroke data consisting of coordinate points extracted on the basis of predetermined references from a plurality of coordinate points outputted from the input means is prepared after the end of input in handwriting, and this stroke data is displayed on the orthogonal coordinates of prescribed size to be set after the cursor position indicated on the display surface of the display means. Moreover, a plurality of stroke data is stored as independent data.

Therefore, the characters displayed with prepared stroke data can be displayed in the desired size and this makes the handwritten characters easy to read and also facilitates editing. Since the stroke data is prepared not in units of single character but after the end of input in handwriting, a plurality of characters can be inputted continuously. The data volume can be reduced because the stroke data consists of coordinate points extracted on the basis of predetermined references from a plurality of coordinate points outputted from the input means. Consequently, it becomes possible to store a comparatively large volume of handwritten characters. Moreover, the manufacturing cost can be reduced because there is no need of any storing means of a large storing capacity.

Moreover, according to the present invention, it is possible to control the data volume by selecting the number of coordinate points to be extracted by changing the set value at the time of preparation of the stroke data.

Moreover, according to the present invention, a plural number of lines of a predetermined width are set on the display surface and the cursor is displayed along the lines. The stroke data is displayed in the area after the cursor position of the line on which the cursor is displayed but in the next line in the case where the stroke data cannot be fully displayed in that line. Further, the stroke data is displayed in the area after the cursor position of the line on which the cursor is displayed but displayed by contracting the length of the stroke data in the direction of line in the case where the stroke data cannot be fully displayed in that line. This makes the characters inputted in handwriting easy to read and facilitates editing.

Moreover, according to the present invention, ruled lines are displayed between the lines set on the display surface. Therefore, the operator can easily know the size of the characters displayed after being submitted to normalization. It also becomes possible to input handwritten characters without distortion by using the ruled lines as reference lines, and this facilitates preparation of stroke data and improves the visibility of the prepared stroke data on display.

Moreover, according to the present invention, the input in handwriting is judged as over and stroke data is prepared when the coordinate points from the input means are not detected for a predetermined time. Therefore, the stroke data can be prepared even without instruction by the operator. By changing the set value of the time for judging the end of input in handwriting, it becomes possible to set the optimal operating conditions for the operator.

Moreover, the input in handwriting is judged as over when the coordinate points included in the predetermined area on the input surface of the input means are detected. Therefore, it is possible to prepare stroke data based on the operator's instruction.

Moreover, the input in handwriting is judged as over when the coordinate points of the input means are of a length larger than the predetermined length. Therefore, it becomes possible to turn characters inputted in handwriting into stroke data in units of line without spoiling their visibility on the display.

Moreover, according to the present invention, it is possible to display stroke data by moving it to a desired position. It is also possible to erase stroke data and display that data by contracting the, interval of the stroke data before and after the erased stroke data. It is further possible to erase stroke data and leave in blank the area where the stroke data was displayed before.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

Other and further objects, features, and advantages of the invention will be more explicit from the following detailed description taken with reference to the drawings wherein:

FIG. 8 is a plan view showing a list image 45 displayed when a list displaying button 28 in a menu button 19 is indicated;

FIGS. 11A, 11B are drawings showing the structure of stroke data 61;

FIG. 16 is a data showing the structure of stroke data 68 corresponding to the character indicated in FIG. 13C;

FIG. 52 is a drawing showing the data construction of display information 111 of the independent data stored in the memory area inside a memory 7 for display;

FIG. 53 is a drawing showing the state in which the independent data is displayed in the character input/display area 20;

DETAILED DESCRIPTION OF THE PREFERRED EMBODIMENT

Figure 1:
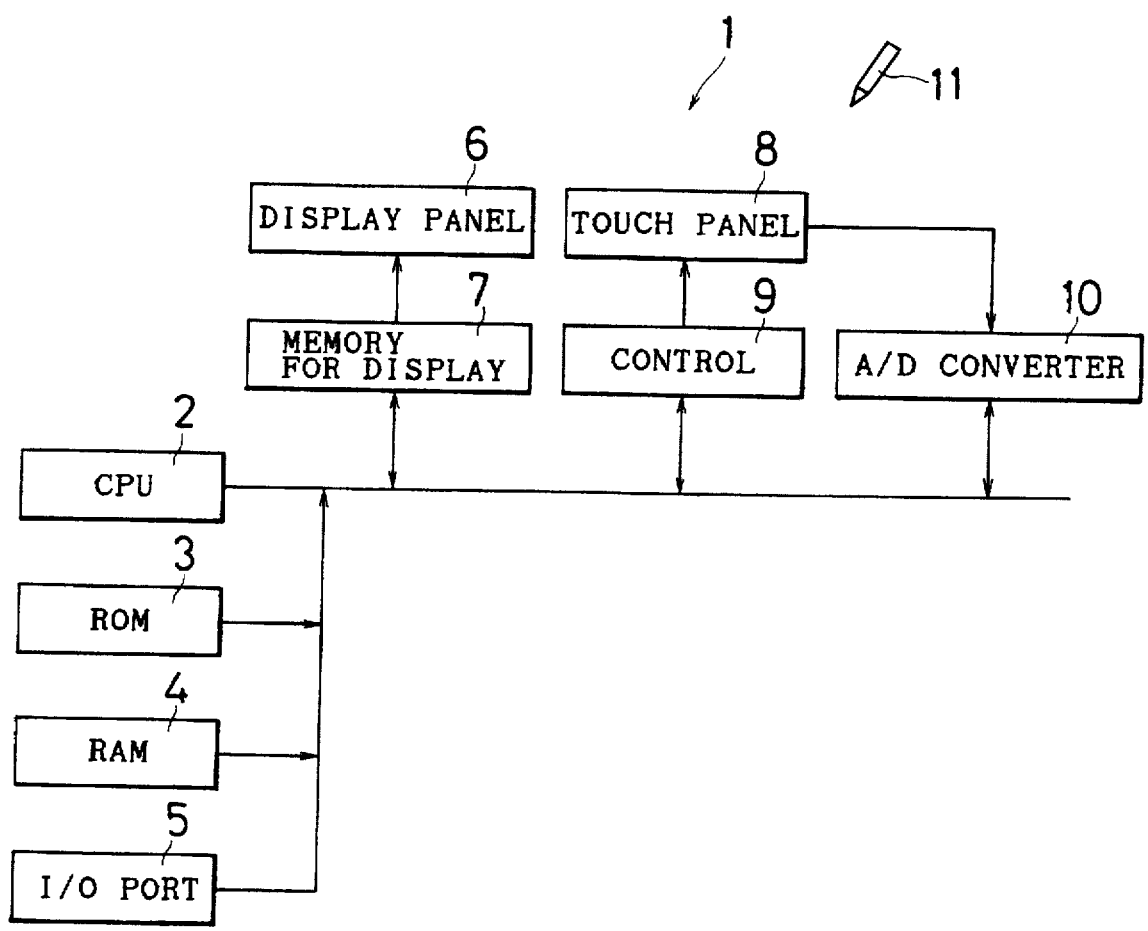
FIG. 1 is a block diagram showing the electric structure of an input/display apparatus for handwritten characters of an embodiment of the present invention.

Now referring to the drawings, preferred embodiments of the invention are described below.

FIG. 1 is a block diagram showing the electric structure of the input/display apparatus 1 for handwritten characters which is an embodiment of the present invention. The input/display apparatus 1 for handwritten characters is constructed by including a central processing unit (hereinafter referred to as "CPU") 2, a read only memory (hereinafter referred to as "ROM") 3, a random access memory (hereinafter referred to as "RAM") 4, an I/O (input/output) port 5, a display panel 6, a memory 7 for display, a touch panel 8, a control circuit 9, an A/D (analog/digital) converter 10 and an input pen 11.

The CPU 2 controls the motion of the input/display apparatus 1 for handwritten characters according to the program written in the ROM 3. In the ROM 3, a readout program of input position, a data storing/readout program for processing into stroke data to be described later and program for normalization, for example, are stored in advance. The RAM 4 is a memory accessible for both reading and writing and is used as a work area for internal processing of the CPU 2, data storing memory, etc. The I/O port 5 is used as a communication port.

In the memory 7 for display, data to be displayed on the display panel 6 realized, for example, with a liquid crystal display element is written. The control circuit 9 controls the voltage to be applied to the touch panel 8 stacked on the display panel 6. As the touch panel 8, for example, a panel of a transparent resistance film type is selected and the prescribed voltage is applied respectively in the X-axis direction and in the Y-axis direction of the orthogonal coordinates set in advance on the input surface so as to output analog coordinate signals representing the coordinate point indicated with the input pen 11, which is the predetermined indicating means, for example. The A/D converter 10 converts the analog coordinate signals into digital signals available for processing by the CPU 2.

Unless otherwise specified, the inputting motion made by the operator in this embodiment is performed by indicating the input surface of the touch panel 8 with the input pen 11. The light transmitting touch panel 8 of a resistance film type having translucency is constructed by forming resistance films realized with ITO (indium tin oxide) on a pair of flexible and translucent printed circuit boards or the like and disposing the resistance films in a way to oppose each other at a certain distance from each other. To the resistance film on one side, the prescribed voltage is applied. This applied voltage varies continuously from the input terminal side to the output terminal side. The resistance film on the other side, which is not grounded, is used for detection of voltage.

When the touch panel 8 is touched with the input pen 11, the resistance films at the touched position get in contact with each other and voltage is detected from the side of the other resistance film. Putting the direction of input and output terminals of the resistance film on one side as, for example, the x-axis direction on the orthogonal coordinates, this voltage becomes a value expressing the coordinate point in the X-axis direction. In the same way, when a prescribed voltage is applied in the Y-axis direction orthogonal to the X-axis direction on the orthogonal coordinates and a voltage is detected from the side of the resistance film on one side, the coordinate point inputted with pen in the Y-axis direction can be obtained.

By switching those motions at the prescribed timing, the coordinate point by pen input is detected as required. In the coordinates set on the input surface of the touch panel 8, the left top on the input surface is taken as the reference point and an X-axis is set in the right direction while a Y-axis is set in the downward direction. In this embodiment, explanation is given of the example of the touch panel 8 of a resistance film type. However, the touch panel 8 is not limited to a resistance film type and it can also be of either an electromagnetic induction type or a static induction type.

On the display surface of the display panel 6, orthogonal coordinates are set in advance. When some pen input has been made in the input/display area 20 for characters on the screen to be described below, a plurality of coordinates points agreeing with the plurality of coordinates points sampled with pen input of the touch panel 8 are selected and displayed first. Next, the plurality of sampled coordinates points of the touch panel 8 are changed into image data and the stroke data obtained by submitting those image data to processing for turning into stroke data are normalized and displayed in the prescribed size at the prescribed display position of the display panel 6. At that time, the display of the display panel 6 agreeing with the sampled coordinates points is erased. Moreover, when some pen input has been made in the display position somewhere other than the input/display area for characters, for example, in the display position of various buttons, operations corresponding to the indicated key are executed.

Figure 2:
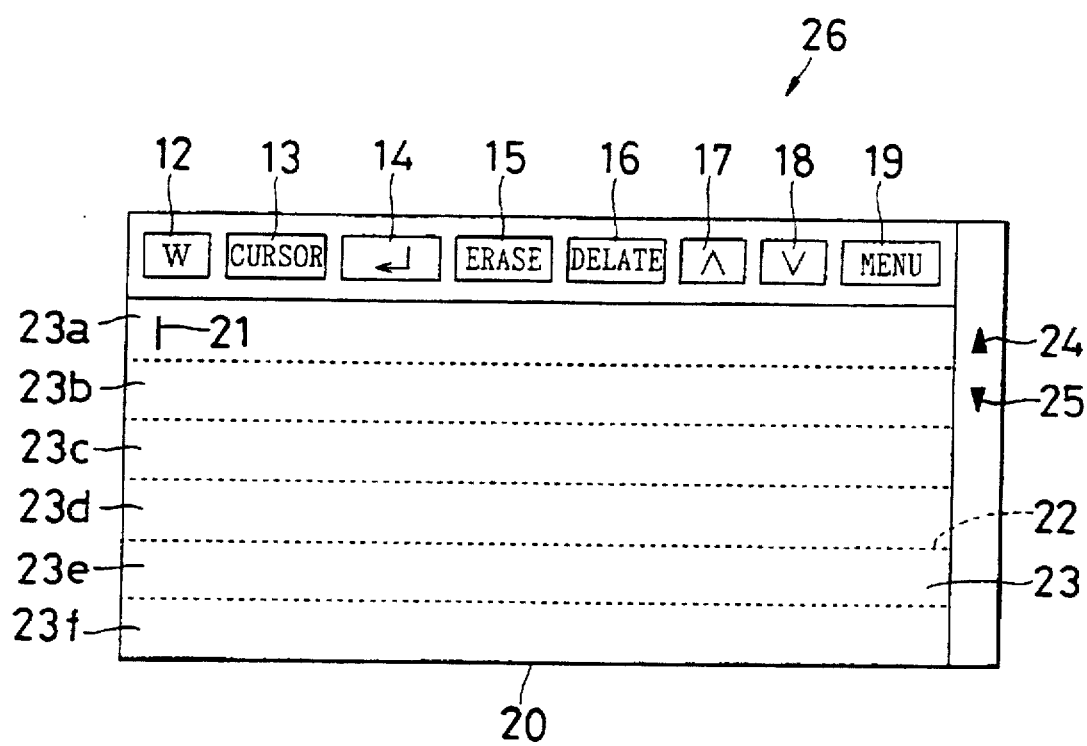
FIG. 2 is a plan view showing an initial picture displayed on a display panel 6.

FIG. 2 is a plan view showing the initial picture displayed on the display panel 6. FIGS. 3A to 3D are plan views showing in progressive steps an example of the display image at the time of inputting and displaying of handwritten characters. In the initial picture 26, a plurality of buttons 12 to 19, 24, 25 are displayed in addition to the input/display area 20 for characters. In the input/display area 20 for characters, a plurality of ruled lines 22 are displayed at equal intervals. A line 23 exists between adjacent ruled lines 22 and a plurality of lines 23 are formed with a plurality of ruled lines 22. At the forefront position of the first line 23a (left top of the input/display area 20 for characters in the picture in FIG. 2), the cursor 21 indicating the input display position is displayed. In the input/display area 20 for characters, characters are input in handwriting using the input pen 11. The image data inputted in handwriting is submitted to processing for turning into stroke data and then submitted to normalization to be inputted in the right direction in the picture in FIG. 2 from the position where the cursor 21 is displayed.

Figure 3A:
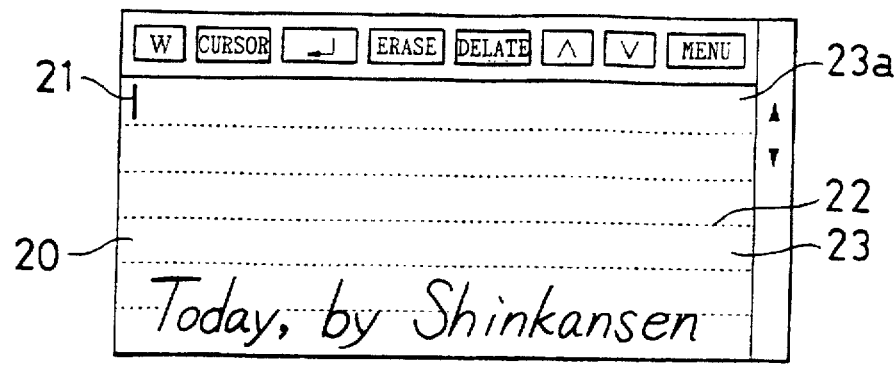
FIGS. 3A to 3D are plan views showing in progressive steps an example of a display image at the time of inputting and displaying of handwritten characters.

For example, when a phrase "today, by Shinkansen" is inputted in the input/display area 20 for characters by using the input pen 11, the characters inputted in the input position are displayed as shown in FIG. 3A. This is executed by detecting the input position with the touch panel 8 and selecting and displaying the display position of the display panel 6 corresponding to the input position detected.

Figure 3B:
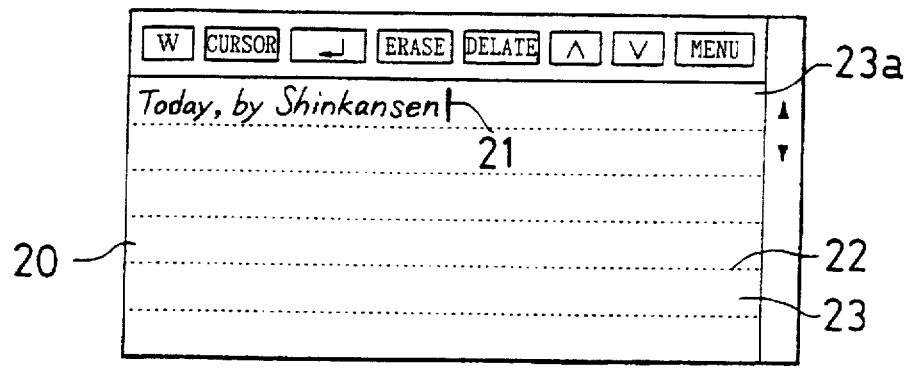

When, after inputting characters in handwriting, for example, the W button is indicated with the input pen 11, the image data is submitted to processing for turning into stroke data and also submitted to normalization, and the characters are displayed in the right direction in the picture in FIG. 3B from the position of the cursor 21 displayed in the forefront position as shown in FIG. 3B. The cursor 21 is displayed after the characters are displayed. Moreover, the characters which were displayed in the input position are erased. The processing for turning into stroke data is one made for reducing the data volume by detecting the necessary image data only from among the sample image data. In addition, normalization means processing for converting characters inputted in handwriting to a size corresponding to the width of the line 23.

Figure 3C:
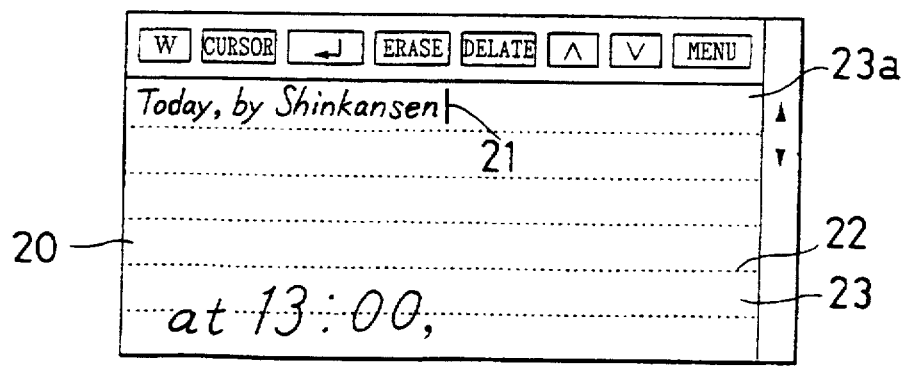
Figure 3D:
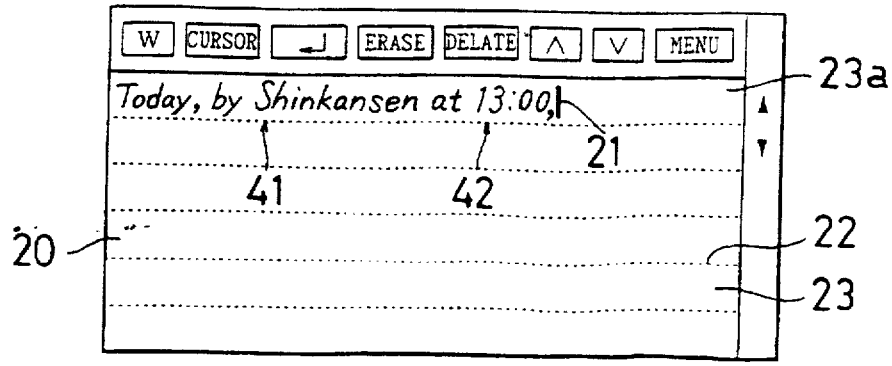

Next, when characters are inputted in handwriting as "at 13:00" in the same way, the inputted characters are displayed in the input position as shown in FIG. 3C. When the W button 12 is indicated next, the image data is submitted to processing for turning into stroke data and also submitted to normalization, and the characters are displayed in the right direction in the picture in FIG. 3 from the position of the cursor 21 as shown in FIG. 3D. The cursor 21 is displayed after the characters are displayed. Moreover, the characters which were displayed in the input position are erased.

In this embodiment, the image data inputted during the period, from the end of processing for turning into stroke data to the next processing for turning into stroke data, is treated as forming one block data. In the case where characters are inputted in handwriting in the initial picture 26, the image data inputted during the period from the showing of the initial picture to the first processing for turning into stroke data is treated as forming one block data. In the examples of input of characters mentioned above, "today, by Sinkansen" and "at 13:00" become single block data respectively and are displayed as block 41 and block 42. The processing for turning into stroke data and the processing for normalization are performed for each block.

In the examples mentioned before, processing for turning into stroke data and processing for normalization are performed by indicating the W button 12. When the W button 12 is not indicated, however, processing for turning into stroke data and processing for normalization are performed by measuring the time after the end of input in handwriting when there is no input even with the passing of a prescribed time. Moreover, processing for turning into stroke data and processing for normalization are performed when the inputted image data is away from the image data inputted immediately before by no less than the predetermined distance.

When, after indicating the cursor button 13 with the input pen 11, a desired position in the input/display area 20 for characters is indicated, the cursor 21 moves to the indicated position. When, after indicating the line feed button 14 with the input pen 11, a desired position inside the block displayed in the input/display area 20 for characters is indicated, a line feed code is inputted before the block data of the indicated block and a line feed is made at that position. When, after indicating the eraser button 15 with the input pen 11, a desired position inside the block displayed in the input/display area 20 for characters is indicated, the block data of the indicated block is erased. The erased area becomes blank. Here, the eraser button 15 is converted to the pencil button which is not illustrated.

When, after indicating the delete button 16 with the input pen 11, a desired position inside the block displayed in the input/display area 20 for characters is indicated, the block data of the indicated block is deleted. The blocks after the erased block are displayed by eliminating the erased space. In the case where there is no block to display in the position indicated by the input pen 11 after indication by the input pen 11 of the delete button 16, a blank of the predetermined size is deleted. Here, the delete button 16 is converted to the pencil button which is not illustrated. When the pencil button is indicated with the input pen 11, the eraser button 15 or the delete button 16 appears to enable input in handwriting of characters again.

When the registration button 17 is indicated with the input pen 11, a plurality of block data and line feed code, etc. are registered as an independent data in the RAM 4 together with the date of input, for example. After the registration is over, the independent data registered in the immediately previous position is read out and displayed in the input/display area 20 for characters. When there is no independent data in the immediately previous position, no processing is made. When the registration button 18 is indicated with the input pen 11, a plurality of block data and line feed code, etc. are registered as an independent data in the RAM 4 together with the date of input, etc. After the registration is over, the independent data registered in the next position is read out and displayed in the input/display area 20 for characters. When there is no independent data in the next position, the initial picture 26 is displayed.

When the upper button 24 or the lower scroll button 25 is indicated with the input pen 11, the line 23 in the input/display area 20 for characters is sequentially fed and displayed. Namely, the input/display area 20 for characters is constructed with a plurality (6 in this embodiment) of lines 23a to 23f as shown in FIG. 2.

If the upper scroll button 24 is indicated with the input pen 11 when the input/display area 20 for characters is being displayed, for example, the input/display area 20 for characters constructed with 6 lines or the 2nd line 23b to the 6th line 23f and the 7th line following the 6th line 23f, is displayed. When the button 24 is indicated in succession, the input/display area 20 for characters constructed with the 3rd line 23c to the 8th line is displayed. Moreover, when the lower scroll button 25 is indicated when the input/display area 20 for characters constructed with the 2nd line 23b to the 7th line is being displayed, the input/display area 20 for characters constructed with the first line 23a to the 6th line 23f is displayed. The number of lines for one scrolling may be either 1 line or 2 or more lines.

Figure 4:
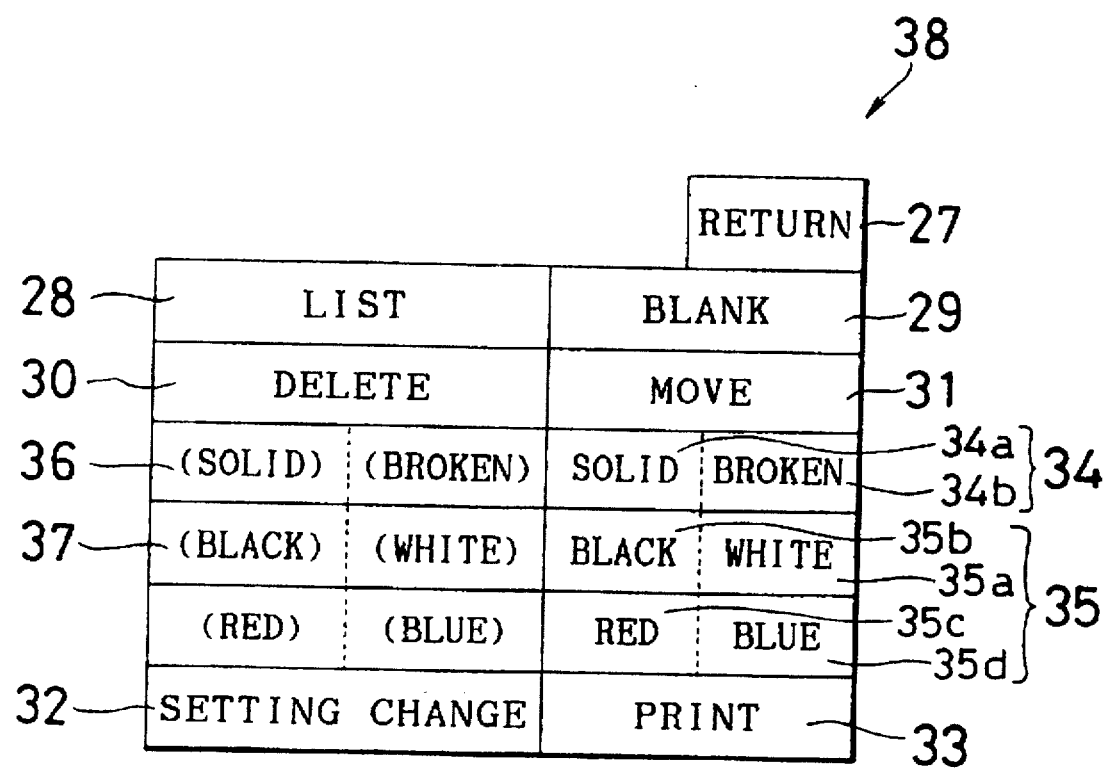
FIG. 4 is a plan view showing a menu picture 38.

FIG. 4 is a plan view showing the menu picture 38. While the menu button 19 is indicated with the input pen 11, the menu picture 38 is displayed in the input/display area 20. When the indicated position of the input pen 11 is moved to the position of the desired button in the menu picture 38 and put the input pen 11 away from the picture, the operation corresponding to that button is executed. When a button in the menu picture 38 is indicated, the indicated button is displayed in the reversed state. For example, characters displayed in black against a white screen are displayed in white on a black screen. Moreover, when the input pen 11 is put away from the picture, the display of the menu picture 38 disappears.

When the display list button 28 in the menu picture 38 is indicated with the input pen 11, the data being input is registered and the list picture showing the registered independent data is displayed. When the blank button 29 is indicated with the input pen 11, the data being inputted is registered and the initial picture 26 is displayed. When the delete data button 30 is indicated with the input pen 11, the displayed data is erased and the independent data registered in the next position is read out and displayed. When there is no data in the next position, the initial picture 26 is displayed.

When, after indicating the move button 31 with the input pen 11, the block which is desired to be moved in the input/display area 20 for characters is indicated with the input pen 11, and the input pen 11 is moved to the desired position always in contact with the picture and then the input pen 11 is put away from the picture, the indicated block moves to the desired position. The block area before the moving becomes blank. In the case where there is no block in the position indicated with the input pen 11, a blank of the predetermined size is inserted in the desired position to which the input pen 11 has been moved and blocks found after the inserting position of blank are displaced (to the right) by the size of the blank. However, when there is a line feed code, no moving of the blocks found after the line feed code is made.

When the handwritten input setting change button 32 is indicated, the picture for changing the conditions set at the time of processing for turning into stroke data and processing for normalization to be described later, such as size of normalization, blank time for input and approximate time is displayed. When the setting of the respective conditions is over, the picture for changing conditions is erased and the display image indicating the button 32 is displayed. When the print button 33 is indicated, an operation for printing and outputting the data on display is executed.

The line type and line color switch buttons 34, 35 are buttons for selecting the line type and the line color of the characters displayed. In this embodiment, buttons 34a, 34b representing two kinds of line type, solid line and broken line respectively are provided as line type switch buttons 34, and buttons 35a to 35d indicating 4 kinds of line color or white, black, red and blue respectively are provided as line color switch buttons 35. All dots between the 2 points are turned on (displayed) when the solid line is selected but every other dot of the dots between the 2 points is turned on when the broken line is selected. Moreover, the line type and line color switch buttons 36, 37 are buttons used for indicating change of line type and line color in units of block, and the line type switch button 36 is provided with 2 kinds of buttons while the line color switch button 37 is provided with 4 kinds of buttons in the same way as the switch buttons 34, 35. When the return button 27 is indicated, the display of the menu picture 38 is erased and the display image used for indicating the menu button 19 is displayed.

Figure 5:
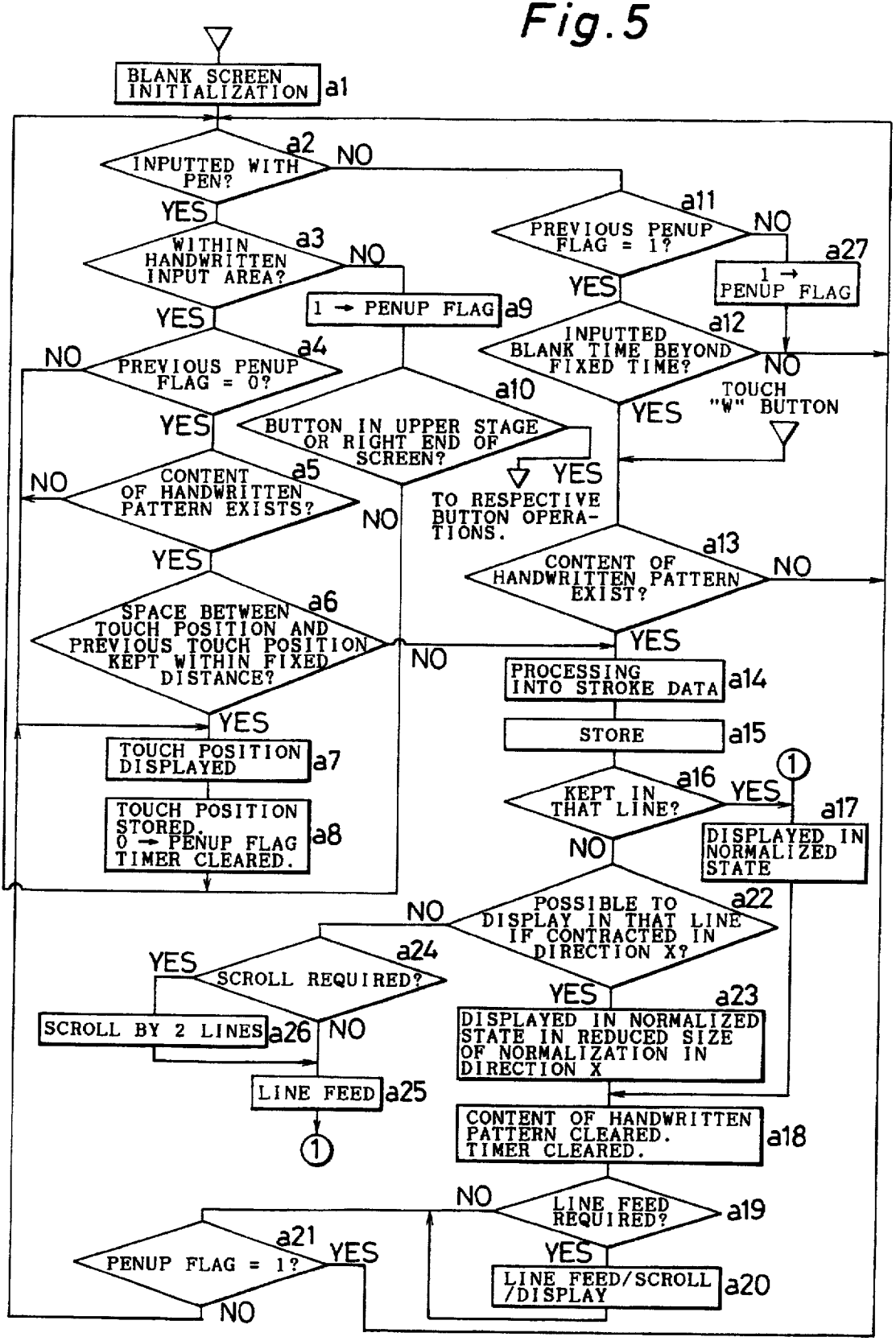
FIG. 5 is a flow chart showing the motion at the time of displaying of handwritten characters.

FIG. 5 is a flow chart showing the motion at the time of displaying of handwritten characters. FIGS. 6A to 6C and 7A to 7C are plan views showing an example of the display image. At step a1, the display image is initialized. Namely, the initial picture 26 is displayed. The timer is also initialized. This timer is for counting the period of PENUP state. Moreover, "1" is inputted in the PENUP flag. The PENUP flag "1" indicates the PENUP state while the PENUP flag "0" means the PENDOWN state. At step a2, judgment is made whether any pen input has been made or not. The process moves to step a3 when there is some pen input but to step a11 when there is no pen input. At step a3, judgment is made whether the pen input has been made in the input/display area 20 for characters or not. The process moves to step a4 when the input has been made in the area 20 but moves to step a9 when the input was not made in that area.

At step a4, judgment is made whether the previous PENUP flag is "0" or not, namely whether the PENUP flag was in a PENDOWN state before or not. The process moves to step a5 when the PENUP flag is "0" but moves to step a7 when it is not "0". At step a5, judgment is made whether there is any content of handwritten pattern. Namely, when handwritten characters are inputted in the input/display area 20 for characters, the display position of the display panel corresponding to the input position indicated with the input pen 11 gets in the display state. At step a5, judgment is made whether there is any such display pattern or not. The process moves to step a6 when there is some content but moves to step a7 when there is no such content. At step a6, judgment is made whether the distance from the previous input is within the prescribed distance or not. The process moves to step a7 when the distance is within the prescribed distance but moves to step a14 and the data inputted so far is turned into stroke data when it is larger than the prescribed distance.

At step a7, the input position is displayed on the screen. At that time, when the previous PENUP flag was "1", the display is made in such a way that the input position and the previous coordinate position are connected to each other. In the case where the previous PENUP flag was "0", only the input position is displayed. At step a8, the input position is stored, 0 is inputted in the PENUP flag and the timer is initialized. When the operation of the step a8 is over, the process moves to step a2.

At step a9, "1" is inputted in the PENUP flag. At step a10, judgment is made whether the input position is the position corresponding to the display position of the button. The operation of each button is performed when the input position corresponds to the display position of the button, otherwise returning to step a2.

At step a11, judgment is made whether the PENUP flag is "1" or not. The process moves to step a12 when the PENUP flag is "1" but moves to a27 when it is not "1". At step a12, judgment is made whether the blank time is no smaller than the prescribed time or not, namely whether the time counted by the timer is equal to or longer than the prescribed time. The process moves to step a13 when the blank time is no shorter than the prescribed time but moves to step a2 when it is shorter than the prescribed time. At step a13, judgment is made whether there is any content of handwritten pattern or not. The process moves to step a14 when there is some content but moves to step a2 when there is no such content. When the W button 12 is indicated, the operations of and after steps a13 are performed.

At step a14, the image data inputted in handwriting is turned into stroke data by the method to be described later. At step a15, the stroke data obtained by the processing for turning into stroke data is stored. At step a16, judgment is made whether or not the stroke data can be fully shown after the display position of the cursor 21 of the line 23 on which the cursor 21 is displayed in the case where the stroke data is displayed in the normalization size selected in advance. The process moves to step a17 when it is judged that the data can be shown in that position but moves to step a22 when it is judged otherwise.

When the operation of the step a17 is over, the process moves to step 18, the content of handwritten pattern is initialized i.e. erased and the timer is initialized. At step a19, judgment is made whether the position of the cursor 21 after the displaying of stroke data comes to the head of the next line 23 or not. The process moves to step a20 when the cursor 21 comes to the head of the next line 23 but moves to step a21 when it does not come to the head of the next line 23 i.e. when no line feed is made. At step a20, line feed is made and, when the position of the cursor 21 gets out of the displayed image, scrolling is made. In the case where there is some data to display after the scrolling, that data is displayed. When the operation of the step a20 is over, the process moves to step a21. At step a21, judgment is made whether the PENUP flag is "1" or not. The process moves to step a2 when the PENUP flag is "1" but moves to a7 when it is not "1".

Figure 6A:
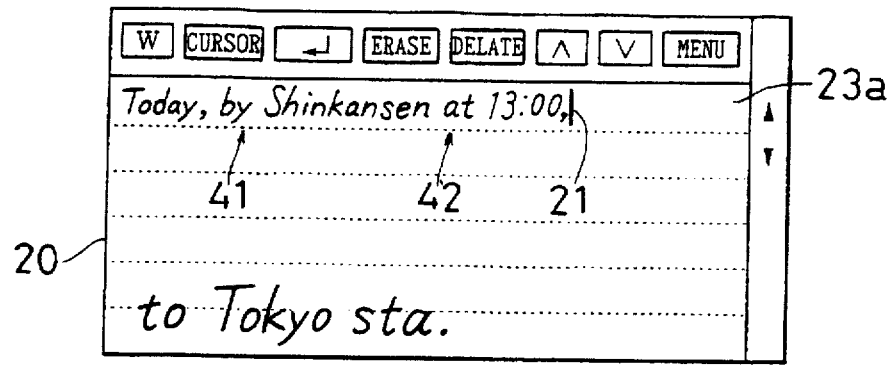
FIGS. 6A to 6C are plan views showing an example of the display image.
Figure 6B:
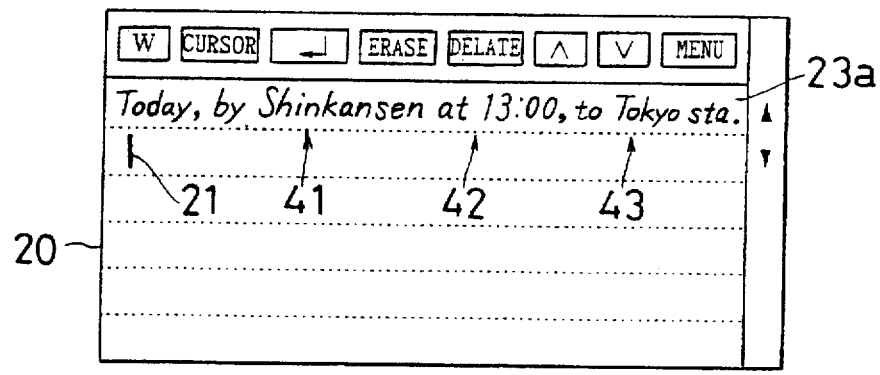

In the case where the cursor 21 cannot be retained on the displayed line 23 when the stroke data is displayed in the normalization size selected in advance, the length of the stroke data in the direction of line 23 is shortened in step a22. For example, judgment is made whether the cursor 21 can be kept on the displayed line or not when the data length is multiplied by 0.8. It is a case where the cursor 21 cannot be kept on the displayed line, for example when a phrase "to Tokyo Station" as shown in FIG. 6A is inputted in handwriting and the stroke data corresponding to it is displayed on the right direction on the picture of FIG. 6 from the display position of the cursor 21 on the line 23a. What is judged is whether or not the cursor 21 can be kept on the line 23a when the length of the stroke data in the direction of the line i.e. in the longitudinal direction of the line 23a is multiplied by 0.8. The process moves to step a23 when it is judged that the cursor 21 can be kept on the line 23a, otherwise moving to step a24. At step a23, the length in the direction of line of the stroke data is shortened i.e. it is multiplied by 0.8, for example. The shortened stroke data is submitted to normalization and the block 43 of "to Tokyo Station" is displayed on the line 23a after the blocks 41 and 42 which are already displayed as shown in FIG. 6B. The process moves to step a18 when the operation of the step a23 is over.

In the case where the cursor 21 cannot be displayed on the displayed line 23 even with contraction of stroke data, judgment is made in step a24 whether any scrolling is required or not. The process moves to step a26 when scrolling is necessary but moves to step a25 when no scrolling is necessary. For example, when a phrase as "the meeting minutes of the previous time is necessary for having a meeting with A company" is tried to be input from the position of the cursor 21 on the line 23e, this content cannot be fully displayed on the lines 23e, 23f and scrolling is necessary.

Figure 6C:
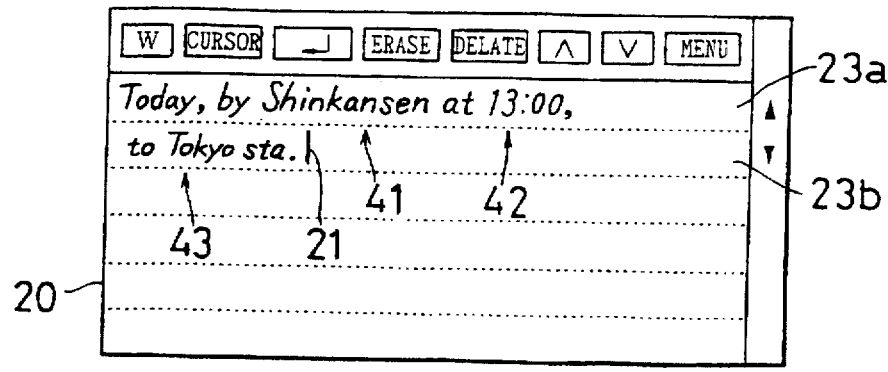
Figure 7A:
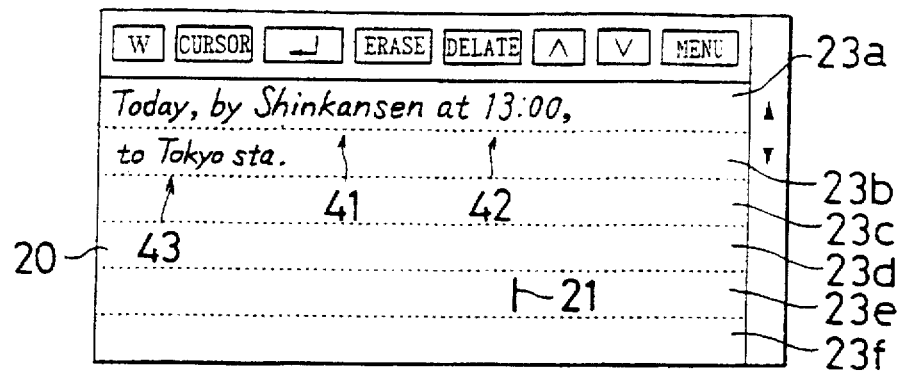
FIGS. 7A to C are plan views showing an example of the display image.
Figure 7B:
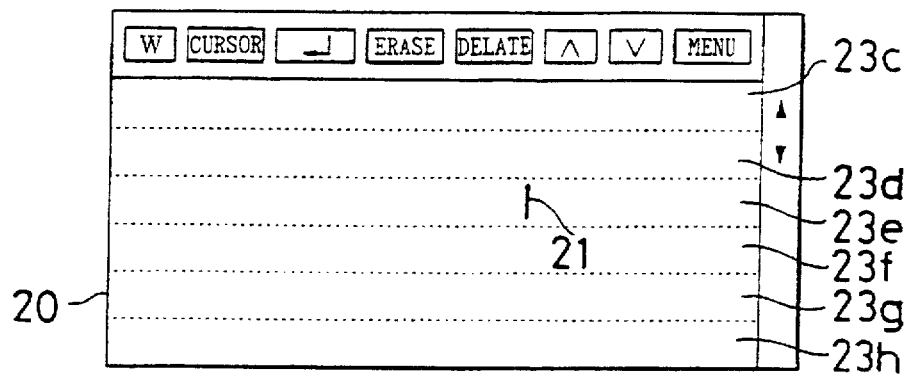
Figure 7C:
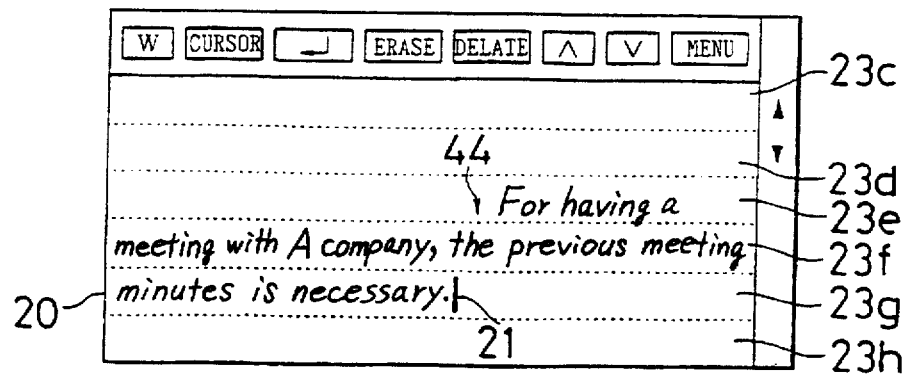

At step a26, scrolling is made only for 2 lines. FIG. 7B indicates the display image given when the line indicated in FIG. 7A is advanced by 2 lines. At that time, the cursor 21 is displayed at the position corresponding to the same line 23e as that before scrolling. When there is some stroke data to be displayed after scrolling, that stroke data is displayed. At step a25, line feed is performed. After the line feed, the cursor 21 is displayed at the head of that line 23. When the operation of the step a25 is over, the process moves to step a17. At step a17, the stroke data is displayed by being submitted to normalization as described before. The blocks 43 and 44 corresponding to "to Tokyo Station" and "with A company" are displayed as shown in FIG. 6C or FIG. 7C, for example.

FIG. 8 is a plan view showing the list image 45 displayed when the list displaying button 28 in the menu button 19 is indicated. The list image 45 is constructed by including a title column 46 in which the title name indicating display of list, date column 47 indicating the date of establishment of the registered independent data and content of a registration column 48 indicating the content of registered independent data. In this embodiment, the stroke data of the prescribed length from the head of the registered independent data is displayed by being submitted to normalization in the content of registration column 48. In the title column 46, the registration button 17, the registration button 18 and the blank button 29 are displayed. In this embodiment, the date and the head of 6 independent data are displayed on the list image 45, and the date column 47 and the content of the registration column 48 are divided into 6 lines to display the date and the head of the individual independent data on each line.

Figure 9:
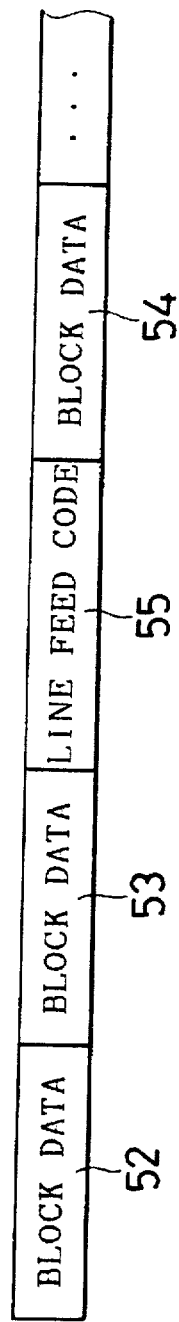
FIG. 9 is a drawing showing the structure of an independent data 51 to be registered.

FIG. 9 is a drawing showing the structure of an independent data 51 to be registered. The independent data 51 is constructed by including a plurality of block data 52, 53, 54 and a line feed code 55. The plurality of block data 52, 53, 54 include the image data submitted to processing for turning into stroke data of one block described above respectively and are stored in the order of input together with the line feed code.

Figure 10:
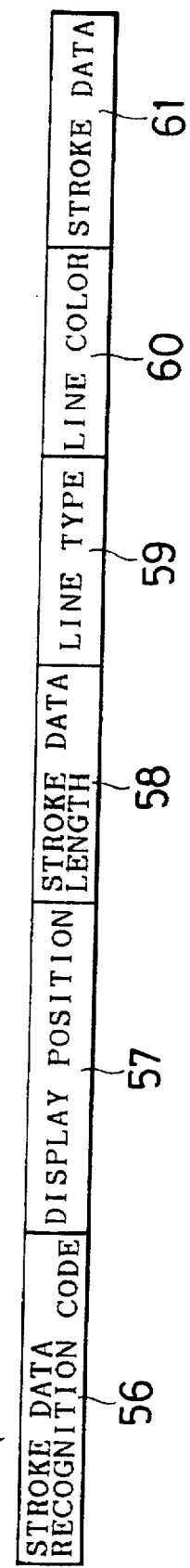
FIG. 10 is a drawing showing the structure of block data 52.

FIG. 10 is a drawing showing the structure of the block data 52. The block data 53, 54 are also constructed in the same way. The block data 52 is constructed by including a stroke data recognition code 56, display position data 57, a stroke data length 58, line type data 59, line color data 60 and stroke data 61. The stroke data recognition code 56 is a code which expresses inclusion of stroke data 61. By checking this-stroke data recognition code 56 and the line feed code 55, it may be judged whether it is a block data or not. The display position data 57 is data which expresses the distance between the start position of display of stroke data 61 and the end position of display of stroke data immediately before or the number of dots, for example. With this display position data 57, it becomes possible to provide a blank between blocks. For example, by specifying 10, a blank of 10 dots can be produced.

The stroke data length 58 is data which represents the length of the stroke data 61. The line type data 59 and line color data 60 are data which express the line type and line color at the time of display of the stroke data 61. The stroke data 61 is obtained after the image data of the input block is submitted to processing for turning into stroke data. At the time of display, the characters are displayed based on display position data 57, line type data 59, and line color data 60.

FIGS. 11A, 11B are drawings showing the structure of the stroke data 61. The stroke data 61 is constructed by including pen state data 62, expression data 63, an X direction movement amount 64 and a Y direction movement amount 65. FIG. 11A indicates the construction of a case in which the X direction movement amount 64 and the Y direction movement amount 65 are expressed in 2 bytes, while FIG. 11B indicates the construction of a case in which the amounts of movement 64, 65 are expressed in 4 bytes.

The pen state data 62 is data expressing PENUP state or PENDOWN state. PENDOWN data is inputted when the sampled point is in the PENDOWN state from the point immediately before and PENUP data is inputted when the sampled point is in the PENUP state from the point immediately before. The expression data 63 is data which expresses whether the amount of movement stored in the X direction movement amount 64 and the Y direction movement amount 65 is expressed in 2 bytes or in 4 bytes. The X direction movement amount 64 expresses the amount of movement in the X-axis direction from the point of previous sampling while the Y direction movement amount 65 indicates the amount of movement in the Y-axis direction from the point of previous sampling.

Figures 12A, 12B:
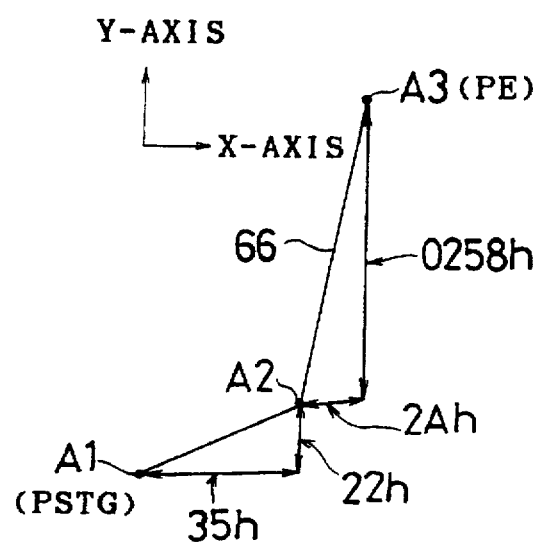
FIGS. 12A, 12B are drawings showing concrete characters and stroke data 67.

FIGS. 12A, 12B are drawings showing concrete characters 66 and stroke data 67. FIG. 12A indicates the character 66 displayed with the stroke data 67 while FIG. 12B is a drawing showing the construction of the stroke data 67. The character 66 connects a point A1 (starting point) and a point A2 and also the connects the point A2 and a point A3 (end point) The points A1 to A3 are ones selected by processing for turning into stroke data to be described below. The stroke data 67 is composed of data regarding points A1 to A3. The data regarding the point A1 is composed of PENUP data 62a, expression data 63a which indicates that the X direction movement amount and the Y direction movement amount are expressed in 2 bytes, X direction movement amount 64a and Y direction movement amount 65a, because the point A1 is the starting point and that the pen state up to that time is PENUP. The X direction movement amount X 64a and the Y direction movement amount Y 65a are both "00h" because the point A1 is the starting point.

The data regarding the point A2 is composed of PEN-DOWN data 62b, expression data 63b, X direction movement amount 64b and Y direction movement amount 65b, because the pen state from the point A1 to the point A2 is PENDOWN. The X direction movement amount 64b and the Y direction movement amount 65b are amounts of movement from the point A1 to the point A2, and are expressed with the right direction on the picture of FIG. 12A as X-axis direction and the upper direction as Y-axis direction for example. In the illustrated case, the amount of movement in the X-axis direction is "35h" while the amount of movement in the Y-axis direction is "22h".

The data regarding the point A3 is composed of PENDOWN data 62c, expression data 63c, an X direction movement amount 64c and a Y direction movement amount 65c, because the pen stage from the point A2 to the point A3 is PENDOWN. The X direction movement amount 64c and the Y direction movement amount 65c are amounts of movement from point A2 to point A3. In the illustrated case, the amount of movement in the X-axis direction is "2Ah" while the amount of movement in the Y-axis direction is "0258h". You can reduce the data volume to be stored by selecting either 2 bytes or 4 bytes the expression of the move amount.

Figure 13A:
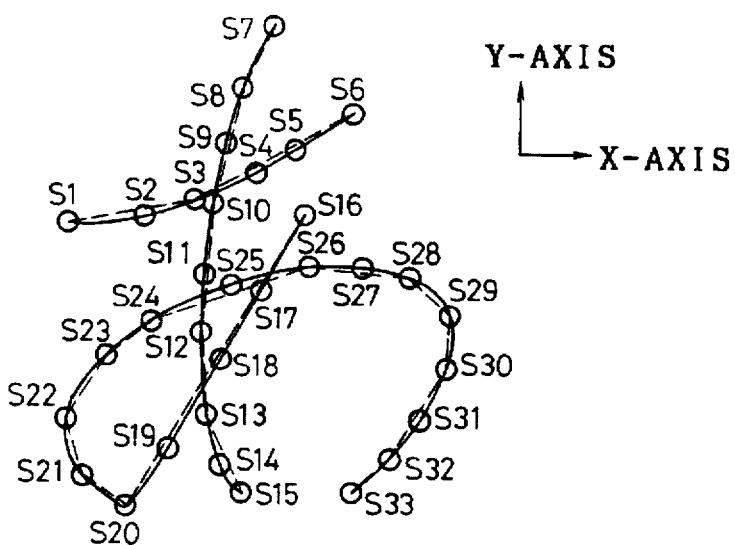
FIGS. 13A to 13C are drawings for explaining a method of turning inputted image data into stroke data.
Figure 13B:
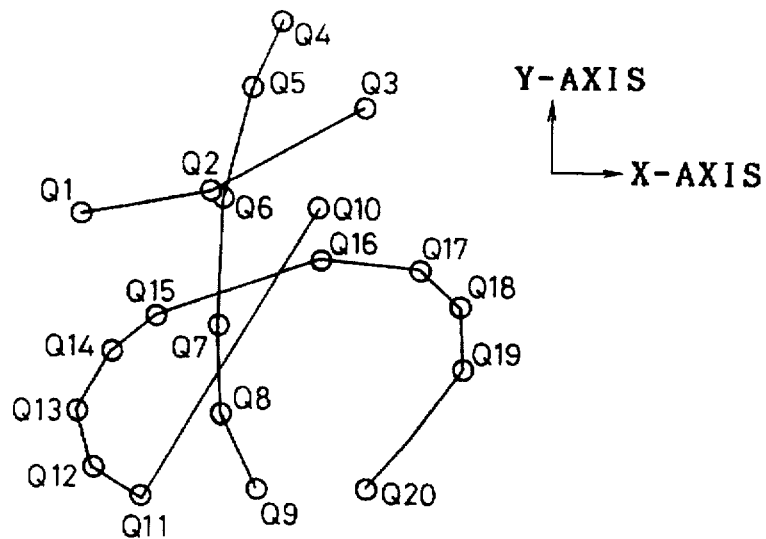
Figure 13C:
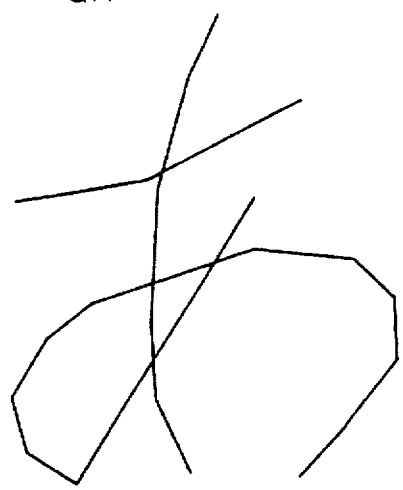
Figure 14A:
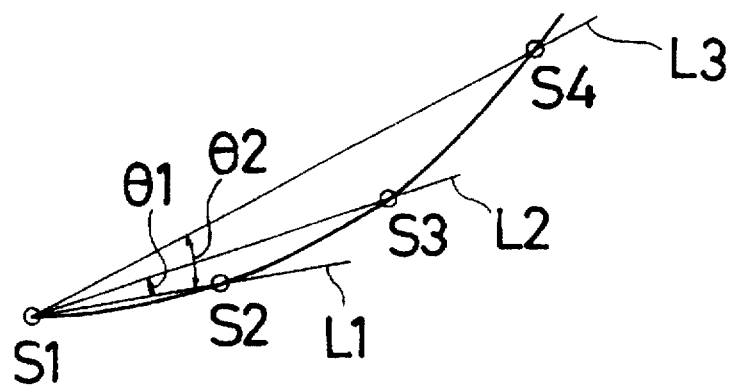
FIGS. 14A, 14B are drawings for explaining a method of extraction of points Q1 to Q20.
Figure 14B:
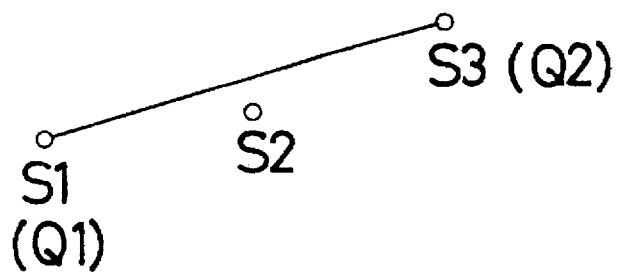
Figure 15:
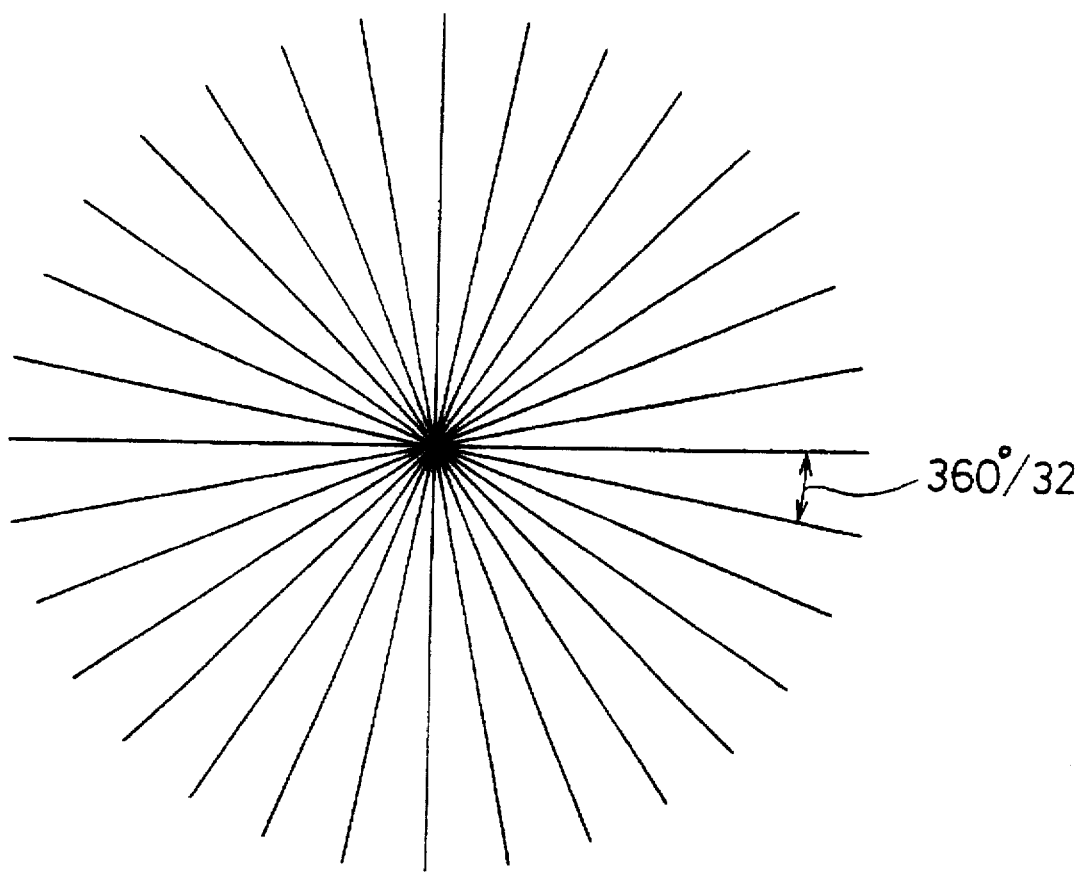
FIG. 15 is a plan view showing an approximate angle m at the time of extraction.

FIGS. 13A to 13C are drawings for explaining the method of turning inputted image data into stroke data. FIG. 13A is a drawing showing the sampling points S1 to S33 of the inputted image data, the FIG. 13B is a drawing showing the extraction points Q1 to Q20 extracted according to the references to be described below from among the sampling points S1 to S33, and FIG. 13C is a drawing showing the character expressed with the stroke data. Moreover, FIGS. 14A, 14B are drawings for explaining the method of extraction of points Q1 to Q20. FIG. 15 is a plan view showing the approximate angle φ at the time of extraction. An example of processing for turning inputted image data into stroke data is disclosed in Japanese Unexamined Patent Publication JPA 2-77825 for example, and the example using other methods than explained hereafter also belongs to the scope of the present invention.

First, as shown in FIG. 13A, when a phrase " (a Japanese character)" is inputted in handwriting, the coordinate points S1 to S33 are sampled by the touch panel 8. The number of coordinate points can be changed by selecting the timing of switching of the voltage applied to the touch panel 8. As for coordinates, the X-axis is set in the right direction on the picture of FIGS. 13A to 13C and the Y-axis is set in the upper direction. From among the sampling points S1 to S33, the minimum required coordinate points are extracted for displaying the character as shown in FIG. 13B.

First, the point S1 is taken as the starting point. Next, as shown in FIG. 14A, the line connecting point S1 and point S2 is designated as line L1, the line connecting point S1 and point S3 is put as line L2, and the lines connecting point S1 and points S4, S5, S6 respectively are given as lines L4, L5, L6. The angle formed with line L1 and line L2 is designated as an angle θ1, the angle formed with line L1 and line L3 as an angle θ2, and the angles formed by line L1 and lines L4, L5, L6 as angles θ3, θ4, θ5, respectively thereafter. The angles θ1 to θ5 and the predetermined approximate angle φ are compared with each other sequentially from angle θ1 and angles larger than the approximate angle φ are selected. For example, when the angle θ1 is smaller than the approximate angle φ and the angle θ2 is larger than the approximate angle φ, the point S3 connecting the line L2 and the point S1 is extracted and the point S2 is omitted. Namely, as shown in FIG. 14B, the point S2 is omitted while the points S1, S3 are extracted and the respective points are designated as extraction points Q1, Q2. After that, the same extracting operation is repeated starting from the point S3.

The extracting operation is performed by considering the portion from the coordinate point of PENUP to the coordinate point of PENDOWN immediately before the next coordinate point of PENUP as one unit.

In the case where the approximate angle m indicated in FIG. 15 is set as φ=360°/32, the points Q1 to Q20 indicated in FIG. 13B are extracted, and the character " (hiragana)" displayed by connecting the extracted points Q1 to Q20 in order becomes as shown in FIG. 13C. The number of extracted points can be changed by selecting the approximate angle φ. The sampling points are extracted by selecting the approximate angle φ to clearly show that the character inputted in handwriting is identical to the character which is displayed after the processing for turning into stroke data.

FIG. 16 is a data showing the construction of the stroke data 68 corresponding to the character indicated in FIG. 13C. The stroke data 68 is composed of the pen state data 62 regarding the extracted points Q1 to Q20, the expression data 63, the X direction movement amount 64 and the Y direction movement amount 65.

Figure 17:
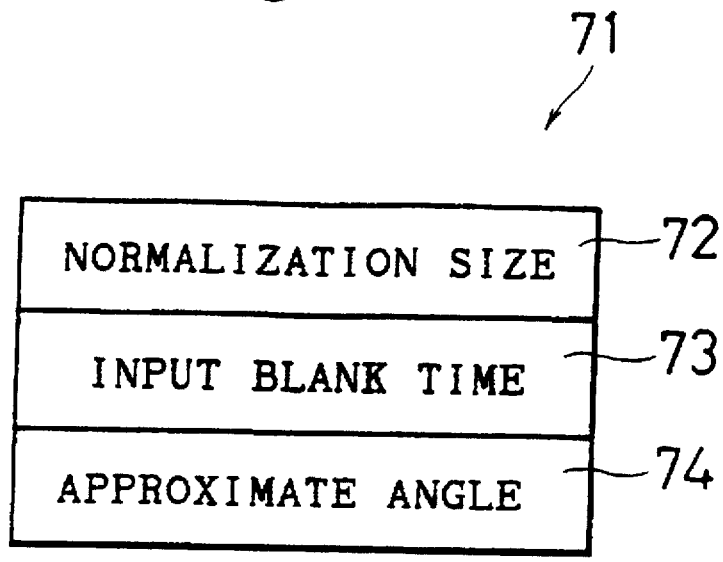
FIG. 17 is a drawing showing the structure of a memory 71 for set conditions in which set conditions data in normalization are stored.

FIG. 17 is a drawing showing the structure of the memory 71 for set conditions in which set conditions data in normalization are stored. The memory 71 for set conditions is constructed by including a normalization size memory 72, an input blank time memory 73 and an approximate angle memory 74. In the normalization size memory 72, data for selecting the width of the line 23 when displaying the stroke data in a size corresponding to the width of the line 23 is stored. In the input blank time memory 73, data for setting the prescribed time in the case where inputted image data is automatically turned into stroke data and submitted to normalization when the next handwritten character is not inputted even with the passing of a prescribed time after the input of the handwritten character is stored. In the approximate angle memory 74, data for selecting the approximate angle φ is stored.

Figure 18:
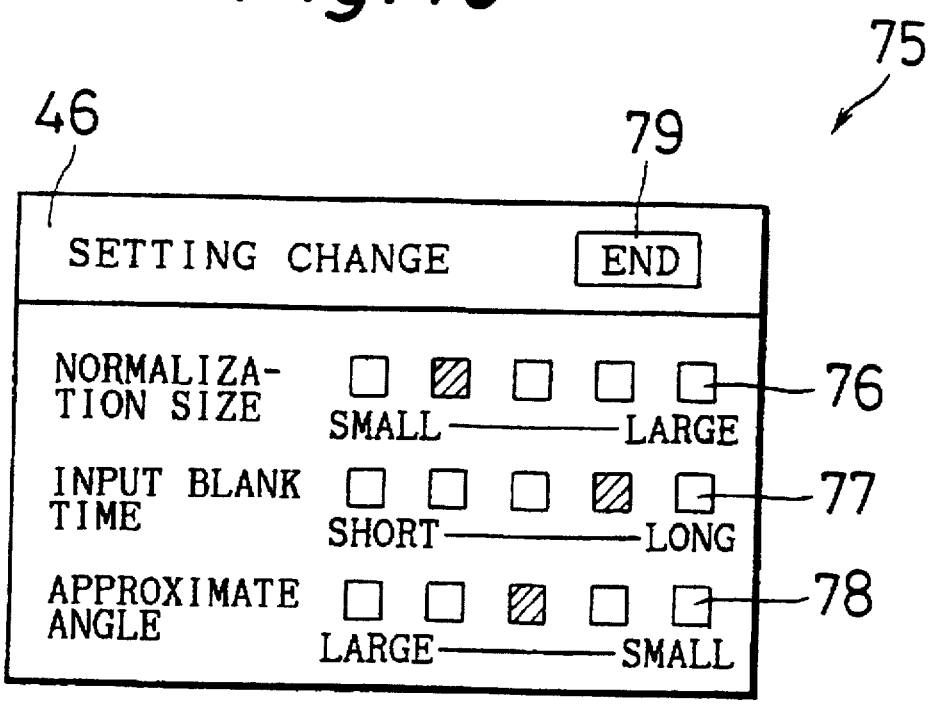
FIG. 18 is a plan view showing a setting changing picture 75 for input in handwriting displayed when the setting changing button 32 for input in handwriting is indicated.

FIG. 18 is a plan view showing the setting changing picture 75 for handwritten input displayed when the setting changing button 32 for handwritten input is indicated. The picture 75 is a picture for selecting the conditions of the memory 71 for set conditions and the title name indicating picture for changing setting of input in handwriting is displayed in the title column 46. Moreover, this picture also displays a plurality of normalization size selecting buttons 76, a plurality of input blank time selecting buttons 77 and a plurality of approximate angle selecting buttons 78. By indicating the button corresponding to the desired conditions with the input pen 11, the conditions corresponding to that button can be selected from among the memory 71 for set conditions. By indicating the end button 79 after the selection of conditions, the process for changing the setting for input is interrupted, erase the picture 75 and return to the picture which was displayed when the button 32 was indicated.

Figure 19:
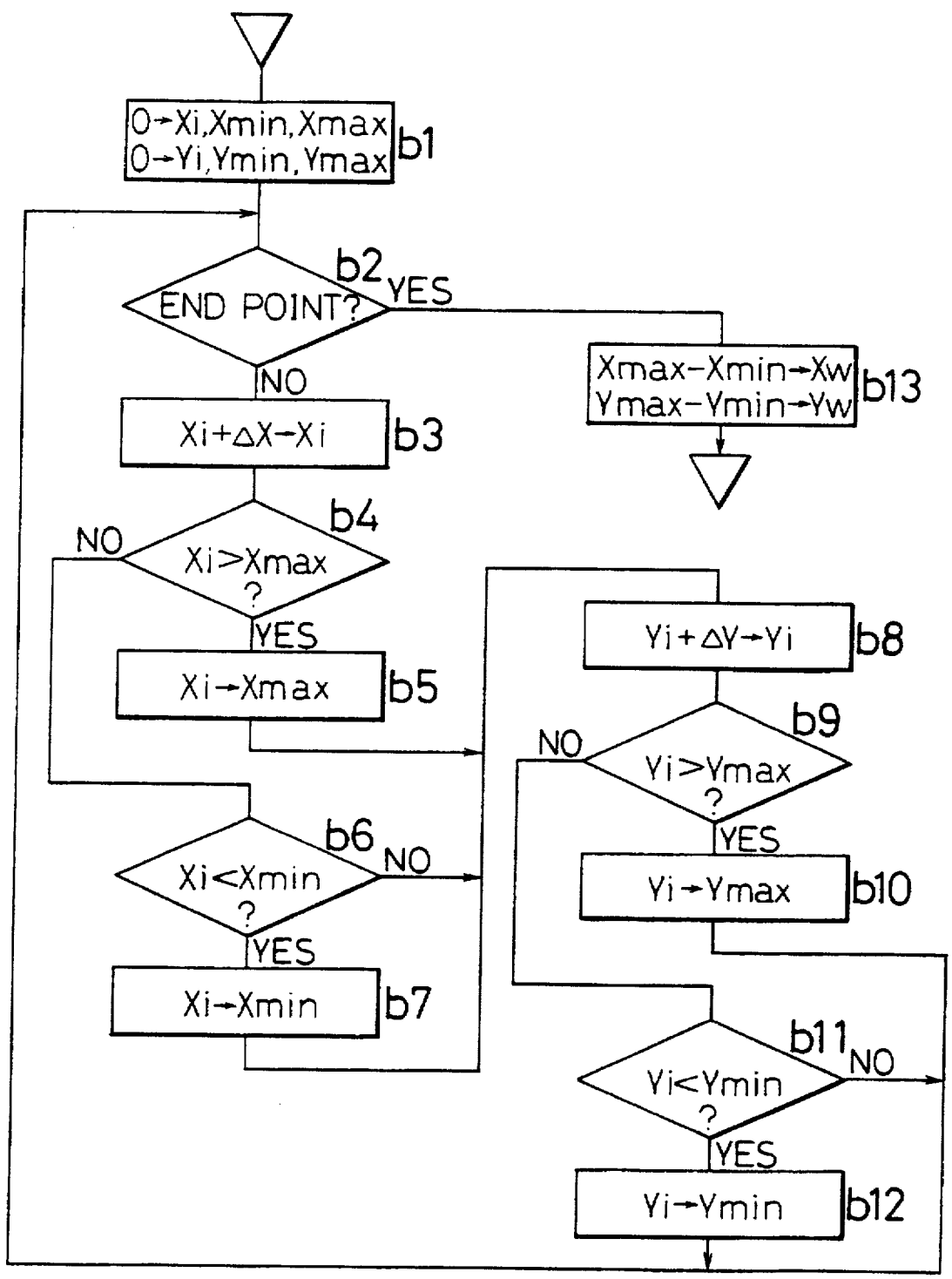
FIG. 19 is a flow chart for determining the size of one block displayed by one stroke data.
Figure 20:
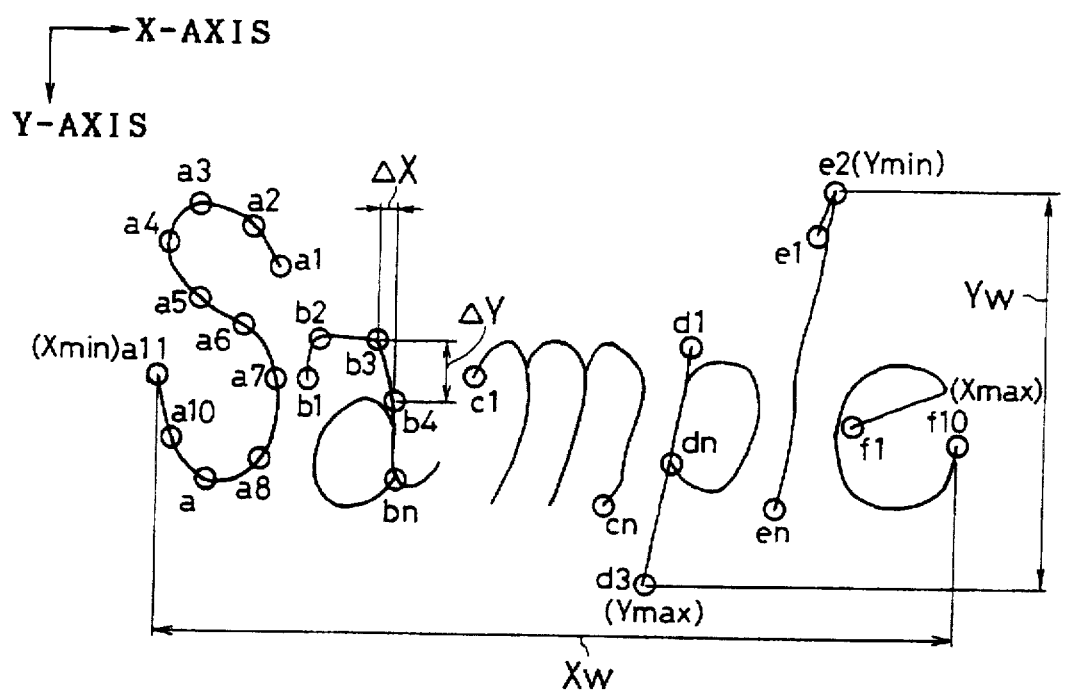
FIG. 20 is a drawing showing an example of characters displayed by one stroke data.

FIG. 19 is a flow chart for determining the size of one block displayed by one stroke data. FIG. 20 is a drawing showing an example of characters displayed by one stroke data. The flow chart of FIG. 19 will be explained hereafter by using FIG. 20. An X-axis is set in the right direction and a Y-axis is set in the downward direction in the picture of FIG. 20. The size of one block determined in the flow chart of FIG. 19 is used according to the judgment made at step a16.

At step b1, the variables $Xi$, $Yi$, $Xmin$, $Ymin$, $Xmax$, $Ymax$ used for obtaining the size of one block are initialized. Variables $Xi$, $Yi$, are variables representing coordinates.

Variables Xmin and Xmax represent the minimum and the maximum value in the X-axis direction, respectively, while variables Ymin and Ymax represent the minimum and the maximum value in the Y-axis direction, respectively. At step b2, judgment is made when it is the end point of stroke data. The process moves to step b13 when it is the end point, otherwise moving to steps b3.

At step b3, ΔX is added to Xi and it is newly stored as Xi. ΔX represents the length in the X-axis direction between mutually adjacent points or point b3 and point b4 indicated in FIG. 20, for example. At step b4, judgment is made when the newly stored Xi is larger than Xmax or not. The process moves to step b5 when it is larger, otherwise moving to step b6. At step b5, the Xi is newly stored as Xmax. When the operation of step b5 is over, the process moves to step bS. At step b6, judgment is made whether the Xi is smaller than Xmin or not. The process moves to step b7 when it is smaller, otherwise moving to step b8. At step b7, the Xi is newly stored as Xmin. When the operation of step b7 is over, the process moves to step b8.

At step bS, ΔY is added to Yi and it is newly stored as Yi. ΔY represents the length in the Y-axis direction between mutually adjacent points or point b3 and point b4 indicated in FIG. 20, for example. At step b9, judgment is made whether the newly stored Yi is larger than Ymax or not. The process moves to step b10 when it is larger, otherwise moving to step b11. At step b10, Yi is newly stored as Ymax. When the operation of step b10 is over, the process moves to step b2. At step b11, judgment is made whether Yi is smaller than Ymin or not. The process moves to step b12 when it is smaller, otherwise moving to step b2. At step b12, Yi is newly stored as Ymin. When the operation of step b12 is over, the CPU 2 moves to step b2.

At step b13, Xw and Yw are determined from Xmin, Xmax, Ymin, Ymax obtained by the operations described above. Xw indicates the length in the X-axis direction of one block displayed while Yw indicates the length in the Y-axis direction. Namely, Xw is determined by subtracting Xmin from Xmax while Yw is determined by subtracting Ymin from Ymax. In the case of the characters indicated in FIG. 20, Xmin becomes the coordinate X of the point a1 while Xmax becomes the coordinate X of the point f10. Moreover, Ymin becomes the coordinate Y of the point e2 while Ymax becomes the coordinate Y of the point d3.

Figure 21:
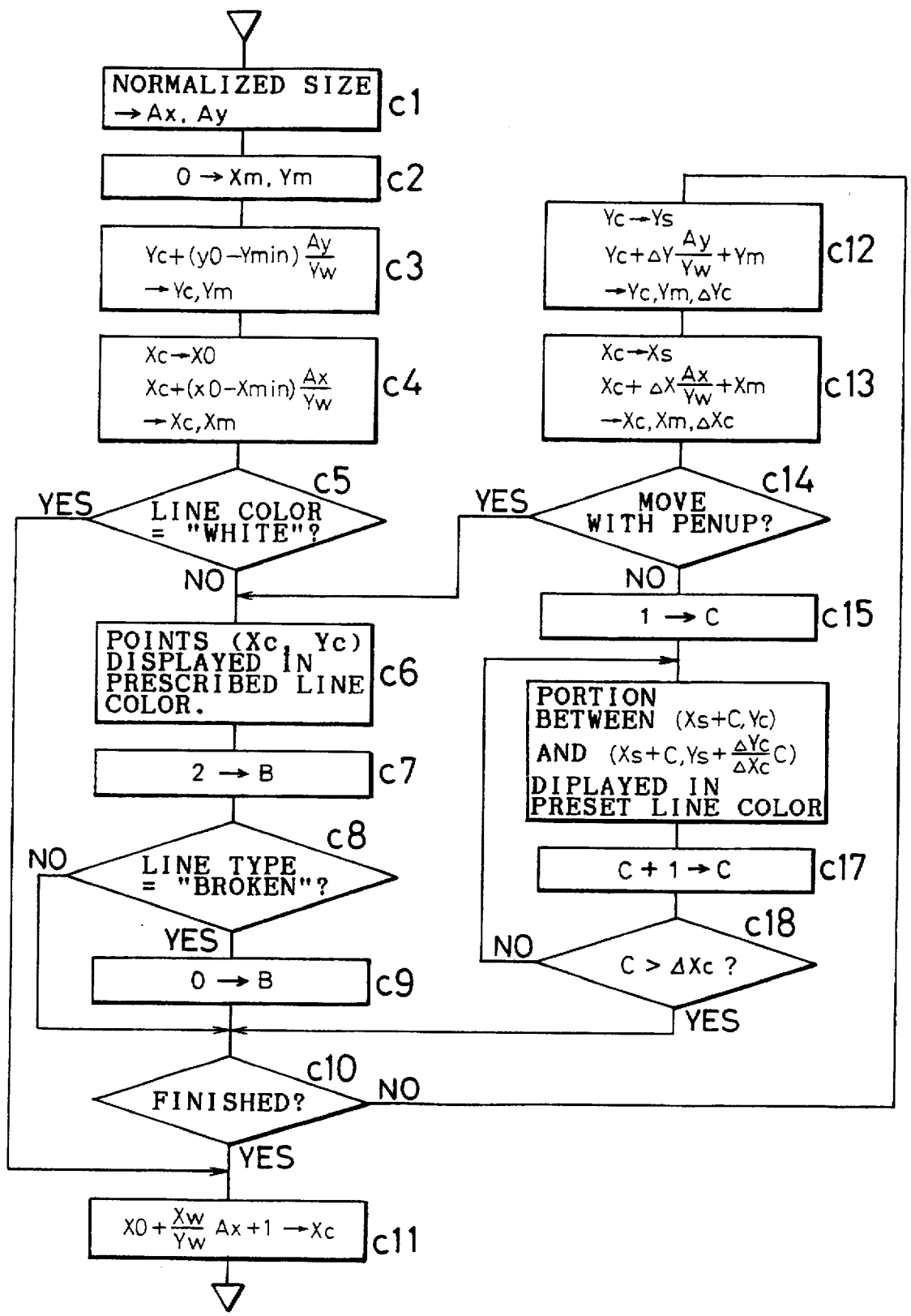
FIG. 21 is a flow chart showing a procedure of normalization for changing the stroke data to a size corresponding to the width of a line 23.
Figure 22:
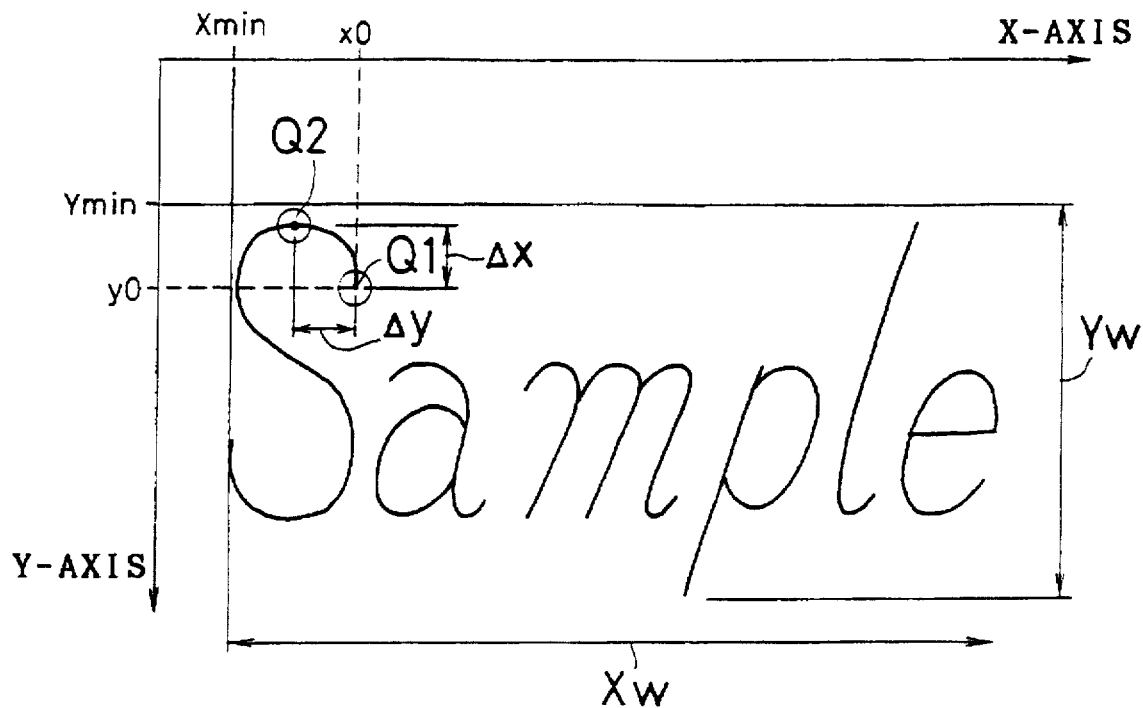
FIG. 22 is a plan view showing the coordinates in the case where image data inputted in handwriting is turned into stroke data.
Figure 23:
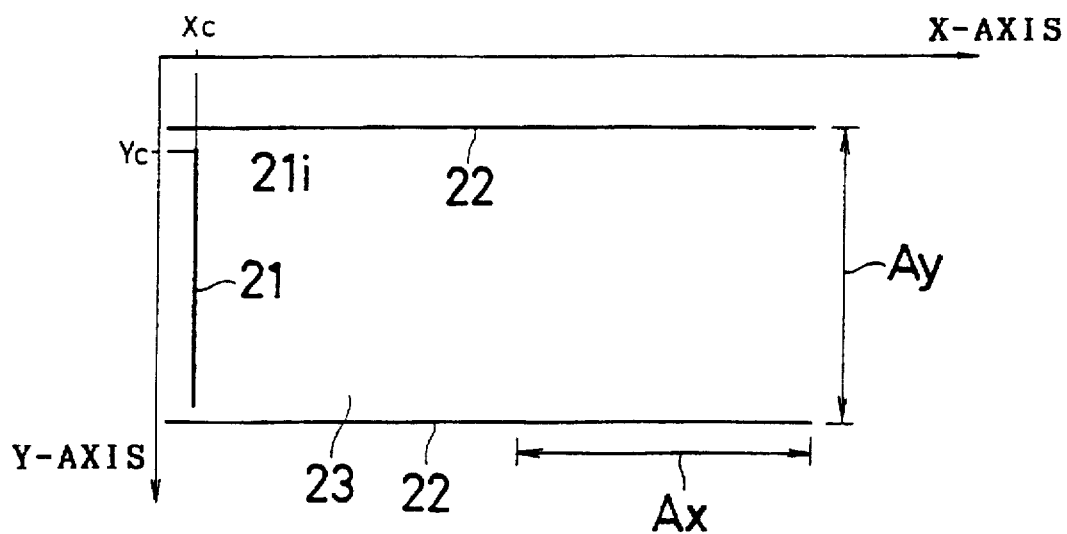
FIG. 23 is a plan view showing the coordinates of a display image displaying a stroke data.

FIG. 21 is a flow chart showing the procedure of normalization for changing the stroke data to a size corresponding to the width of the line 23. FIG. 22 is a plan view showing the coordinates in the case where image data inputted in handwriting is turned into stroke data. FIG. 23 is a plan view showing the coordinates of the display image displaying a stroke data. In FIG. 22 and FIG. 23, an X-axis is set in the right direction in the picture while a Y-axis is set in the downward direction.

At step c1, the selected normalization size is inputted in variables Ax, Ay. In Ay, the width (in the Y-axis direction) of the line 23 is inputted. In Ax, the length n the X-axis direction selected by Ax=Ay is inputted. At step c2, variables Xm, Ym are initialized. In Xm, the error in the X-axis direction obtained by normalization is inputted. In Ym, the error in the Y-axis direction is inputted.

At step c3, the display starting position Yc in the Y-axis direction is determined. As initial value, the coordinate of the Y-axis at the tip 21i of the cursor 21 is inputted. The display starting position Yc in the Y-axis direction is calculated with reference to the ratio of length Yw in the Y-axis direction of stroke data to normalization size Ay which is the width of line 23 (Ay/Yw). Namely, the starting position Yc for display corresponding to the point Q1 is obtained by adding the value obtained by multiplying the difference between the coordinate Y y0 of point Q1 and the minimum value Ymin in the Y-axis direction of stroke data by the reference value to Yc. Any fraction produced as a result of this calculation is rounded. The difference between the value obtained by rounding and the value not submitted to rounding is input ted as an error in Ym.

At step c4, the display starting position Xc in the X-axis direction is determined. Xc is determined by the same way as the display starting position Yc determined at step c3. Here, the initial value of Xc is stored in the variable X0. At step c5, judgement is made whether the line color stored in the block data is "white" or not. The process moves to step c11 when the line collar is white, otherwise advancing to step c6. At step c6, the coordinate points (Xc, Yc) determined at step c3 and step c4 are displayed in the selected line color. At step c7, 2 is inputted in the variable B. This variable B indicates the state of display of the coordinate points (Xc, Yc) according to the line type, and B=0 indicates the non display state of broken line, B=1 indicates the display state of a broken line and B=2 represents a solid line.

At step c8, judgement is made whether the line type data is that of broken line or not. The process moves to step c9 in the case of broken line, otherwise moving to step c10. At step c9, 0 is inputted in the variable B because it is a case where the line type data is that of broken line and the next coordinate point gets in the non-displayed state. At step c10, judgement is made whether the display of the stroke data is over or not. The process moves to step c11 when the display is over, otherwise moving to step c12.

At step c11, the position of the cursor 21 is determined. The position of the cursor 21 in the X-axis direction can be determined by adding the value obtained by multiplying the length Xw in the X-axis direction of stroke data by the reference value to the X0 and also adding "1" to it. The addition of the value "1" is made for the purpose of providing a blank for one dot between (the current block) and the previous block. Since the length in the Y-axis direction of the cursor 21 is predetermined, the cursor 21 can be displayed by simply determining its position in the X-axis direction. The value obtained by this operation is inputted in Xc.

At step c12, the display position in the Y-axis direction of the next point is determined. First, the value of Yc is stored in Ys. The display position in the Y-axis direction can be determined by adding the value obtained by multiplying the length ΔY in the Y-axis direction of point Q1 and point Q2 by the reference value to Yc and by also adding the Ym to it. Any fraction produced as a result of this calculation is rounded. The value obtained is newly inputted in Yc. Moreover, the difference between the value obtained Yc and the value Yc of previous time is inputted in ΔYc. The difference between the value obtained by rounding and the value not submitted to rounding is newly inputted as error in Ym.

At step c13, the display position in the X-axis direction of the next point is determined. The display position in the X-axis direction can be determined by the same way as that at step c12. At step c14, judgement is made whether the portion between Q1 and Q2 is in the PENUP state or not. The process moves to step c6 when it is in the PENUP state, otherwise advancing to step c15.

At step c15, 1 is inputted in the variable C. The variable C corresponds to the number of dots in the X-axis direction.

At step c16, the dots found between the prescribed coordinate points (Xs+C, Yc) to (Xs+C, Ys +(ΔYc/ΔXc) C) determined by the method described later are displayed in the prescribed line color. At step c17, the value 1 is added to the variable C which is newly stored as variable C. At step c18, judgement is made whether the variable C is larger than ΔXc or not. The process moves to step c10 when it is larger, otherwise moving to step c16.

Figure 24:
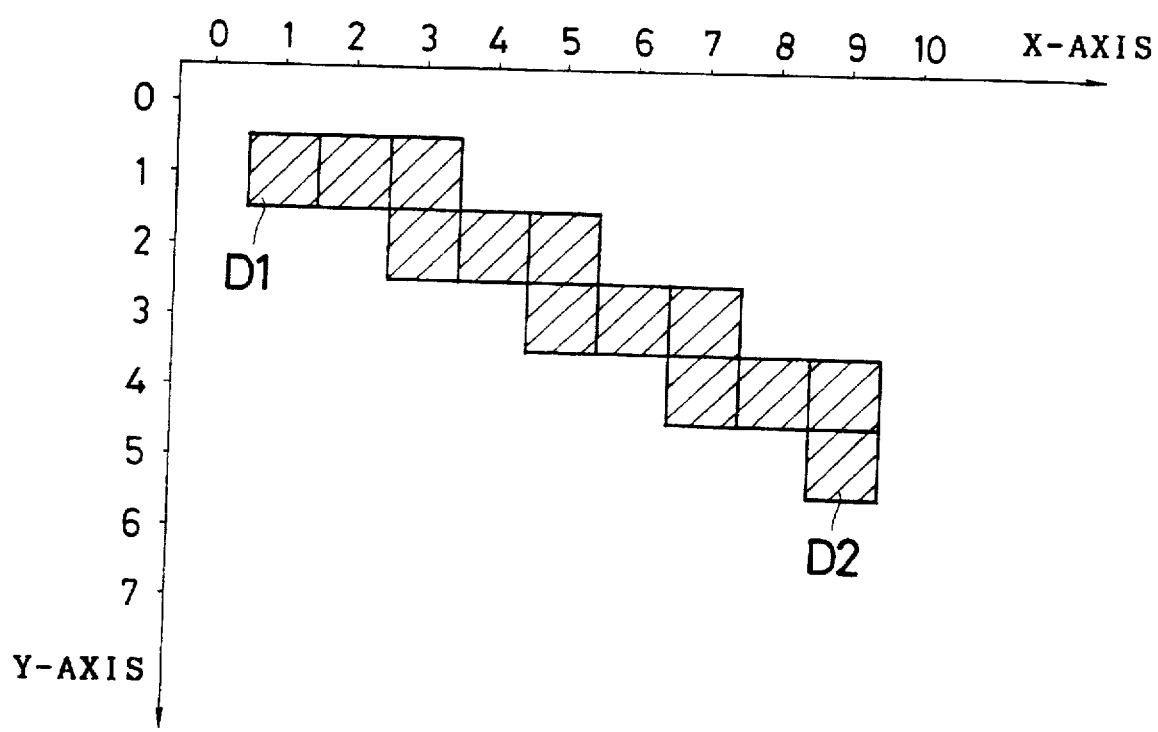
FIG. 24 is a plan view showing an expanded view of the display image.

FIG. 24 is a plan view showing an expanded view of the display image. In the picture of FIG. 24, the right direction represents the number of dots in the X-axis direction while the downward direction indicates the number of dots in the Y-axis direction. Explanation will be given of a case, for example, where it is desired to display in such a way that the point D1 expressed with (1,1) and the point D2 expressed with (9,5) form a straight line. The points D1, D2 are in the displayed state. At step c16, the dots in the portion from (Xs+C, Yc) to (Xs+C, Ys+(ΔYc/ΔXc) C) are displayed. Since Xs=1, C=1, Yc=1, ΔYc=5−1=4, ΔXc=9−1=8, the dots in the portion from (2,1) to (2,1.5) get in the displayed state. Ys+(ΔYc/ΔXc) C is newly stored as Yc. At step c17, C is given as C=2. At step c18, judgement is made whether the variable C is larger than ΔXc or not. The process moves to step c16 because the variable C is smaller in this case. The same motions are repeated thereafter and the dots in the portion (1,1) to (9,5) are put in the displayed state. The dots displayed by such operations come to be indicated by shaded lines of FIG. 24.

Figure 25:
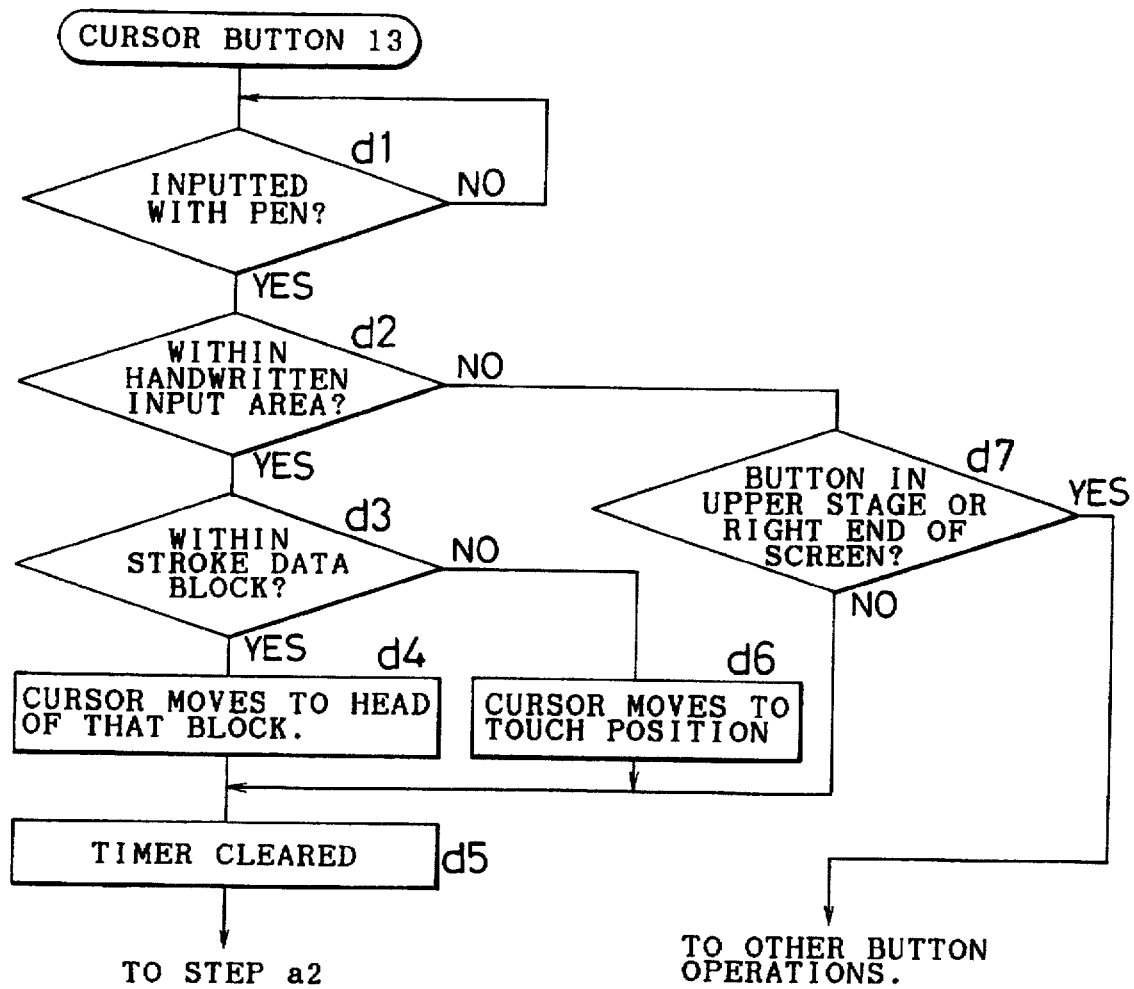
FIG. 25 is a flow chart showing the processing in the case where a cursor button 13 is indicated.

FIG. 25 is a flow chart showing the processing in the case where the cursor button 13 is indicated. At step d1, judgement is made whether any pen input has been made or not. The process moves to step d2 when it judges that some pen input has been made but remains on standby while step d1 is repeated until any pen input is made when it judges that no pen input has been made. At step d2, judgement is made whether the pen input made at step d1 has been made in the area of input in handwriting namely in the input/display area 20 for characters or not. The process moves to step d3 when the pen input has been made in the input/display area 20 for characters, moving to step d7 when the pen input was made out of the input/display area 20 for characters.

At step d3, judgement is made whether the pen input made at step d1 has been made in any block of the plurality of blocks displayed in the input/display area 20 for characters or not. Namely, judgement is made whether any of the plurality of blocks was indicated with the pen. The process moves to step d4 when the pen input was made in some block, and the process moves to step d6 when the pen input was made out of the blocks. At step d4, the cursor 21 is moved to the head of the block indicated with the pen. The process moves to step d5 to clear the timer and then shifts to step a2. At step d6, the cursor 21 is moved to the position indicated with the pen and the process moves to step d5.

At step d2, the process will move to step d7 when the pen input was made out of the input/display area 20 for characters. Judgement is also made whether the button in the upper stage such as W button 12 or the button on the right edge such as upper scroll button 24 has been indicated with the pen or not. The operation corresponding to the indicated button is performed when the upper button or the button on the right edge has been indicated, but the process moves to step d5 when neither the upper button nor the button on the right edge has been indicated.

In this way, the operator can freely move the cursor 21 to the desired position in the input/display area 20 for characters.

Figure 26:
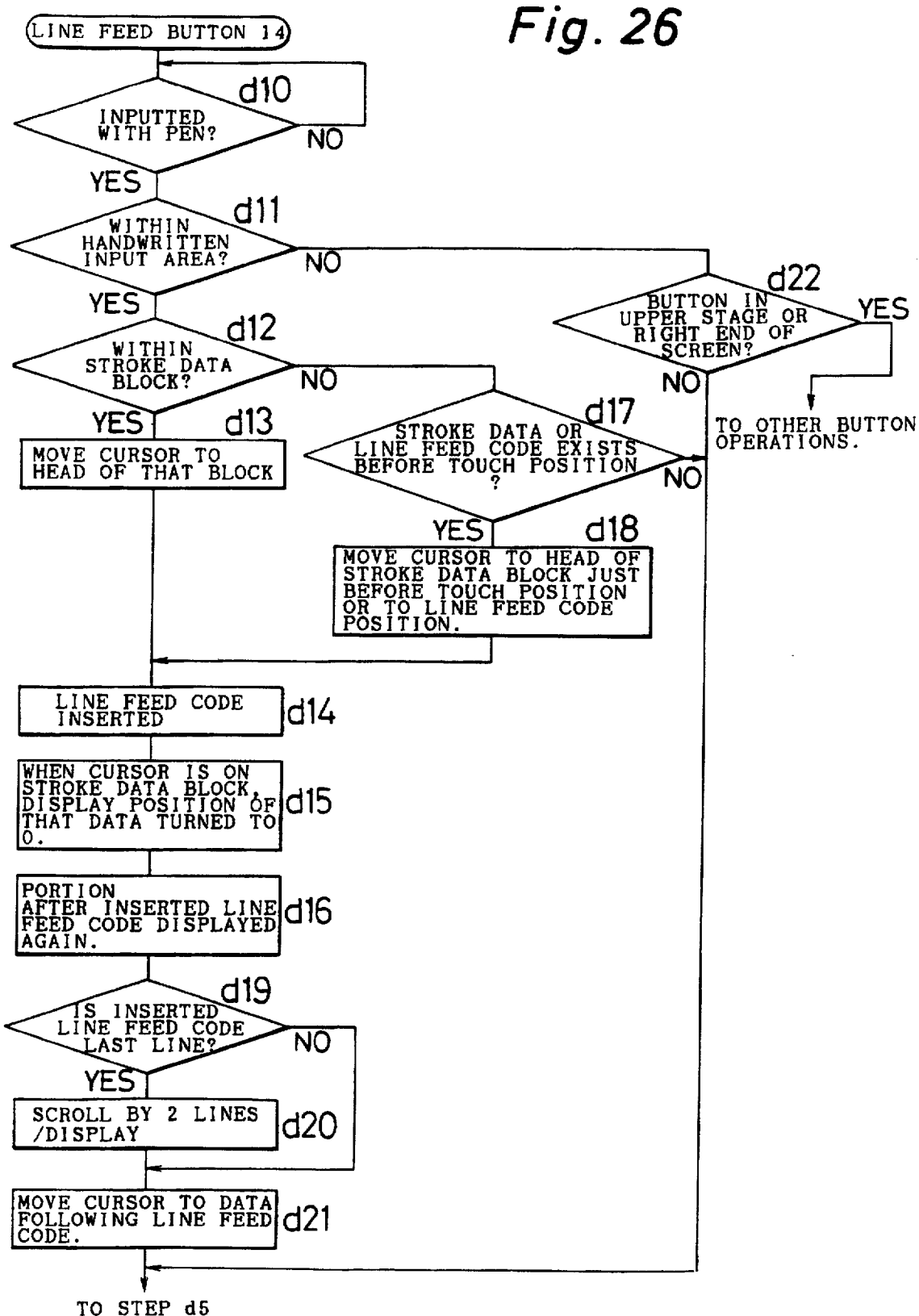
FIG. 26 is a flow chart showing the processing in the case where a line feed button 14 is indicated.

FIG. 26 is a flow chart showing the processing in the case where the line feed button 14 is indicated. At step d10, judgement is made whether any pen input has been made or not. The process moves to step d11 when it judges that some pen input has been made but remains on standby while step d10 is repeated until any pen input is made when it judges that no pen input has been made. At step d11, judgement is made whether the pen input made at step d10 was made in the area of input in handwriting i.e. in the input/display area 20 for characters or not. The process moves to step d12 when the pen input was made in the input/display area 20 for characters, but to step d22 when the pen input was made out of the input/display area 20 for characters.

At step d12, judgement is made when the pen input made at step d10 was made in some block of the plurality of blocks displayed in the input/display area 20 for characters or not. Namely, judgement is made when any of the plurality of blocks was indicated with the pen. The process moves to step d13 when some block was indicated i.e. in the case where the block 132 displayed on the line 23a in the first line in the input/display area 20 for characters as shown in FIG. 27A, for example, was indicated but to step d17 when no block was indicated.

Figure 27A:
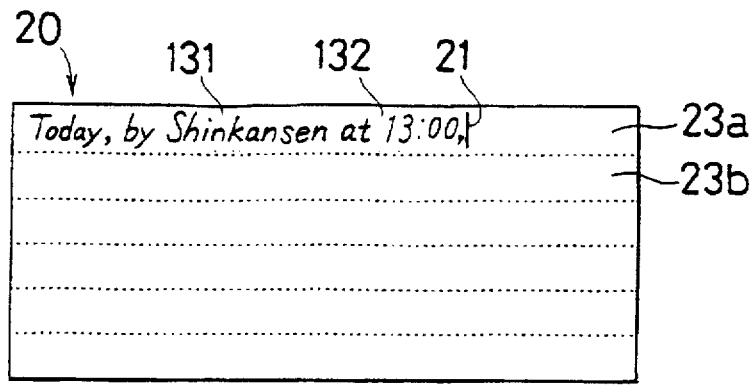
FIGS. 27A to 27D are drawings showing in progressive steps an image displayed in the character input/display area 20 at the time of line feed.

At step d13, the cursor 21 is moved to the head of the block indicated with the pen or to the head of the block 132 indicated in FIG. 27A, for example, and the process moves to step d14.

At step d17, judgement is made whether, in the line 23 in which the position indicated with the pen is included, there is any scroll data or line feed code before the position indicated with the pen or not. The process moves to step d18 when it is judged that there exists such data or code but to step d5 of FIG. 25 when it is judged otherwise. At step d18, when, in the line 23 in which the position indicated with the pen is included, the data immediately before the indicated position i.e. the data closest to the indicated position is a block data, the cursor 21 is moved to the head of that block data. In the case where the data closest to the indicated position is a line feed code, the cursor 21 is moved to the position of line feed code and the operation moves to step d14.

By the process operation of steps d17, d18, the cursor 21 is moved to the head of the block 132, for example, in the case where the position on the right side of the block 132 on the line 23a in the first line in the input/display area 20 for characters shown in FIG. 27A was indicated with the pen.

At step d14, a line feed code is inserted in the position of the cursor moved in the previous step d13 or step d18 and the CPU 2 moves to step d15. If the cursor position is at the head of the stroke data, the display position of that stroke data is set as 0, the distance between that stroke data and the data immediately before that stroke data is set as 0, a line feed code between that stroke data and the data immediately before that stroke data is inserted, and then the operation moves to step d16.

At step d16, the portion after the line feed code inserted at step d14 is displayed again. This consists in once clearing the portion after the cursor position in the input/display area 20 for characters and displaying the data after the line feed code inserted at step d14 from the head of the line subsequent to the line to which the position indicated with the pen at step d10 belongs until the bottom line in the input/display area 20 for characters is filled i.e. until the time when scrolling of the screen is required for displaying any further, and then the CPU 2 moves to step d19.

Figure 27B:
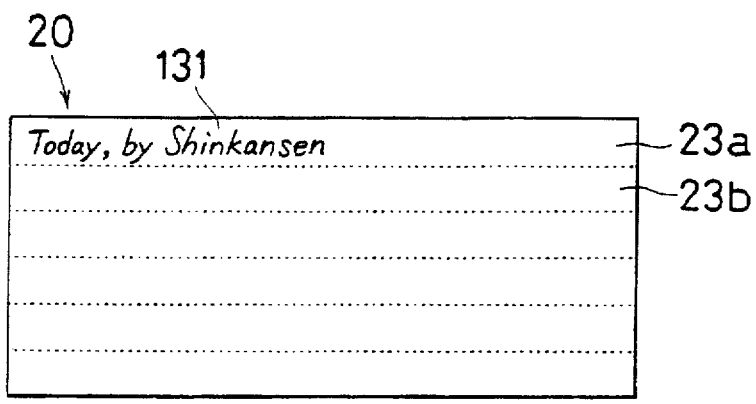
Figure 27C:
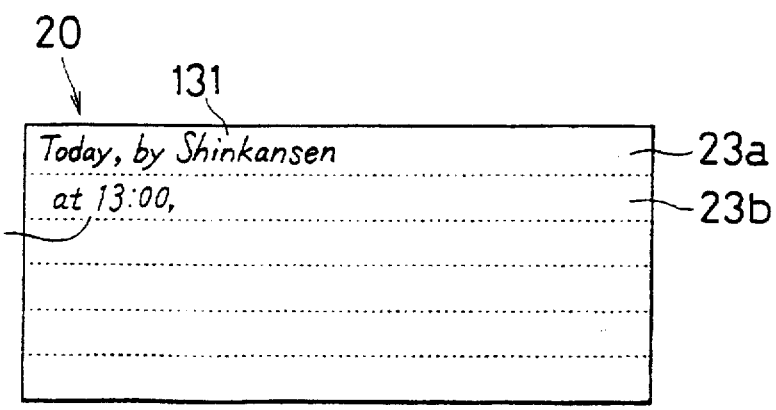

In the case where, with those operations of step d14, step d15 and step d16, the cursor 21 was moved to the head of the block 132 at step d13 or step d18, for example, a line feed code is inserted at the position of the cursor 21 at step d14, the portion after the line feed code i.e. the block 132 is cleared at step d15 as shown in FIG. 27B and the block 132 is displayed at the head of the line 23b in the second line at step d16 as shown in FIG. 27C.

At step d19, judgement is made whether the line feed code inserted at step d14 is positioned in the bottom line in the input/display area 20 for characters or not. When the line feed code is positioned in the bottom line, the operation moves to step d20 without making any redisplaying of data of step d16 mentioned before, the display image in the input/display area 20 for characters upward is scrolled by 2 lines, the data after the position of the line feed code inserted at step d14 in the bottom line and the line immediately above the bottom line is displayed, and the operation moves to step d21. In the case where the inserted line feed code is judged as not positioned in the bottom line at step d19, the operation moves to step d21 without passing through step d20 because the redisplaying of data of the earlier step d16 is made at least on one line.

Figure 27D:
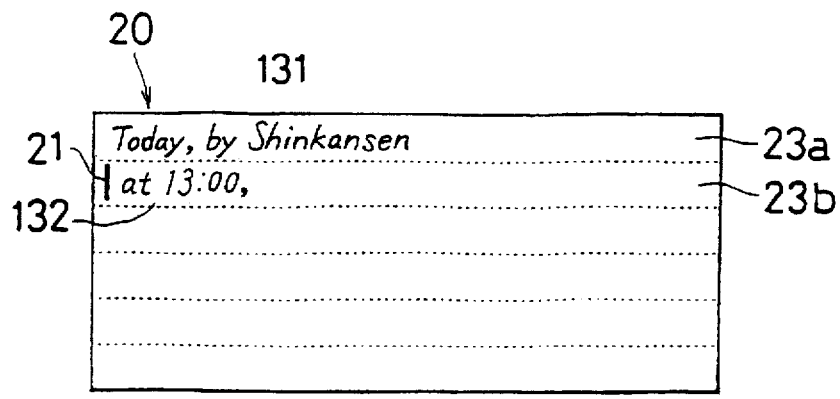

At step d21, the cursor 21 is moved onto the data following the line feed code inserted at step d14 to be displayed at the head of the line after the line feed code inserted at step d14, and the CPU 2 moves to step d5. With this operation of step d21, the cursor 21 is displayed at the head of the block 132 as shown in FIG. 27D.

If, at step d11 mentioned earlier, the pen input was made out of the input/display area 20 for characters, the CPU 2 moves to step d22 and judgement is also made whether the button in the upper stage such as W button 12 or the button on the right edge such as upper scroll button 24 has been indicated with the pen or not. The operation corresponding to the indicated button is performed when the upper button or the button on the right edge has been indicated, but the operation moves to step d5 when neither the upper button nor the button on the right edge has been indicated.

Figure 28:
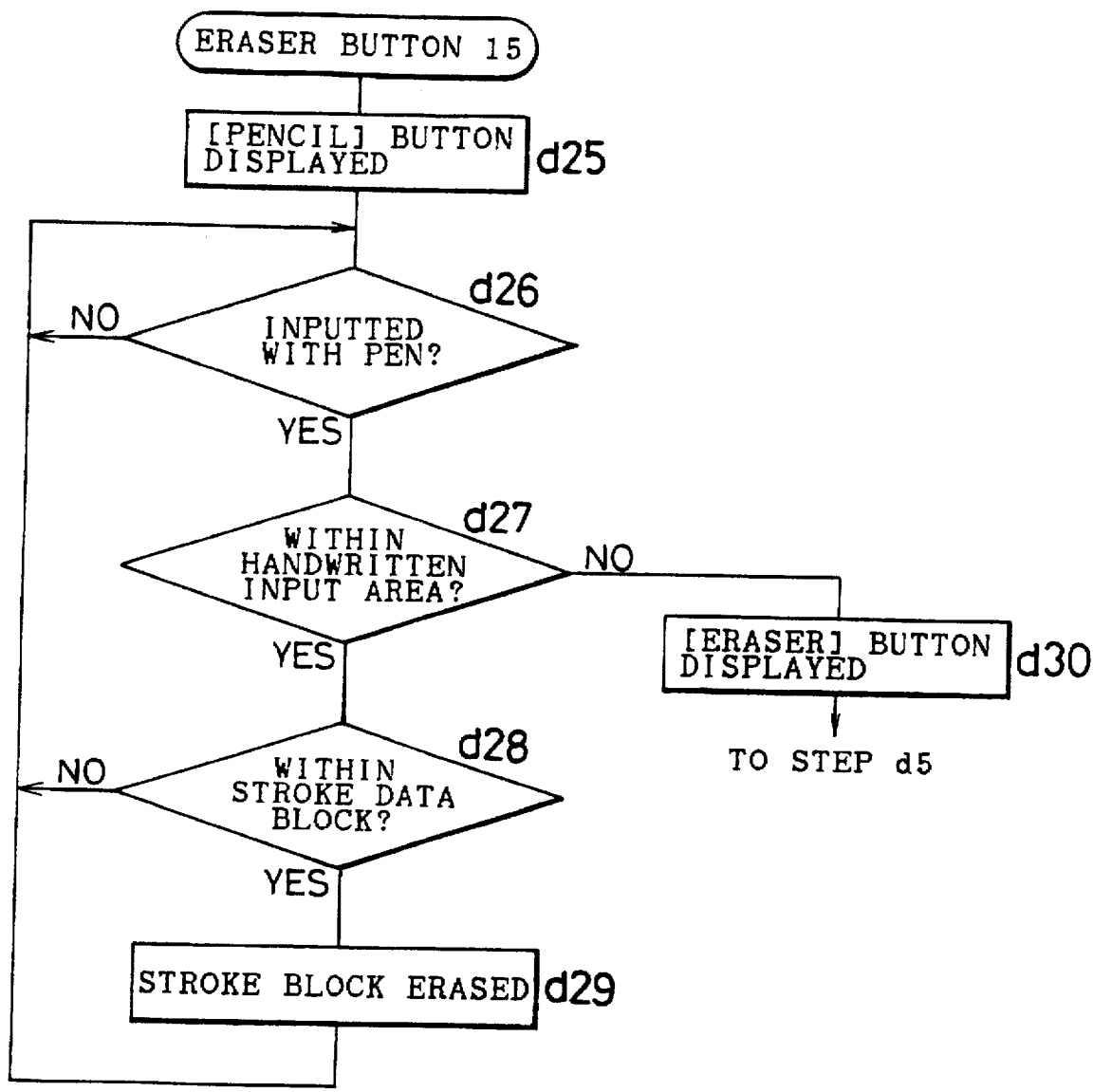
FIG. 28 is a flow chart showing the motion in the case where an eraser button 15 is indicated.
Figure 29A:
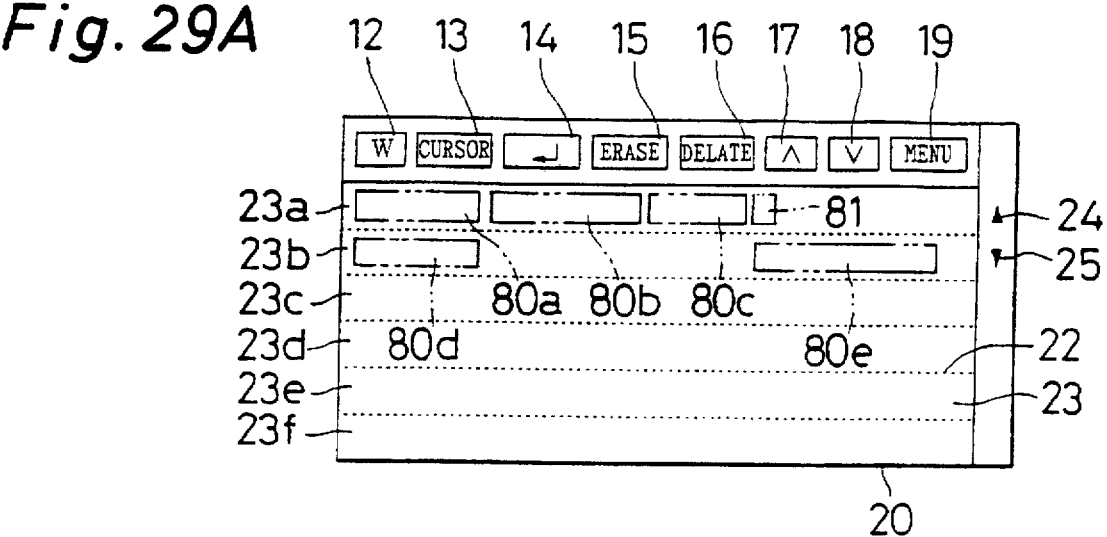
FIGS. 29A, 29B are plan views showing in progressive steps the display image in the case where the eraser button 15 is indicated.
Figure 29B:
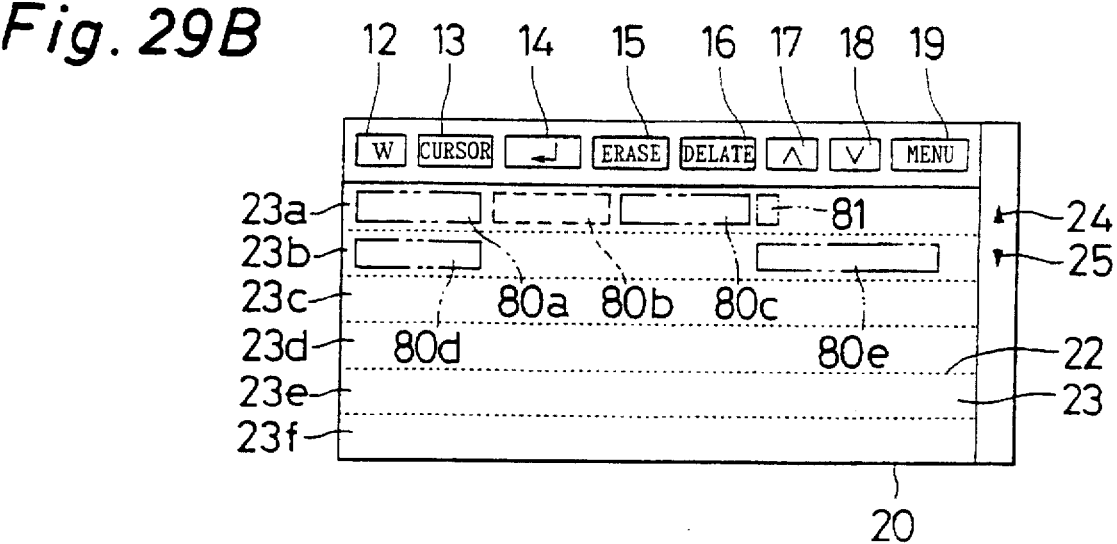

FIG. 28 is a flow chart showing the motion in the case where the eraser button 15 is indicated. FIGS. 29A, 29B are plan views showing in progressive steps the display image in the case where the eraser button 15 is indicated. Blocks 80a to 80c are displayed in this order in the first line 23a in the input/display area 20 for characters while a line feed area 81 expressed with a line feed code is set after the block 80c. In the second line 23b, blocks 80d, 80e are displayed in this order. A blank is set between block 80d and block 80e.

At step d25, the eraser button 15 which was displayed is converted to the pencil button and this pencil button is displayed. At step d26, judgement is made on the basis of the output from the touch panel 8 whether there is any input with the input pen 11. The process moves to step d27 when there is some pen input. At step d27, judgement is made whether the position of the pen input is in the input/display area 20 for characters or not. The process moves to step d28 when the pen input position is in the input/display area 20 for characters, otherwise to step d30. At step d28, judgement is made whether the position of the pen input is in the block displayed with the stroke data or not. The process moves to step d29 when the position is in the block, otherwise to step d26.

At step d29, the characters in the block including the position indicated with the input pen 11 are erased. When, for example, the block 80b indicated in FIG. 29A is indicated, the display of the block 80b is erased as shown in FIG. 29B. The area where the characters are erased becomes blank. At that time, the block data stored in the RAM 4 is also erased. When there is any block data after the erased block data i.e. any block data corresponding to block 80c in FIG. 29, the display position data 57 of that block data 80c is changed to a data constituted by the stored display position data plus the display position data of the block data corresponding to block 80c and this data is newly stored. When the operation of step d29 is over, the process moves to step d26. At step d30, the eraser button 15 is displayed in place of the pencil button. When the operation of step d30 is over, the process moves to step d5.

Figure 30:
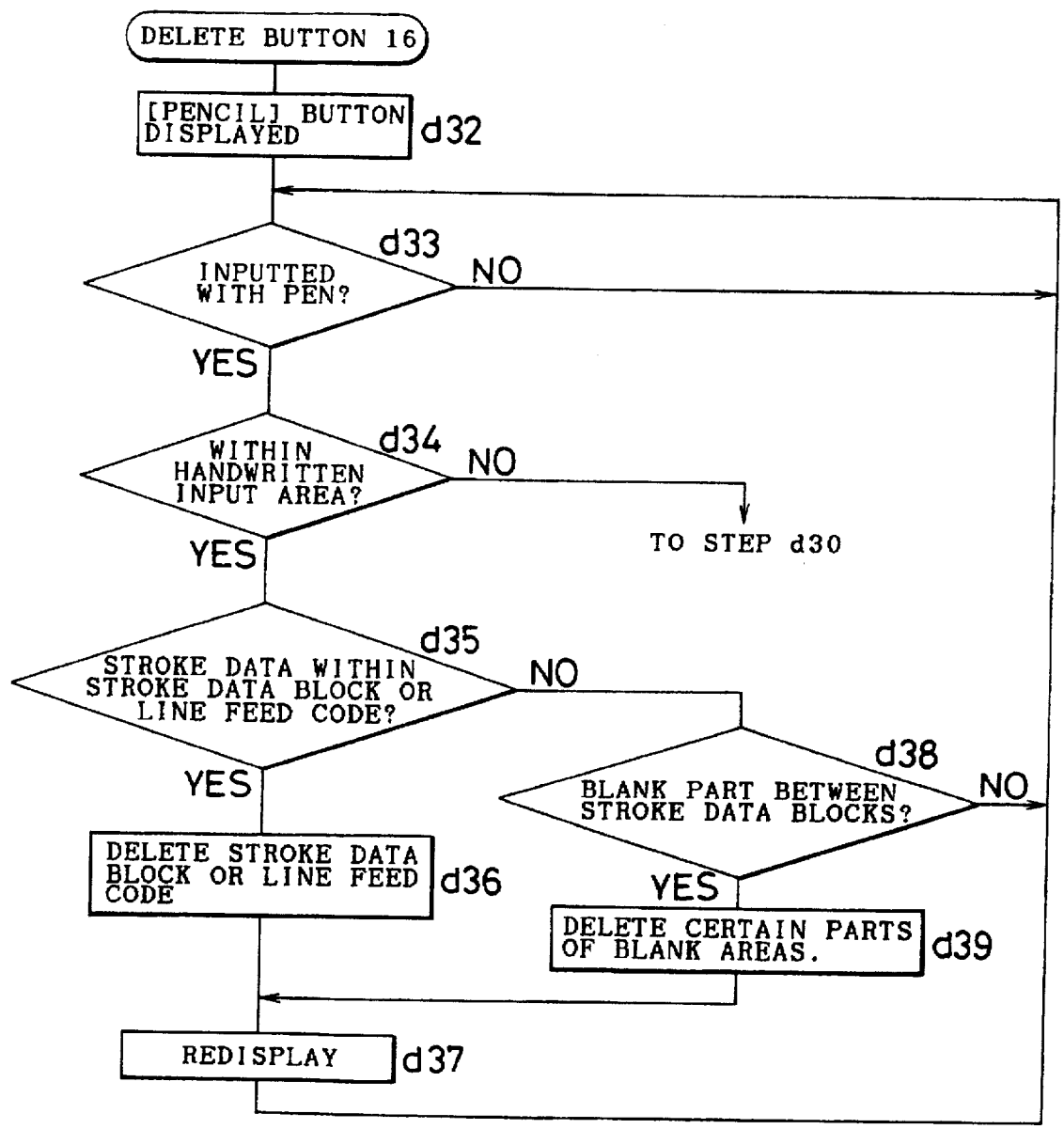
FIG. 30 is a flow chart showing the motion in the case where a delete button 16 is indicated.
Figure 31A:
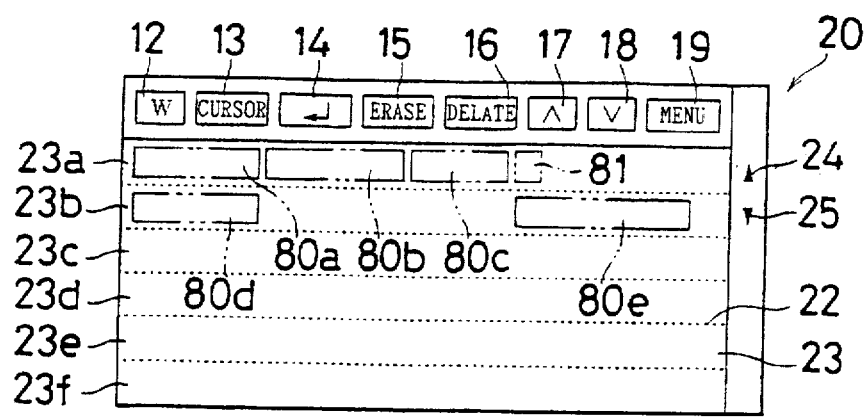
FIGS. 31A to 31D are plan views showing in progressive steps the display image in the case where the delete button 16 is indicated.

FIG. 30 is a flow chart showing the motion in the case where the delete button 16 is indicated. FIGS. 31A to 31D are plan views showing in progressive steps the display image in the case where the delete button 16 is indicated. The display image indicated in FIG. 31A is the same as that of FIG. 29A. At step d32, the pencil button is displayed in place of the delete button 16. At step d33, judgement is made whether there is any pen input with the input pen 11 or not. The process moves to step d34 when there is some pen input. At step d34, judgement is made whether the position of the pen input is in the input/display area 20 for characters or not. The process moves to step d35 when the pen input position is in the input/display area 20 for characters, otherwise to step d30. At step d35, judgement is made whether the position of the pen input is in the block displayed with the stroke data or not. Judgement is also made whether the position of the, pen input is in the line feed area 81 displayed in correspondence to the line feed code or not. The process moves to step d36 when the position is in the block or in the line feed area 81, otherwise to step d38. At step d36, the block data including stock data in the block including the pen input position or the line feed code are erased from inside the RAM 4. At step d37, the data from which the block data or line feed code has been erased is displayed again. When the operation of step d37 is over, the process returns to step d33.

Figure 31B:
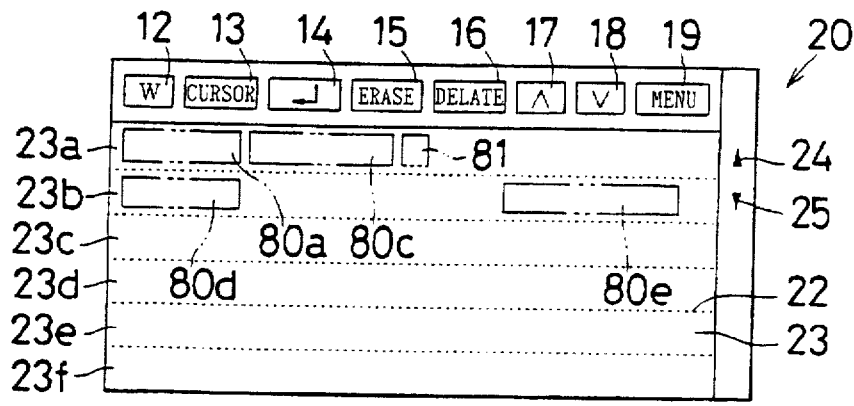
Figure 31C:
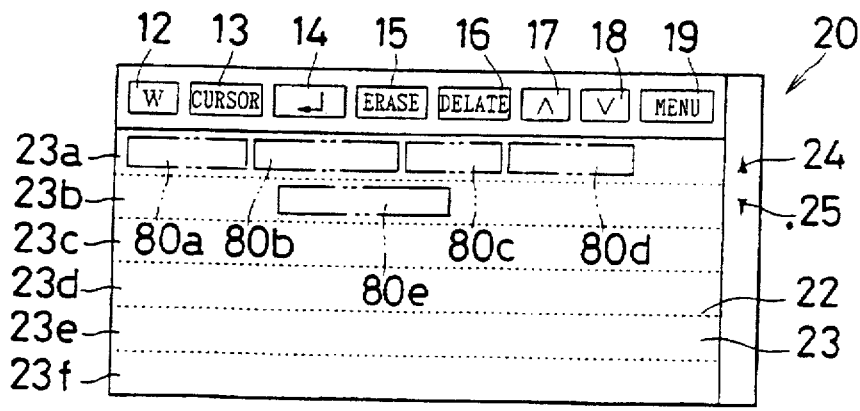

In the case where the block 80b given in FIG. 31A is indicated, for example, the display of the block 80b is erased and the block 80c is displayed following the block 80a as shown in FIG. 31B. In that case, the display position data 57 corresponding to the block data 80c remains unchanged. Moreover, in the case where the line feed area 81 given in FIG. 31A is indicated, the line feed area 81 is erased and the block 80d is displayed following the block 80c as shown in FIG. 31C.

At step d38, judgement is made whether the position of the pen input is in the blank portion provided between blocks or not. The process moves to step d39 when the pen input position is in the blank portion but to step d33 when it is not. At step d39, the blank portion including the pen input position is deleted by a predetermined amount. This can be realized, for example, by reducing the value of the display position data 57 of the block data corresponding to the block displayed following the block including the pen input position by a predetermined amount. In the case where the value of the display position data 57 is smaller than a predetermined amount, the display position data is given as 0. When the operation of step d39 is over, the process moves to step d37.

Figure 31D:
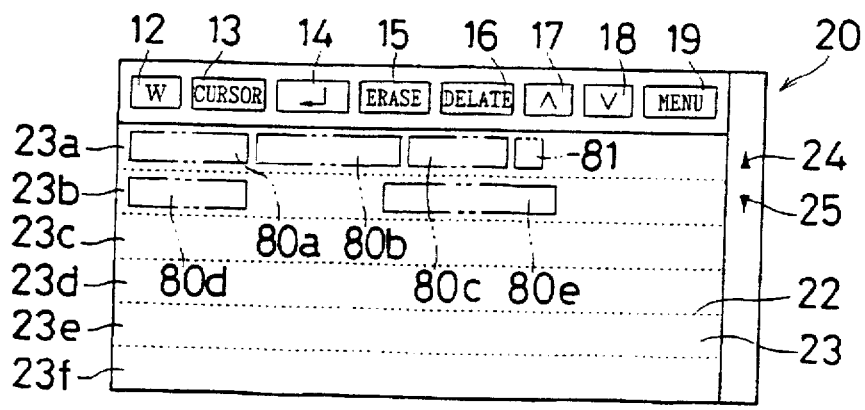

In the case where the blank portion between the block 80d and the block 80e given in FIG. 31A is indicated, for example, the value of the display position data 57 of the block data corresponding to the block 80e is reduced by a predetermined amount. As a result, the display image becomes as shown in FIG. 31D.

Figure 32:
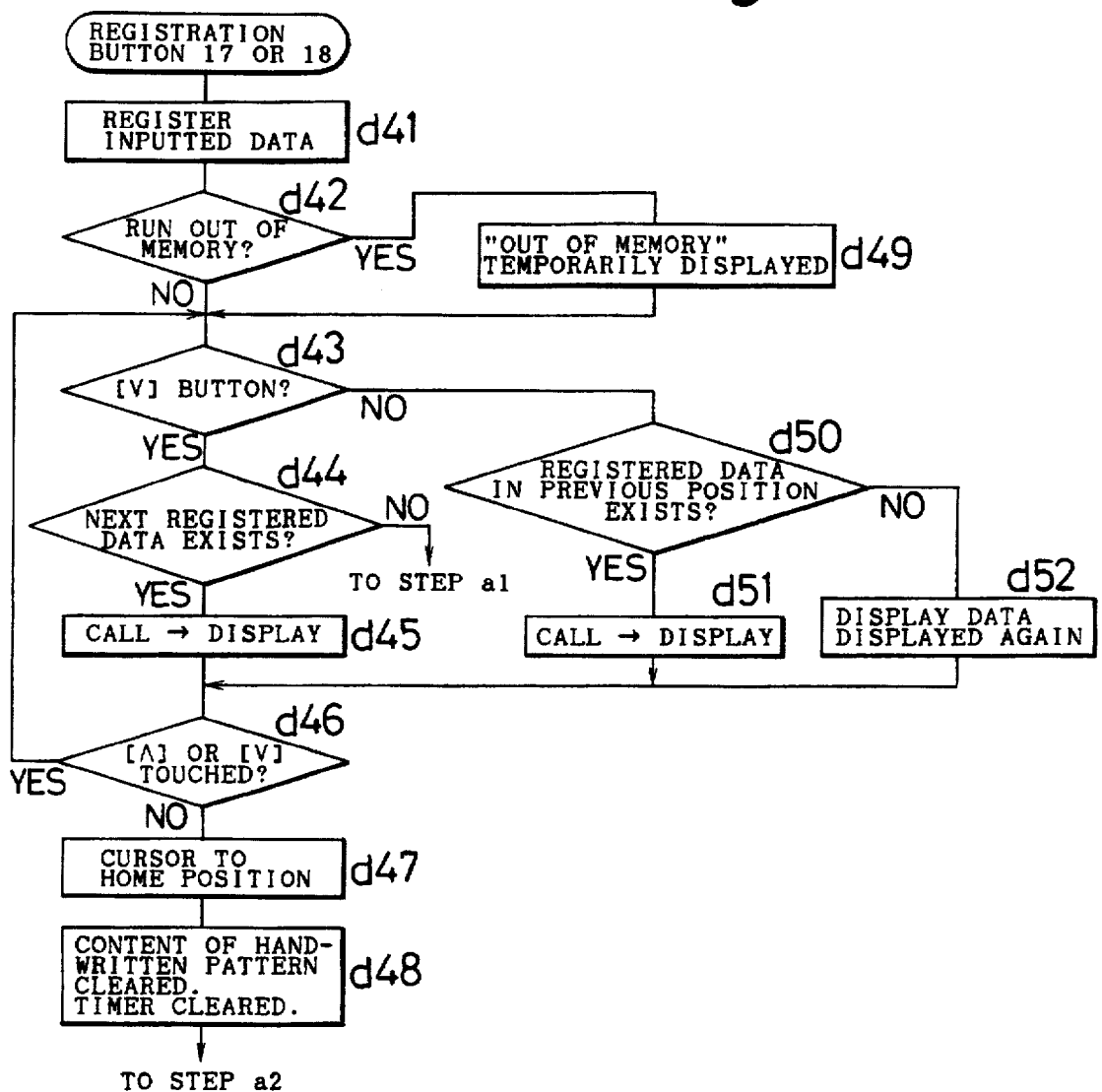
FIG. 32 is a flow chart showing the motion in the case where either a registration button 17 or a registration button 18 is indicated.

FIG. 32 is a flow chart showing the motion in the case where either the registration button 17 or the registration button 18 is indicated. At step d41, the image data inputted in handwriting is submitted to processing for turning into stroke data and one independent data including the stroke data obtained is registered. At step d42, the memory capacity available for registration in the RAM 4 is compared with the capacity of the independent data and judgement is made whether the data has been stored in the RAM 4 or not. In the case where the data could not be stored because of a shortage of the memory in the RAM 4, the process moves to step d49 giving a display of "Memory short", for example, in the input/display area 20 for characters. When the operation of step d49 is over, the process moves to step d43. When the data could be stored in the RAM 4 at step d42, the process moves to step d43. At step d43, judgement is made whether the registration button 17 has been indicated or not. The process moves to step d44 when the registration button 17 has been indicated, otherwise, i.e. when the registration button 18 has been indicated, to step d50.

At step d44, judgement is made whether there is any registered independent data after the registered independent data or not. The process moves to step d45 when there is any registered independent data in the next position but to step a1 when there is no such data. At step d45, the independent data registered in the next position is called and displayed in the input/display area 20 for characters. At step d46, judgement is made whether either the registration button 17 or the registration button 18 has been indicated or not. The process moves to step d43 when the button 17 or 18 has been indicated but to step d47 when no indication has been made. At step d47, the cursor 21 is displayed in the home position of the input/display area 20 for characters i.e. at the left top on the display image. At step d48, the content of the handwritten pattern is erased and the timer is initialized. When the operation of step d48 is over, the process moves to step a2.

At step d50, judgement is made whether there is any registered independent data immediately before the registered independent data or not. The process moves to step d51 when there is any registered independent data but to step d52 when there is no such data. At step d51, the independent data in the preceding position is read out and displayed in the input/display area 20 for characters. When the operation of step d51 is over, the process moves to step d46. At step d52, the data which was displayed before is displayed again. When the operation of step d52 is over, the process moves to step d46.

Figure 33:
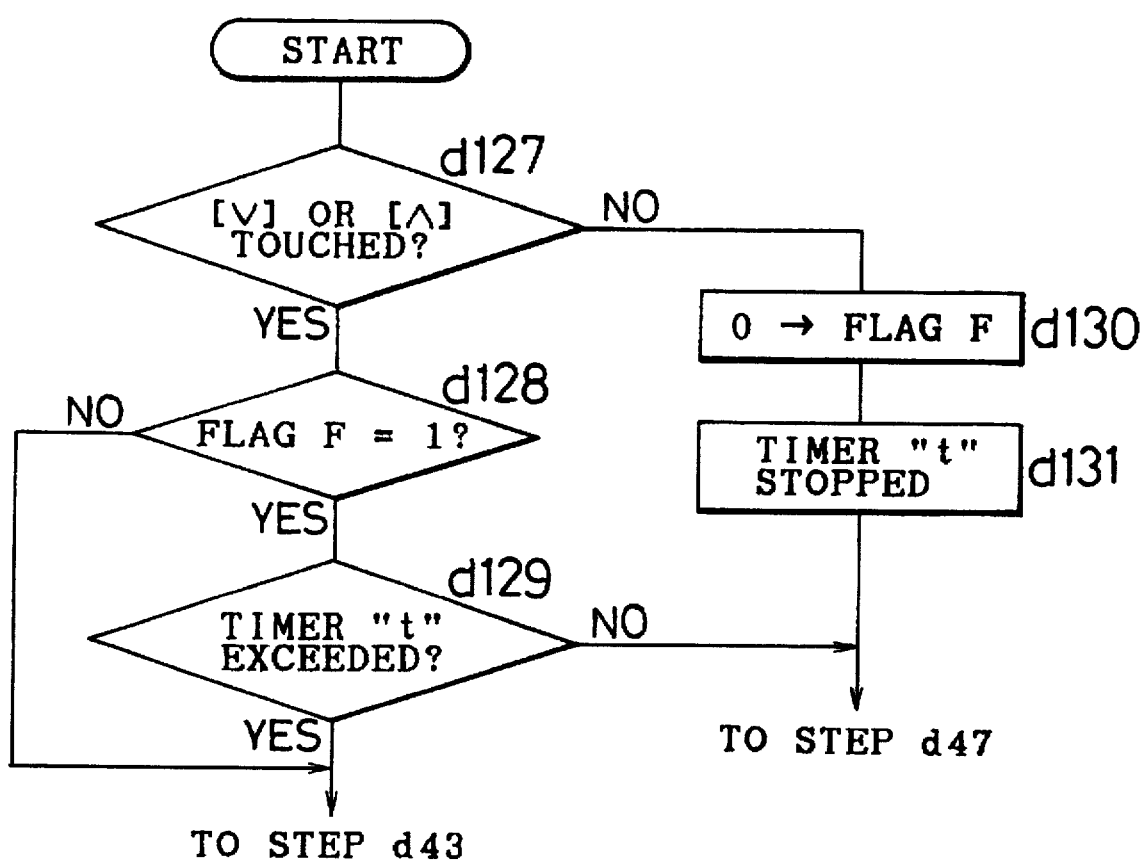
FIG. 33 is a flow chart showing the motion of ensuring that either the registration button 17 or the registration button 18 has been indicated.

FIG. 33 is a flow chart showing the motion of checking whether either the registration button 17 or the registration button 18 has been indicated. At step d127, judgement is made whether either the registration button 17 or the registration button 18 has been indicated or not. The process moves to step d128 when the button 17 or 18 has been indicated but to step d130 when no indication has been made. At step d128, judgement is made whether the flag F is "1" or not. The process moves to step d129 when the flag F is "1" but to step d43 when it is not "1". The case where the flag F is not "1" is a case where the registration buttons 17, 18 have been newly indicated.

At step d129, judgement is made whether either the registration button 17 or the registration button 18 has been indicated for more than the predetermined time or not. Namely, the time set in advance on the timer "t" is counted and judgement is made whether the set time has been exceeded or not. The process moves to step d43 when set time has been exceeded but to step d47 when it has not been exceeded.

At step d130, which is a case where no registration buttons 17, 18 have been indicated, and 0 is inputted in the flag F. At step d131, the timer "t" is stopped. When the operation of step d131 is over, the process moves to step d47. By indicating the registration buttons 17, 18 with such operation, it may be judged whether the displayed data has been switched or not.

Figure 34:
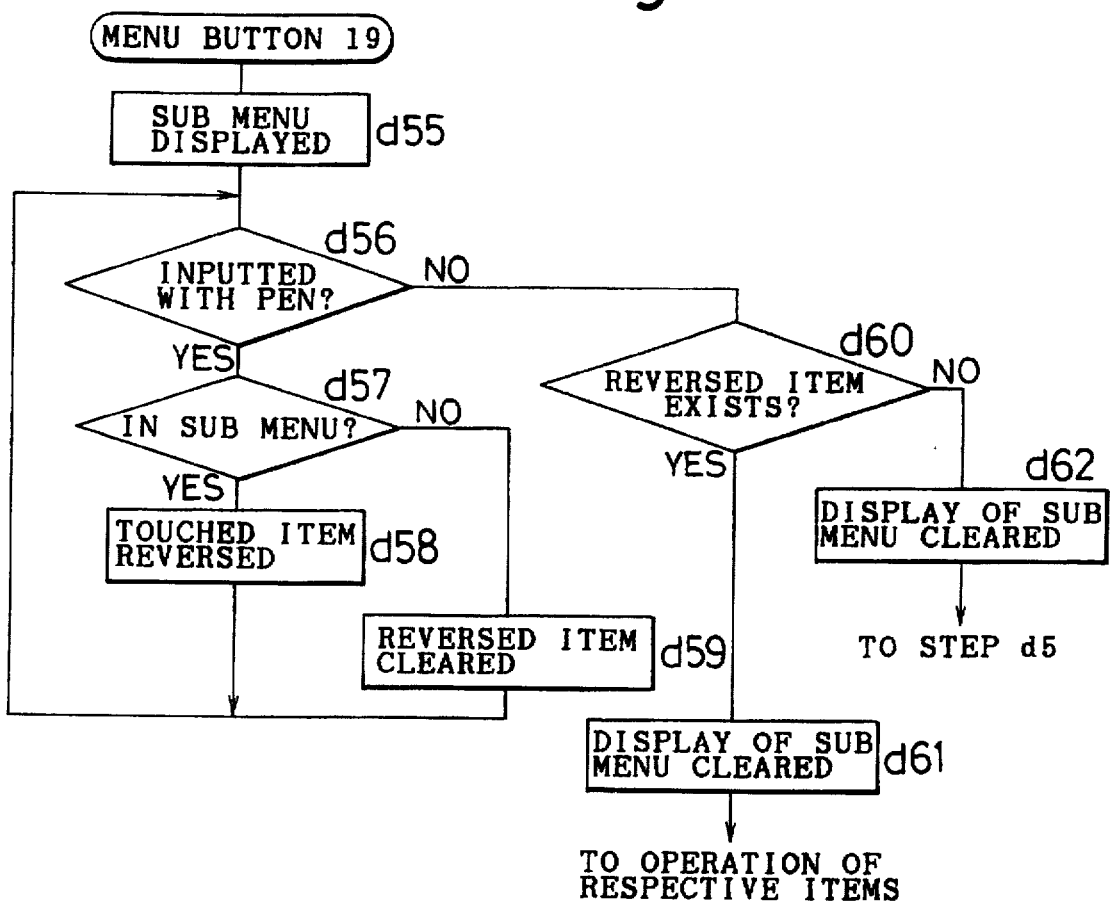
FIG. 34 is a flow chart showing the motion in the case where a menu button 19 is indicated.

FIG. 34 is a flow chart showing the motion in the case where the menu button 19 is indicated. At step d55, the sub-menu i.e. the menu picture 38 is displayed. At step d56, judgement is made whether there was any pen input with the input pen 11 or not. The process moves to step d57 when there was some pen input, otherwise to step d60. At step d57, judgement is made whether the position of the pen input is in the sub-menu picture 38 or not. The process moves to step d58 when the pen input position is in the sub-menu picture 38 but to step d59 when it is not. At step d58, the indicated item in the sub-menu picture 38 is displayed in the reversed state. When the operation of step d58 is over, the process returns to step d56. At step d59, the item displayed in the reversed state is initialized i.e. returned to normal. When the operation of step d59 is over, the process returns to step d56.

At step d60, which is a case where no pen input was made, judgement is made whether there is any item displayed in the reversed state or not. The process moves to step d61 when there is some item, otherwise to step d62. At step d61, the display of the sub-menu picture 38 is erased. When the operation of step d61 is over, the process moves to step for making the operation of an item to be displayed in the reversed state. At step d62, the display of the submenu 38 is erased. When the operation of step d62 is over, the process moves to step d5.

Figure 35:
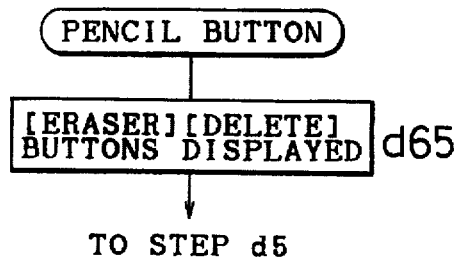
FIG. 35 is a flow chart showing the motion in the case where a pencil button displayed in place of either the eraser button 15 or the delete button 16 is indicated.

FIG. 35 is a flow chart showing the motion in the case where the pencil button displayed in place of either the eraser button 15 or the delete button 16 is indicated. At step d65, the eraser button 15 or the delete button 16 is displayed in place of the pencil button. When the operation of step d65 is over, the process moves to step d5.

Figure 36:
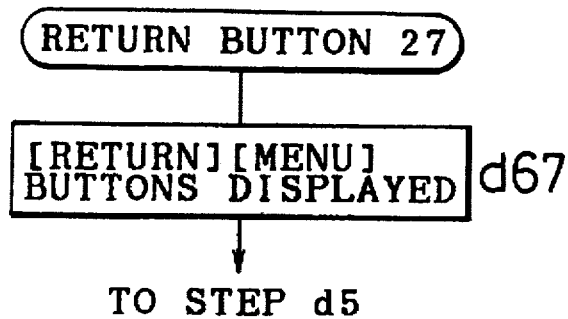
FIG. 36 is a flow chart showing the motion in the case where a return button 27 is indicated.

FIG. 36 is a flow chart showing the motion in the case where the return button 27 is indicated. At step d67, the menu button 19 is displayed in place of the return button 27. When the operation of step d67 is over, the process moves to step d5.

Figure 37:
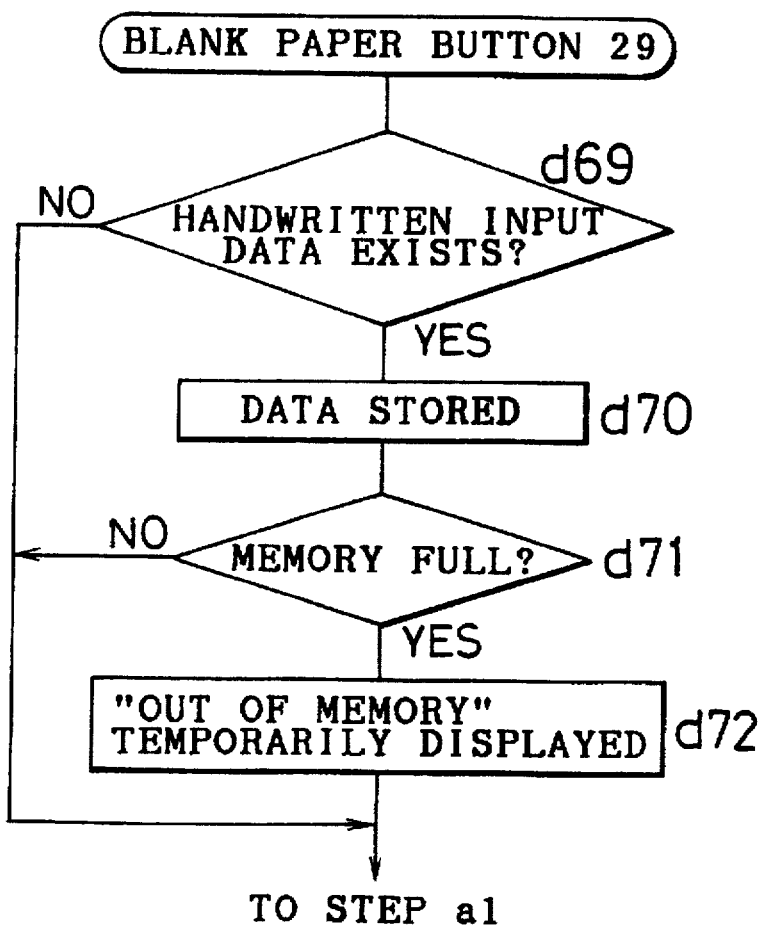
FIG. 37 is a flow chart showing the motion in the case where a blank button 29 is indicated.

FIG. 37 is a flow chart showing the motion in the case where the blank button 29 is indicated. At step d69, judgement is made whether there is any data inputted in handwriting displayed in the input/display area 20 for characters or not. The process moves to step d70 when there is some data, otherwise to step d71. At step d70, the data being inputted is stored as an independent data. At step d71, judgement is made whether the memory capacity in the RAM 4 is sufficient or not. The process moves to step a1 when the memory capacity is sufficient, otherwise to step d72. At step d72, a display is given, for example, as "Memory short". When the operation of step d72 is over, the process returns to step a1.

Figure 38:
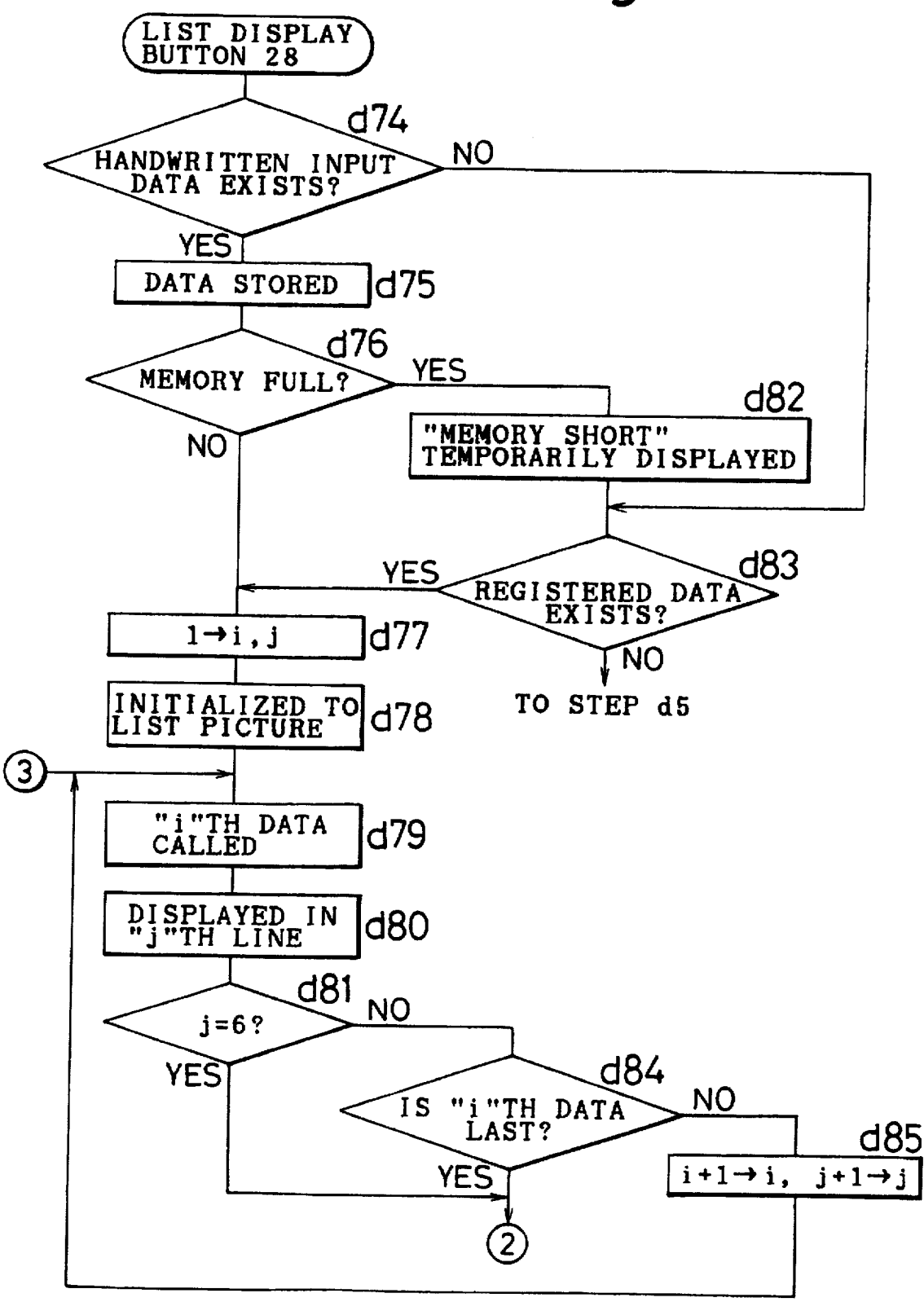
FIG. 38 is a flow chart showing the processing in the case where a display list button 28 is indicated.
Figure 39:
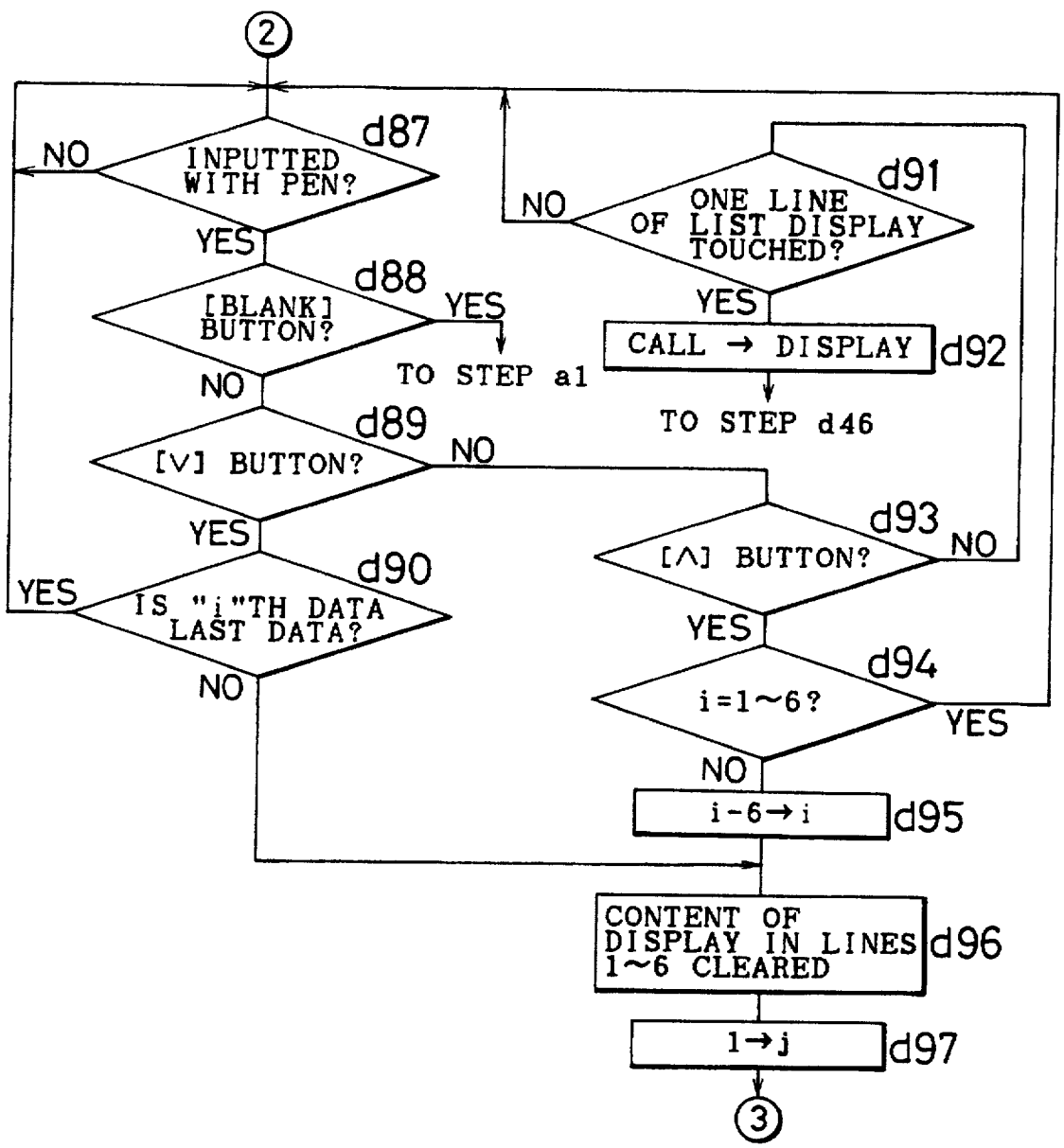
FIG. 39 is a flow chart showing the processing in the case where the display list button 28 is indicated.

FIG. 38 and FIG. 39 are flow charts showing the processing in the case where the display list button 28 is indicated. The flow chart of FIG. 39 is continued from the flow chart of FIG. 38. When the list display button 28 is indicated with the input pen 11, the CPU 2 moves to step d74 and judgment is made whether the data being inputted in handwriting is displayed in the input/display area 20 for characters or not. The process moves to step d75 when the data being inputted in handwriting is displayed, otherwise to step d83. At step d75, the data being inputted in handwriting displayed in the input/display area 20 for characters is stored in the memory, and the CPU 2 moves to step d76. At step d76, judgement is made whether or not the data being inputted in handwriting at step d75 could not be stored in the memory. The process moves to step d82 when the data could not be stored because the memory was already full. However, the process moves to step d77 when the data could be stored because there was a sufficient margin in the memory.

At step d82, the message "Memory short" is temporarily displayed in the input/display area 20 for characters for the prescribed time because the memory capacity for registering the data being inputted in handwriting is short and then moves to step d83. At step d83, judgement is made whether there is any independent data registered in the memory. The operations of FIG. 38 and FIG. 39 terminate and the process moves to step d5 when there is no independent data registered, otherwise to step d77.

At step d77, the values of the counters "i" and "j" for displaying the independent data stored in the memory are both set as "1" and the process moves to step d78. Here, the value of the counter "i" indicates the order of the independent data registered counting from the independent data at the head. When the value of the counter "i" is "1", for example, the independent data at the head is indicated with the counter "i". The counter "j" indicates the line number in the date column 47 and the content of registration column 48 in the list image 45 given in FIG. 8 and the value of the counter "j" is set for 1 to 6. When the value of the counter "j" is "1", for example, the top line in the list image 45 is indicated.

At step d78, the screen is initialized and the list image 45 is displayed. The process moves to step d79 and the independent data in the "i"th position indicated by the counter "i" is called from the memory. The process moves to step d80 and the independent data called in the previous step d79 is displayed together with its date in the "j"th line displayed by the counter "j" in the list image 45 sequentially from the head of the data, and the process moves to step d81.

At step d81, judgement is made whether the value of the counter "j" is "6" or not. The process moves to step d87 of FIG. 39 when the value of the counter "j" is "6" but to step d84 when the value of the counter "j" is not "6" At step d84, judgement is made whether the independent data in "i"th position called from the memory at step d79 is the last independent data of the data stored in the memory. The process moves to step d87 of FIG. 39 when it is the last independent data, otherwise to step d85. The value "1" is added to the values of the counter "i" and the counter "j" respectively, and the process moves to step d79.

At step d87, judgement is made whether any input was made with the input pen 11 or not. The process moves to step d88 when it judges that there was some input with the input pen 11, but the process remains on standby as step d87 is repeated when it judges that there was no such input. At step d88, judgement is made whether the blank button 29 has been indicated with the input pen 11. The process moves to step d89 when the blank button 29 was not indicated but the operation of FIG. 38 and FIG. 39 will terminate and the process moves to step a1 when the blank button 29 was indicated. At step d89, judgement is made whether the registration button 18 has been indicated with the input pen 11. The process moves to step d90 when the registration button 18 was indicated, otherwise to step d93. At step d93, judgement is made whether the registration button 17 has been indicated with the input pen 11. The process moves to step d94 when the registration button 17 was indicated, otherwise to step d91.

At step d90, judgement is made whether the independent data in "i"th position indicated by the counter i at that point in time is the last independent data or not. The process moves to step d87 when the data is judged as the last independent data, otherwise to step d96.

If, at step d93, it is judged that the registration button 17 has been indicated, the process moves to step d94. At step d94, judgement is made whether the value of the counter "i" is either of the values 1 to 6, and the process moves to step d91 when the value of the counter "i" is either of the values 1 to 6, otherwise to step d95. At step d95, the value of the counter "i" is reduced by 6 and the process moves to step d96. At step d96, the content of display in the 1st to 6th lines in the list image 45 i.e. all the independent data contained in the list image 45 is cleared, and the process moves to step d97. At step d97, the value of the counter "j" is set at 1 and the process moves to step d79 of FIG. 38.

148 If, at step d93, it is judged that the registration button 17 is not indicated, the process moves to step d91, where judgement is made whether the position indicated with the input pen 11 in the previous step d87 is either of the lines in the list image 45 or not. The process moves to step d87 when it is judged that the indicated position is neither of the lines in the list image 45 but to step d92 when the indicated position is either of the lines in the list image 45. At step d92, the independent data the head of which is displayed in the line indicated with the input pen 11 is called from the memory and displayed in the input/display area 20 for characters, and the process moves to step d46.

As the list display button 28 is indicated with the operations corresponding to FIG. 38 and FIG. 39 this way, the steps d77 and d78 are executed and then the steps d79, d80, d81, d84 and d85 are repeated. As a result, the independent data stored in the memory is called one after another and the head part of the 1st to 6th independent data is displayed together with their dates in the 1st to 6th lines in the list image 45. When the number of independent data is under 6, all independent data are displayed.

Displaying the independent data in the 7th to 12th positions from the head in the list image 45 in the case where 7 or more independent data are stored in the memory is made by indicating the registration button 18. When the registration button 18 is indicated with the input pen 11, the steps d87, d88, d89, d90, d96 and d97 are executed and the steps d79, d80, d81, d84 and d85 are also repeated. As a result, the independent data in the 7th to 12th positions from the head are displayed in the list image 45. In the same way, the independent data in the 13th position and after can also be displayed in the list image 45 by indicating the registration button 18 with the input pen 11.

Displaying of the independent data preceding the independent data displayed in the list image 45 i.e. the independent data on the head side in the list image 45 is made by indicating the registration button 17 with the input pen 11. When the registration button 17 is indicated with the input pen 11, the steps d93, d94, d95, d96 and d97 are executed and then the steps d79, d80, d81, d84 and d85 are repeated. As a result, the independent data preceding the independent data displayed in the list image 45 is displayed in the list image 45.

Figure 40:
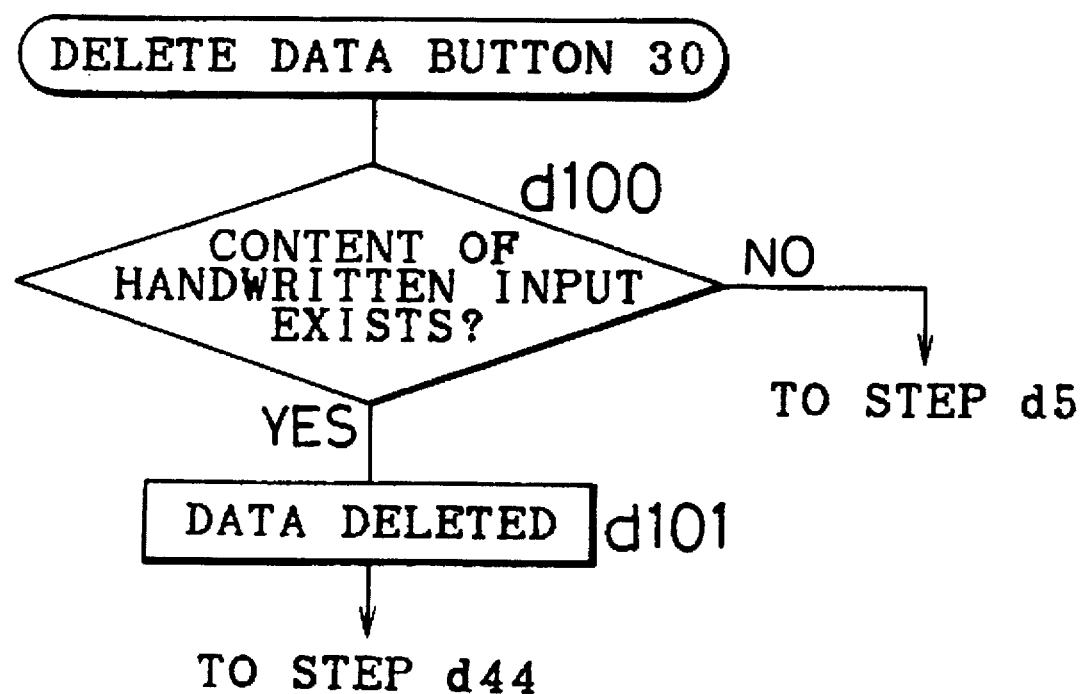
FIG. 40 is a flow chart showing the processing in the case where the delete data button 30 is indicated.

FIG. 40 is a flow chart showing the processing in the case where the delete data button 30 is indicated with the input pen 11. At step d100, judgement is made whether there is any content inputted in handwriting displayed in the input/display area 20 for characters at that point in time or not. If there is some content inputted in handwriting displayed, the process moves to step d101 and the content inputted in handwriting displayed in the input/display area 20 for characters at that point in time is deleted from the memory, and the process moves to step d44. In the case of absence, at step d100, of any content inputted in handwriting displayed in the input/display area 20 for characters, the process moves to step d5 without performing any delete operation corresponding to the data delete button 30.

Figure 41:
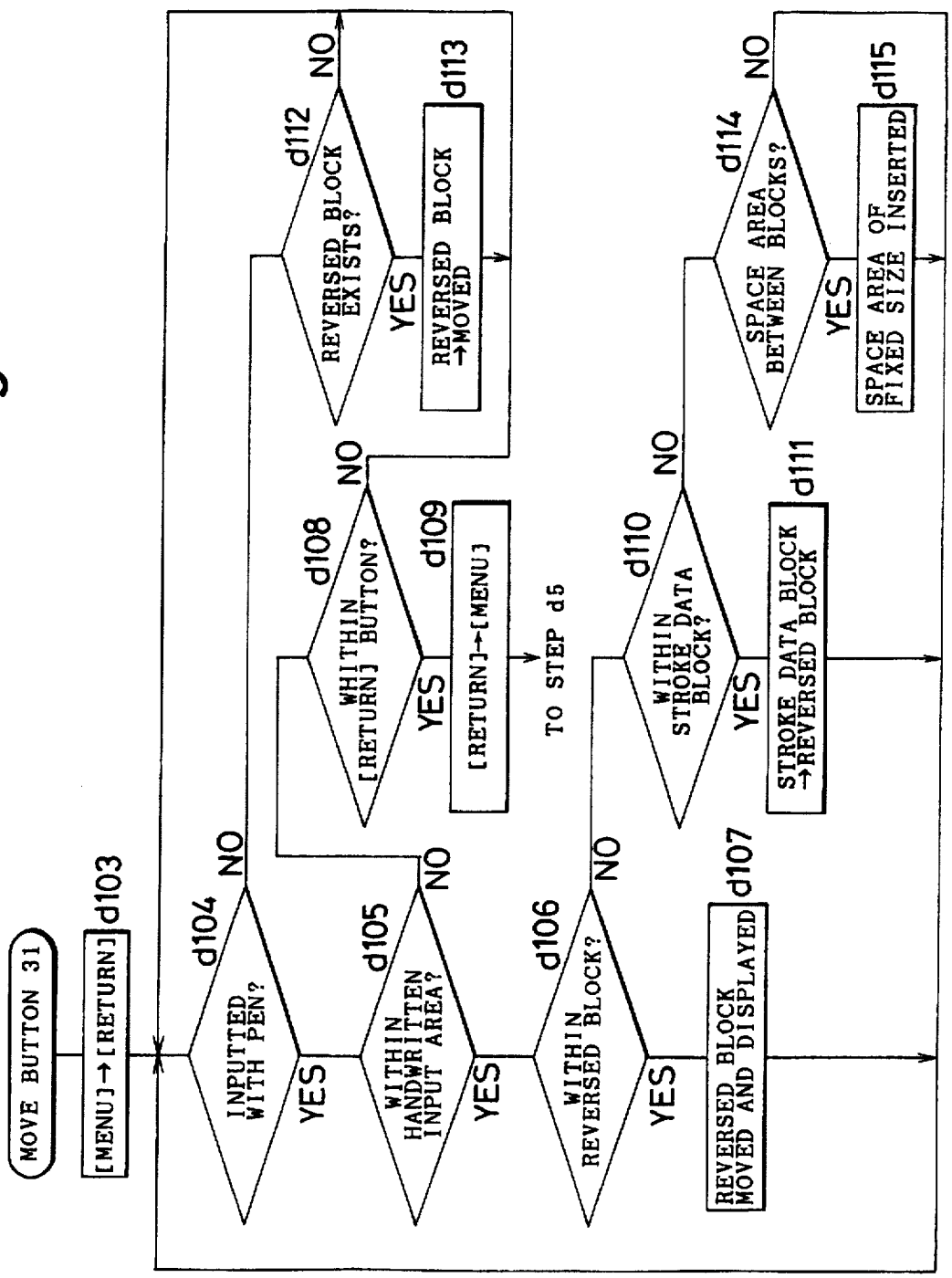
FIG. 41 is a flow chart showing the processing in the case where a move button 31 is indicated.
Figure 42A:
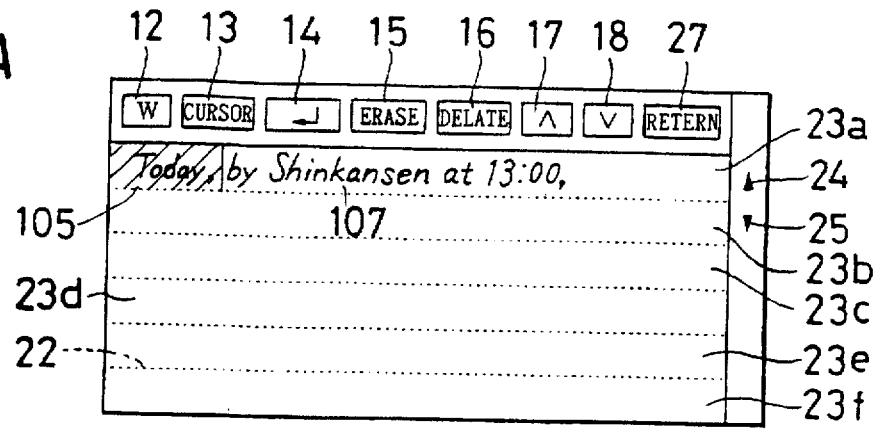
FIGS. 42A to 42C are plan views showing examples of display in the character input/display area 20 in the case where a block 105 is moved with an input pen 11.
Figure 42B:
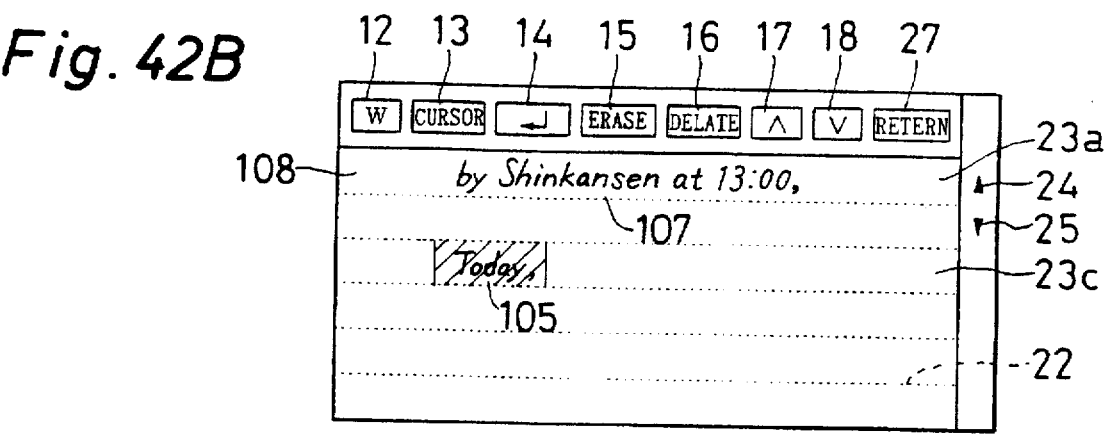
Figure 42C:
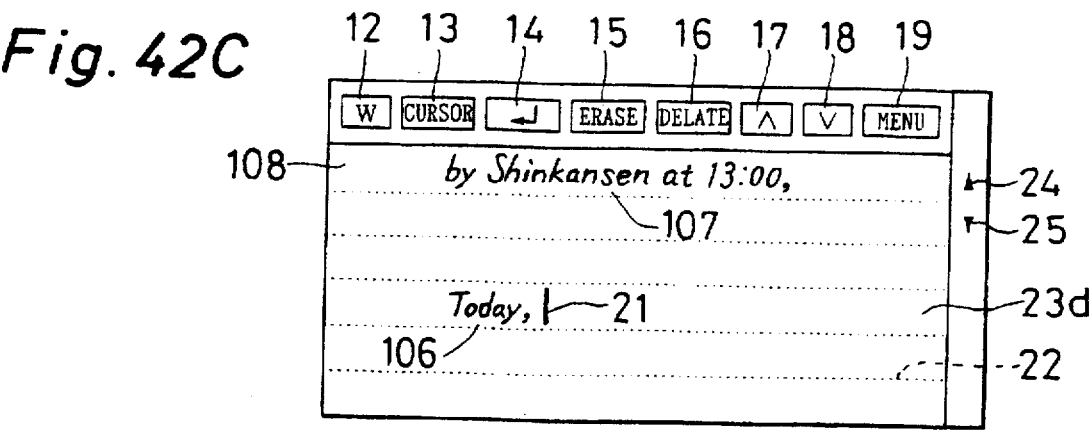

FIG. 41 is a flow chart showing the processing in the case where the move button 31 is indicated. FIGS. 42A to 42C are plan views showing examples of display in the character input/display area in the case where the block 105 is moved with the input pen 11. At step d103, the display of the menu button 19 is switched to the display of the button 27 as shown in FIG. 42A, and the process moves to step d104.

At step d104, judgement is made whether there any input has been made with the input pen 11 or not. The process moves to step d105 when there was some pen input, otherwise to step d112. At step d105, judgement is made whether, in the input by the input pen 11 made at step d104, the position indicated with the pen input is in the input area in handwriting i.e. in the input/display area 20 for characters or not. The process moves to step d106 when the indicated position is in the input & display area 20 for characters but to step d108 when the indicated position is out of the input/display area 20 for characters. At step d106, judgement is made whether or not the position indicated with the pen input in a reversed block or in the reversed block 105 of FIG. 42A, for example. The process moves to step d107 when the position is in a reversed block but to step d110 when it is out of any reversed block. Reversed block is a block where the data color is reversed with the background color. For example, in the case where the normal mode of display is white for background and black for display, a reversed block has a black background and a white display.

At step d107, as the input pen 11 is moved while being pressed against the input/display area 20 for characters, the reversed block indicated by the input pen 11 is moved to the position indicated by the moved input pen 11 to be displayed, and the process moves to step d104.

At step d110, judgement is made whether or not the position indicated with the pen input 11 in the previous step d104 in a stroke block i.e. in an ordinary block not reversed, in the block 107, for example. If the position is in an ordinary block, the process moves to step d111 and the block which is not reversed is switched to a reversed block. The process then moves to step d104.

If, at step d110, the position indicated with the pen input 11 is judged to be out of the block, the process moves to step d114 and judgement is made whether or not the position indicated with the pen input 11 is in the space area between blocks i.e. the blank part. If the position is in the blank part, the process moves to step d115, inserts a space area of fixed size i.e. a blank in the indicated position and then moves to step d104. If, at step d114, it is judged that the indicated position is not a blank part, the process moves to step d104.

If, at step d104, it is judged that there was no input by input pen 111, the process moves to step d112 and judgement is made whether there is any reversed block or not. The process moves to step d104 when it is judged that there is no reversed block. When it judges that there is some reversed block, the process moves to step d113 and the display of the reversed block is switched to that of an ordinary block. As a result, the reversed block is moved, while indicating the reversed block with the input pen 11, to the position where the reversed block is switched to the display of an ordinary block i.e. the position where the input pen 11 is separated from the moved reversed block, and the process moves to step d104.

When, at step d105, it is judged that the position is indicated with the input pen 11 is not in the input/display area 20 for characters, the process moves to step d108 and judgement is made whether the displayed position is in the return button 27 or not. When the position is not in the return button 27, the process moves to step d104. When the position is in the return button 27, the process moves to step d109, and the display of the return button 27 is switched to that of the menu button 19 at step d109 as shown in FIG. 42C to finish the operation for moving. The process then moves to step d5.

When, in the flow chart as described above, the move button 31 is indicated, the process remains on standby while step d104 and step d112 are repeated until any indication with the input pen 11 is made, because no reversed block exists in the input/display area 20 for characters in the state be some indication is made in the input/display area 20 for characters with the input pen 11. When, in the input/display area 20 for characters, the block to be moved is indicated with the input pen 11, operations are made in the order of steps d104, d105, d106, d110 and d111 and the indicated block is switched to the display of a reversed block 105 as shown in FIG. 42A.

The movement of this reversed block 105 the display of which has been switched is made by moving the input pen 11 to the desired position in the input/display area 20 for characters while indicating the reversed block 105. With this moving operation of the input pen 11, the steps d104, d105, d106 and d107 are repeated and the reversed block 105 is moved as shown in FIG. 42B.

As the input pen 11 is separated from the reversed block 105 after moving the reversed block 105 to the desired position, the operations of the steps d104, d112 and d113 are executed and the display of the reversed block 105 is switched to the normal display as the block 106 as shown in FIG. 42C, thus completing the movement of the reversed block 105.

The portion where the moved reversed block 105 existed before remains blank 108 as in the case of erasure with the eraser. Moreover, in the state where the movement has been completed, the cursor 21 is displayed immediately after the moved block 106 as shown in FIG. 42c. Other blocks 107 can also be moved in the same way.

Figure 43:
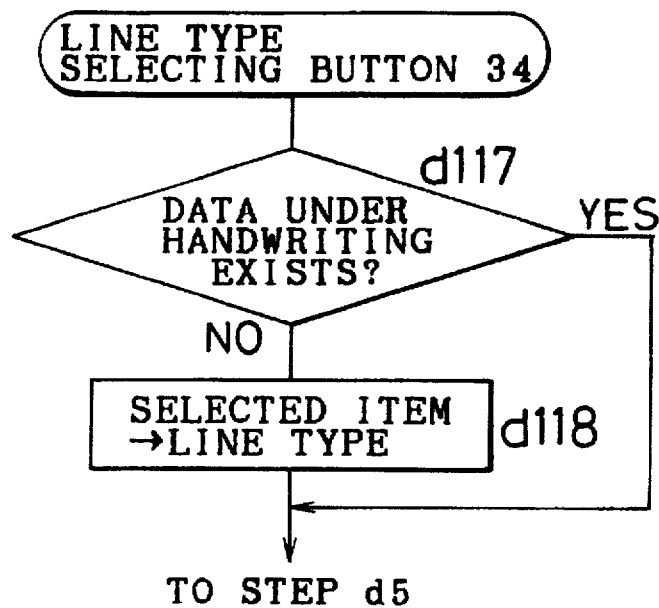
FIG. 43 is a flow chart showing the motion in the case where a lime type switch button 34 is indicated.

FIG. 43 is a flow chart showing the motion in the case where the line type switch button 34 is indicated. At step d117, judgement is made whether there is any data being inputted in handwriting or not. The process moves to step d5 when there is some data but to step d121 when there is no such data. At step d118, the displayed line is converted to the selected line type. As line type data in the block data, data corresponding to this line type is stored. When the operation of step d118 is over, the process moves to step d5.

Figure 44:
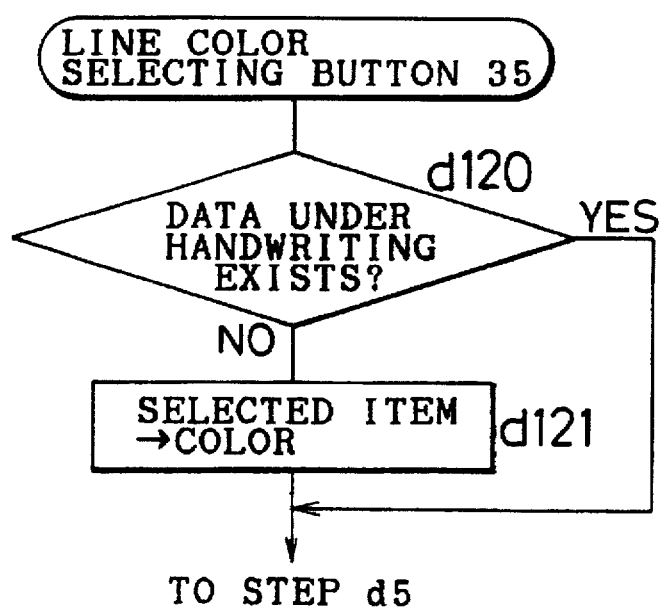
FIG. 44 is a flow chart showing the motion in the case where a line color switch button 35 is indicated.

FIG. 44 is a flow chart showing the motion in the case where the line color switch button 35 is indicated. At step d120, judgement is made whether there is any data being inputted in handwriting or not. The process moves to step d5 when there is some data but to step d118 when there is no such data. At step d121, the displayed line is converted to the selected line colour. As line colour data in the block data, data corresponding to this line colour is stored. When the operation of step d121 is over, the process moves to step d5.

Figure 45:
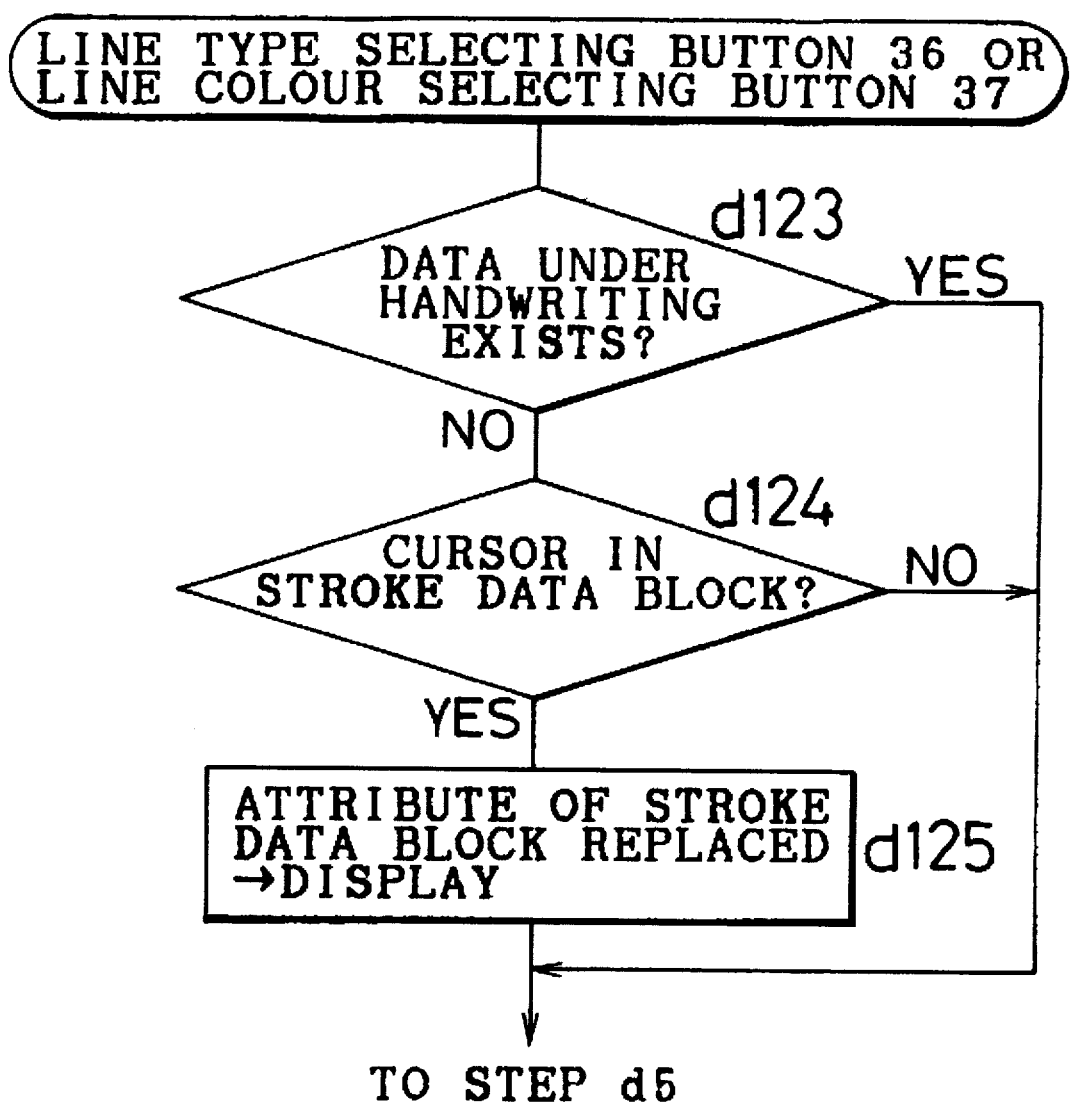
FIG. 45 is a flow chart showing the motion in the case where either a line type switch button 36 or a line color switch button 37 is indicated.

FIG. 45 is a flow chart showing the motion in the case where either the line type switch button 36 or the line color switch button 37 is indicated. At step d123, judgement is made whether there is any data being inputted in handwriting or not. The process moves to step d5 when there is some data but to step d124 when there is no such data. At step d124, judgement is made whether the display position of the cursor 21 is in the block or not. The process moves to step d125 when the position is in the block but to step d5 when otherwise. At step d125, the line type and line colour of the block data corresponding to the block including the cursor 21 are displayed by being converted to the selected line type or line colour. When the operation of step d125 is over, the process moves to step d5.

Figure 46:
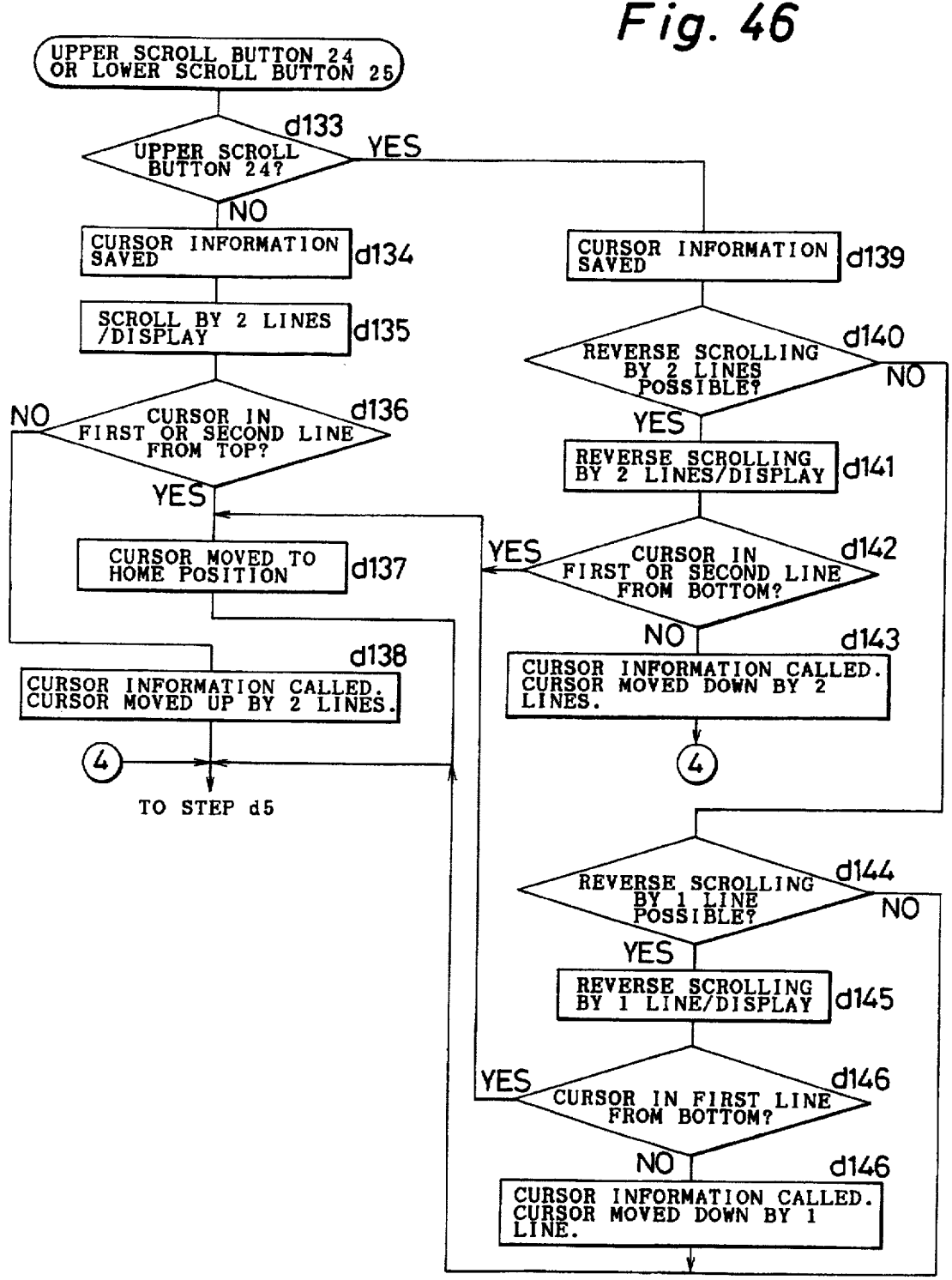
FIG. 46 is a flow chart showing the motion in the case where either an upper scroll button 24 or a lower scroll button 25 is indicated.
Figure 47A:
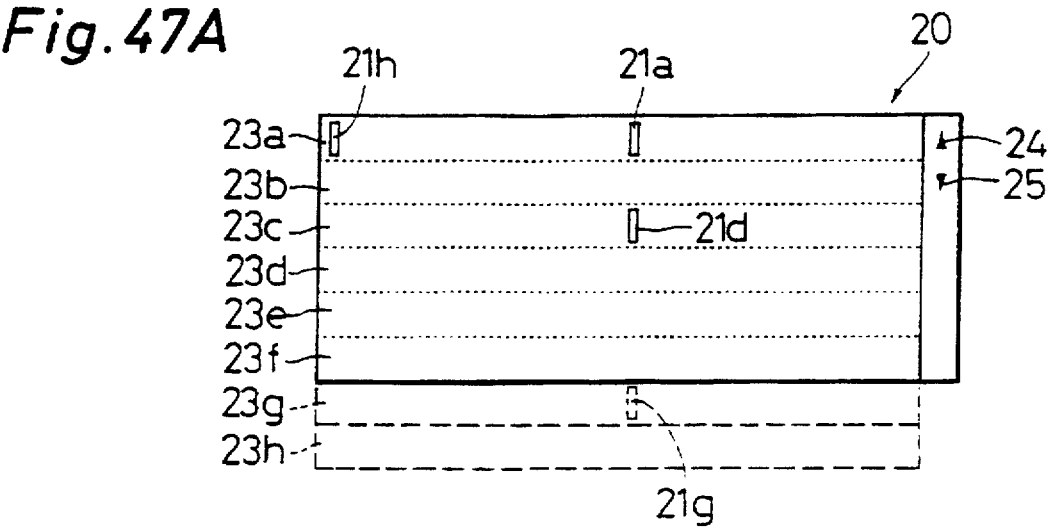
FIGS. 47A, 47B are plan views showing the character input/display area 20 for explaining the motion in the case where either the upper scroll button 24 or the lower scroll button 25 is indicated.
Figure 47B:
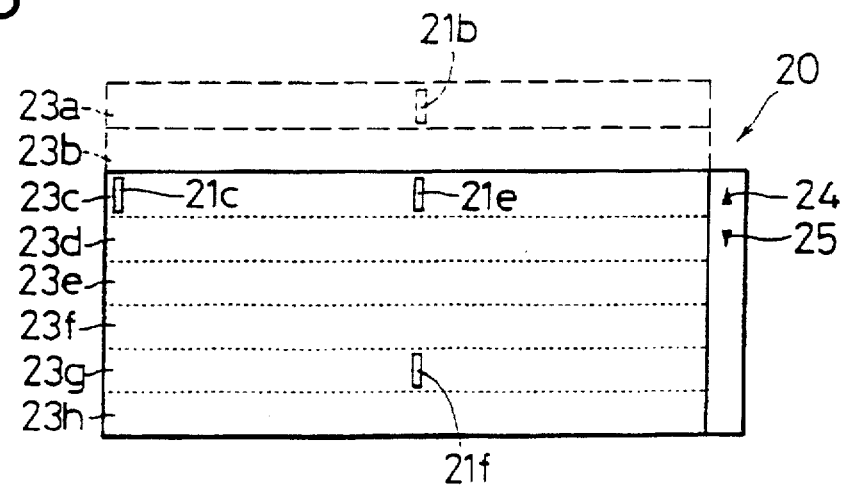

FIG. 46 is a flow chart showing the motion in the case where either the upper scroll button 24 or the lower scroll button 25 is indicated. FIGS. 47A, 47B are plan views showing the character input/display area for explaining the motion in the case where either the upper scroll button 24 or the lower scroll button 25 is indicated. At step d133, judgement is made whether the indicated button is the upper scroll button 24 or not. The process moves to step d139 when it is the upper scroll button 24 but to step d134 when it is not the upper scroll button 24 i.e. it is the lower scroll button 25.

At step d134, the cursor information indicting the position of the cursor 21 is stored. At step d135, the data is sent forward by 2 lines for example, and the content corresponding to the displayed lines is displayed. FIG. 47A indicates the lines 23a to 23f displayed before the advancing of 2 lines while FIG. 47B indicates the lines 23c to 23h which are displayed when the data has been advanced by 2 lines.

At step d136, judgement is made whether the cursor 21 is in the first or the second line from the top or not. The process moves to step d137 when the cursor 21a is in the first or the second line, in the line 23a of the first line as indicated in FIG. 47A, for example, but to step d138 when it is not or when the cursor 21d is in the line 23c of the third line.

At step d137, the cursor 21 is displayed in the home position i.e. at the left top of the input/display area 20 for characters. This is because the cursor 21b disappears from the screen as shown in FIG. 47B when the data is advanced by 2 lines. In such a case, the cursor 21 is displayed as cursor 21c at the left top of the area 20 i.e. at the left end of the line 23c. The same is true with a backward feed of the data. When the operation of step d137 is over, the process moves to step d5.

At step d138, the cursor information stored at step d134 is called and the cursor 21 is displayed at a position where it is moved upward by 2 lines. For example, the cursor 21d is displayed as cursor 21e indicated in FIG. 47B. When the operation of step d138 is over, the process moves to step d5.

At step d139, the cursor information indicating the position of cursor 21 is stored. At step d140, judgement is made whether backward feed by 2 lines is possible or not. The process moves to step d141 when that is possible but to step d144 when that is impossible. At step d141, the data is displayed by being sent backward by 2 lines. FIG. 47B indicates the lines 23c to 23h displayed before the backward feed by 2 lines while FIG. 47A indicates the lines 23a to 23f displayed when the data has been sent backward by 2 lines.

At step d142, judgement is made whether the cursor 21 is in the first or the second line from the bottom or not. The process moves to step d137 when the cursor 21a is in the first or the second line, in the line 23g of the second line as indicated in FIG. 47B, for example, but to step d143 when it is not or when the cursor 21e is in the line 23c of the first line.

At step d143, the cursor information stored at step d139 is called and the cursor 21 is displayed at a position where it is moved downward by 2 lines. For example, the cursor 21e is displayed as cursor 21d indicated in FIG. 47A.

At step d144, judgement is made whether backward feed by 1 line is possible or not. The process moves to step d145 when that is possible but to step d5 when that is impossible. At step d145, the data is displayed by being sent backward by 1 line. At step d146, judgement is made whether the cursor 21 is in the first from the bottom or not. The process moves to step d137 when the cursor 21a is in the first line but to step d147 when it is not. At step d147, the cursor position data stored at step d139 is called and the cursor 21 is displayed at a position where it is moved upward by 1 line. When the operation of step d147 is over, the process moves to step d5.

Figure 48:
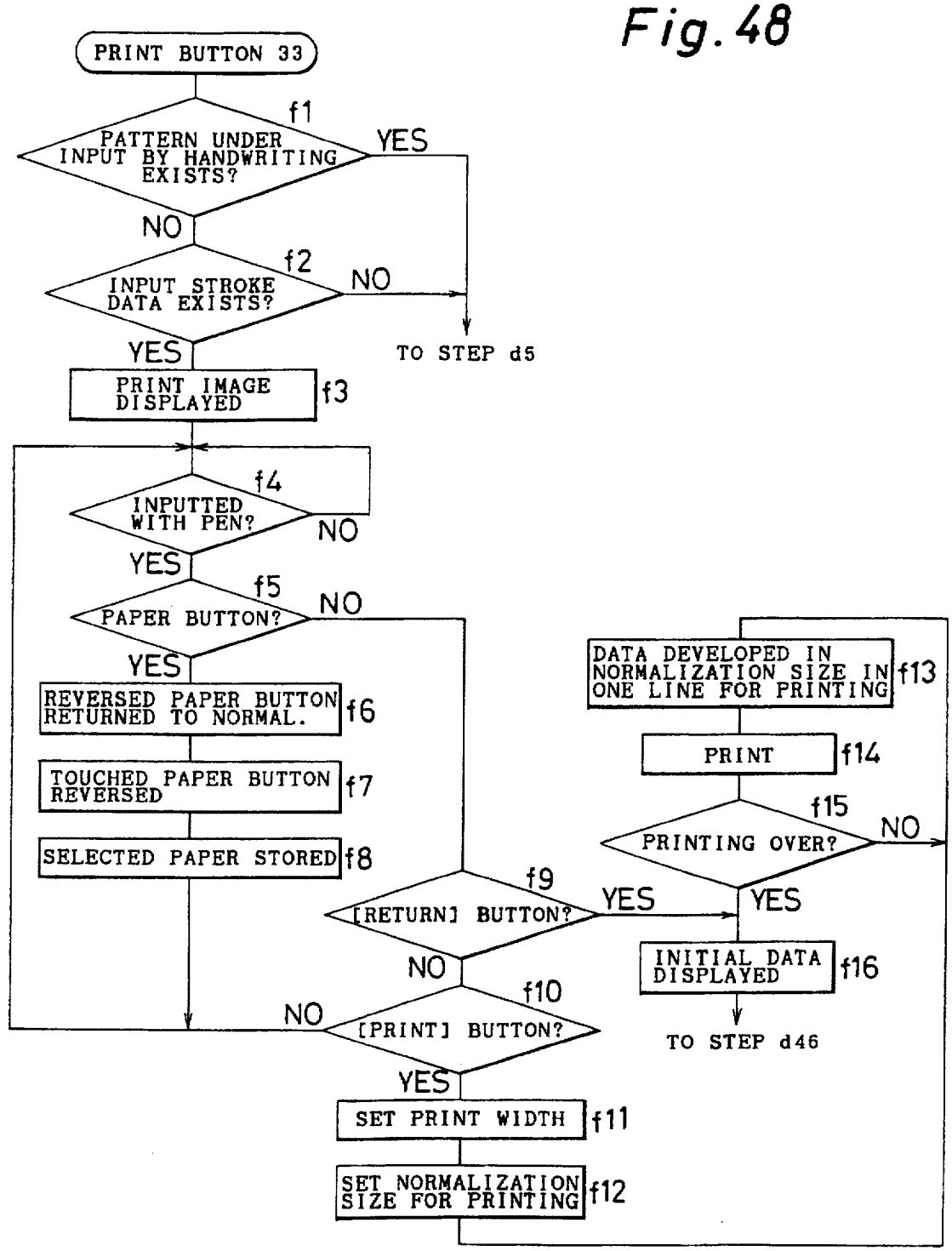
FIG. 48 is a flow chart showing the processing in the case where printing is made as a print button 33 is indicated with the input pen 11.
Figure 49:
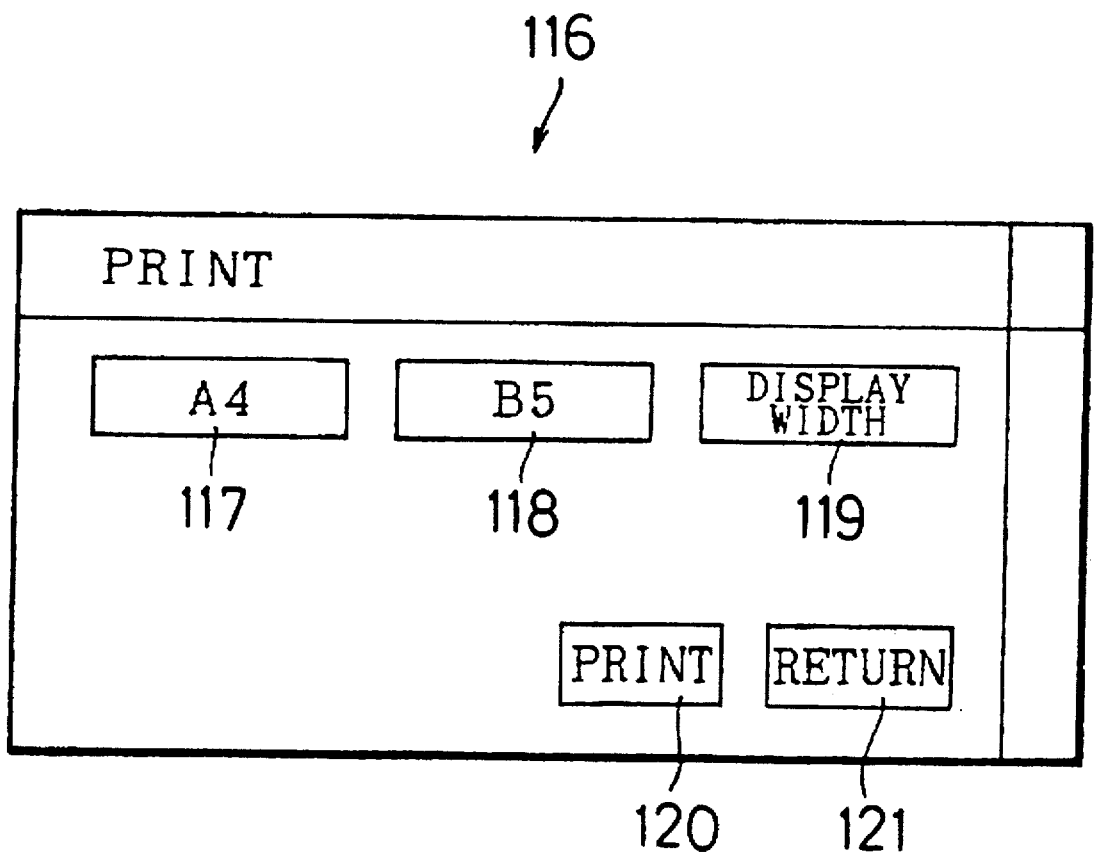
FIG. 49 is a plan view showing a print display image 116 displayed in the case where the print button 33 is indicated.

FIG. 48 is a flow chart showing the processing in the case where printing is made as the print button 33 is indicated with the input pen 11. FIG. 49 is a plan view showing the print display image 116 displayed in the case where the print button 33 is indicated.

At step f1, judgement is made whether there is any pattern under input in handwriting displayed in the input/display area 20 for characters at that point in time or not i.e. whether there is any image data not yet submitted to processing for turning into stroke data or not. The process moves to step f2 when it is judged that there is no pattern under input in handwriting. At step f2, judgement is made whether any stroke data i.e. independent data is displayed in the input/display area 20 for characters or not, and the process moves to step f3 when it is judged that such data is displayed. In the case where it is judged that there is any pattern under input in handwriting displayed in the input/display area 20 for characters at step f1 and when it is judged that stroke data is not displayed in the input/display area 20 for characters at step f2, the operation of the flow chart of FIG. 48 is terminated and the process moves to step d5.

At step f3, the print display image 116 of FIG. 49 is displayed in the input/display area 20 for characters and the process moves to step f4. Here, the print display image 116 contains paper button provided with A4 paper button 117 and B5 paper button 118, display width button 119, print button 120 and return button 121.

At step f4, judgement is made whether any input by input pen 11 has been made or not. The process moves to step f5 when some input by input pen 11 has been made but remains on standby as step f4 is repeated when no input by input pen 11 has been made. At step f5, judgement is made whether the position indicated with the input pen 11 in the previous step f4 is in the A4 paper button 117 or the B5 paper button 118, and the process moves to step f5 when the indicated position is in the paper button but to step f9 when the indicated position is not in the paper button.

At step f6, the paper button indicated in reversed state is switched to the normal display when there is any such paper button indicated in reversed state, and the process moves to step f7. At step f7, the display of the paper button indicated with the input pen 11 in the previous step f4 is switched to reversed display, and the process moves to step f8. At step f8, the paper type A4 or B5 corresponding to the paper button indicated with the input pen 11 is stored, and the process moves to step f4.

When, in the previous step f5, it is judged that the paper button is not indicated with the input pen 11, and the process moves to step f9 and judgement is made whether the return button 121 has been indicated with the input pen 11 or not.

The process moves to step f16 when the return button 121 has been indicated but to step f10 when the return button 121 has not been indicated. At step f10, judgement is made whether the print button 120 has been indicated with the input pen 11 or not. The process moves to step f11 when the print button 120 has been indicated but to step f4 when the print button 120 has not been indicated.

At step f11, the print width i.e. the length of one line on the paper to be printed corresponding to the type of paper stored in the previous step f8 is set, and the process moves to step f12. At step f12, the values of normalization size (Ax, Ay) for printing which are values larger than the normalization size of the case where the data is displayed in the input/display area 20 for characters are set, and the process moves to step f13. At step f13, the block data displayed in the input/display area 20 for characters in the previous step f2 and the independent data in which that block data is included are developed in a volume for one line at the print width set in the previous step f11, in the normalization size for printing set in the previous step f12, and the process moves to step f14.

At step f14, the data for one line developed in the previous step f13 is printed on the paper, the process moves to step f15 and judgement is made whether the independent data to be printed has all been printed or not. The process moves to step f16 when the printing has been completed. At step f16, the print display image 116 of FIG. 49 is cleared, the original block data which was displayed in the input/display area 20 for characters is displayed again in the input/display area 20 for characters, the operation of FIG. 48 is terminated, and the process moves to step d46.

In the case where it is judged, at step f15, that the printing has not yet been completed, the process moves to step f13 and the steps f13, f14 and f15 are repeated until the independent data to be printed is fully printed. The development and processing of data at step f13 is performed line by line from the head of the independent data to be printed.

Figure 50:
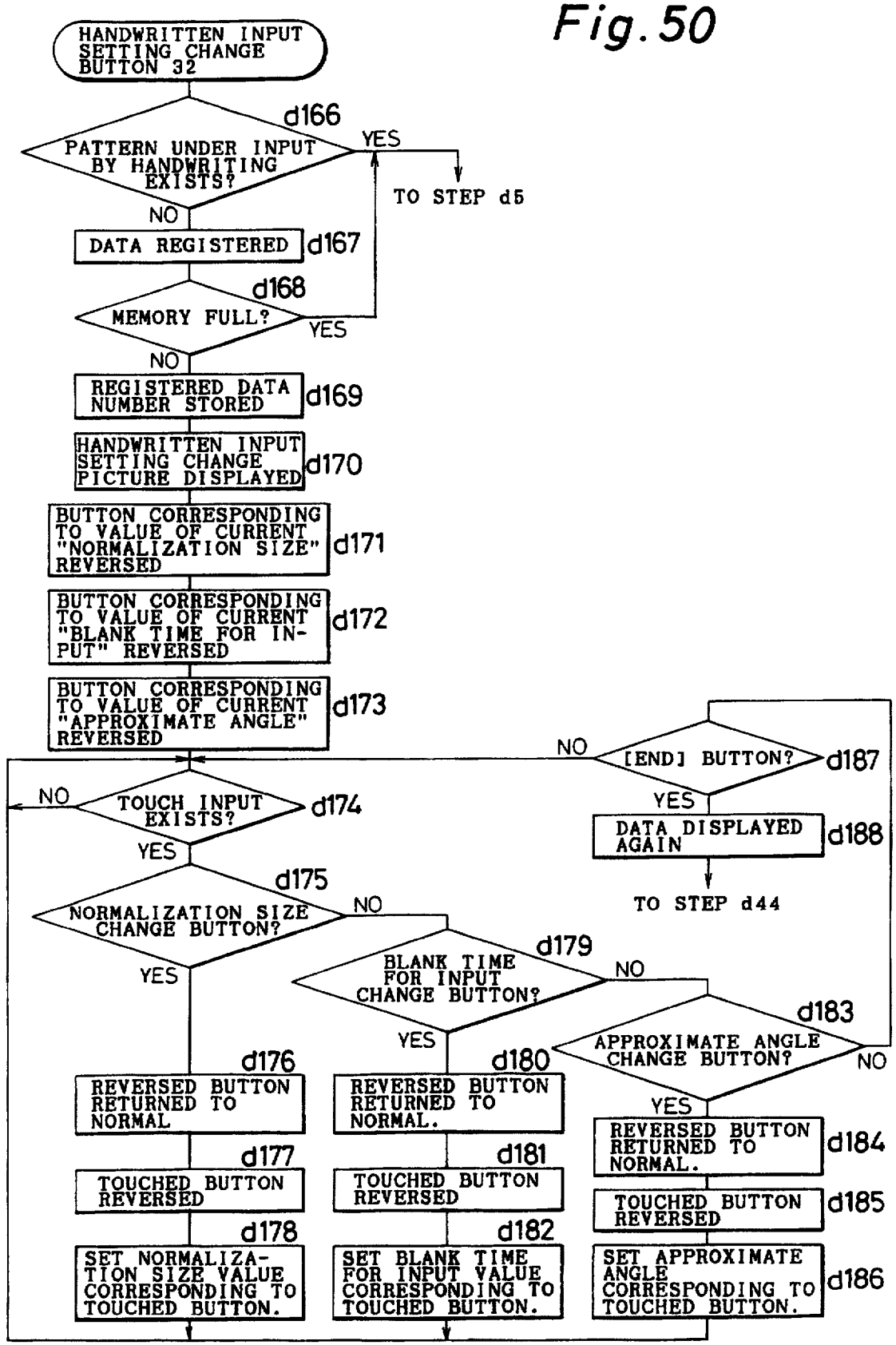
FIG. 50 is a flow chart showing the motion in the case where the handwritten input setting change button 32 is indicated.

FIG. 50 is a flow chart showing the motion in the case where the handwritten input setting change button 32 is indicated. At step d166, judgement is made whether there is any pattern under input in handwriting or not. The process moves to step d5 when there is some pattern but to step d157 when there is no such pattern. At step d167, the data under input in handwriting is stored as the independent data. At step d168, judgement is made whether the RAM 4 has a sufficient memory capacity or not. The process moves to step d5 when the memory capacity is insufficient but to step d169 when there is a sufficient memory capacity. At step d169, the stored independent data is given a registered data number and is stored. The registered data number is used for calling the stored data to display it again.

At step d170, the setting changing picture 75 for handwritten input is displayed. At step d171, the button corresponding to the value of the current normalization size is displayed in the reversed state. At step d172, the button corresponding to the value of the current blank time for input is displayed in the reversed state. At step d173, the button corresponding to the value of the current approximate angle is displayed in the reversed state. At step d174, judgement is made whether there has been any input from the input pen 11 or not. The process moves to step d175 when there has been some input.

At step d175, judgement is made whether the input position is the normalization size change button or not. The process moves to step d176 when it is the change button, otherwise to step d179. At step d176, the normalization size button which is displayed in the reversed state returns to normal. At step d177, the indicated normalization size button is displayed in the reversed state. At step d178, the normalization size value corresponding to the indicated normalization size button is set. When the operation of step d178 is over, the process moves to step d174.

At step d179, judgement is made whether the input position is the input blank time change button or not. The process moves to step d180 when it is the input blank time change button, otherwise to step d183. At step d180, the button which is displayed in the reversed state returns to normal. At step d181, the indicated input blank time change button is displayed in the reversed state. At step d182, the input blank time value corresponding to the indicated button is set. When the operation of step d182 is over, the process moves to step d174.

At step d183, judgement is made whether the input position is the approximate angle change button or not. The process moves to step d184 when it is the approximate angle change button, otherwise to step d187. At step d184, the approximate angle change button which is displayed in the reversed state returns to normal. At step d185, the indicated approximate angle change button is displayed in the reversed state. At step d186, the approximate angle value corresponding to the indicated button is set. When the operation of step d186 is over, the process moves to step d174.

At step d187, judgement is made whether the end button 79 has been indicated or not. The process moves to step d188 when it has been indicated, otherwise to step d174. At step d188, the data is displayed under the newly set conditions. When the operation of step d188 is over, the process moves to step d44.

Figure 51:
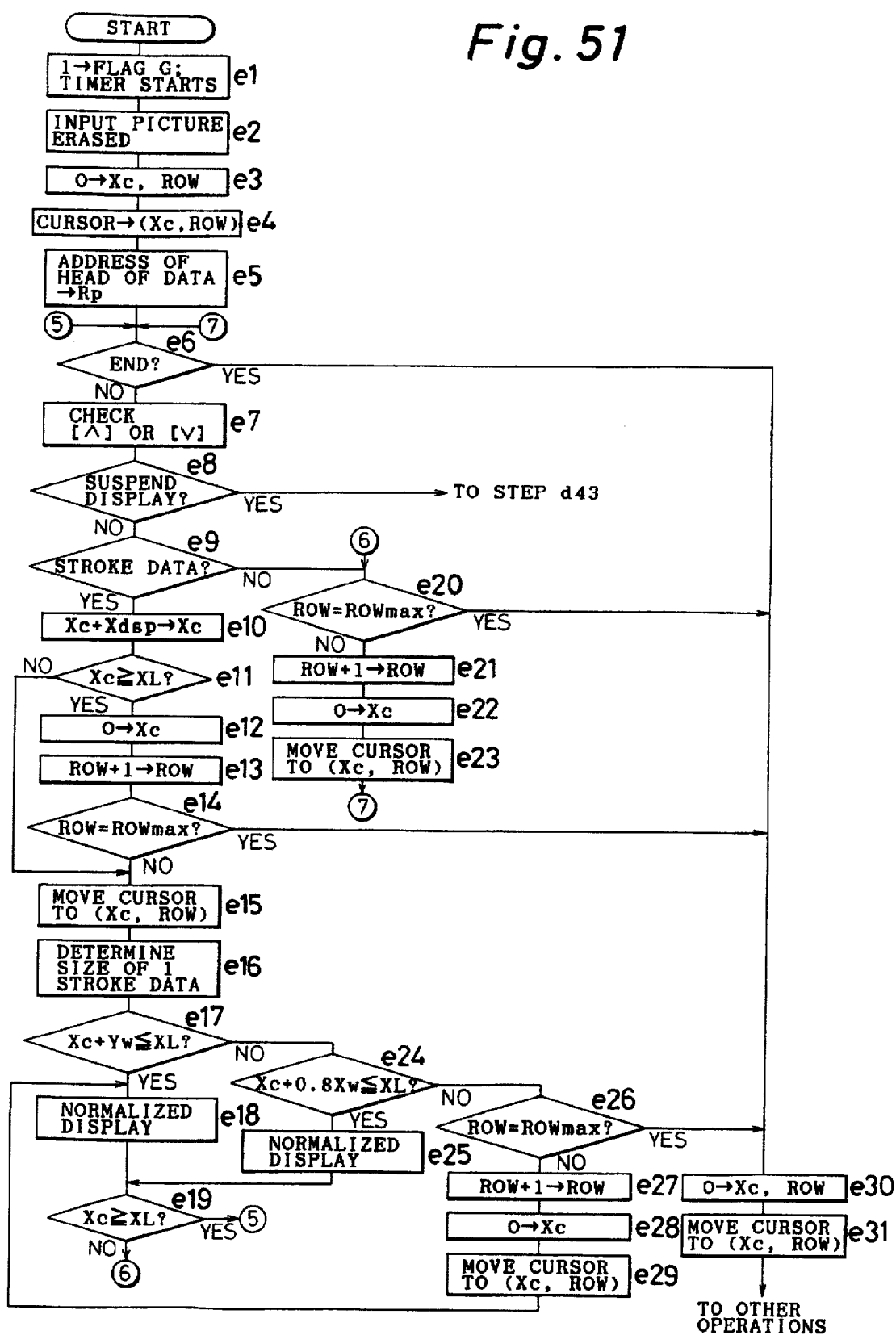
FIG. 51 is a flow chart showing the processing in the case where an independent data stored in the memory is displayed in the character input/display area 20.

FIG. 51 is a flow chart showing the processing in the case where an independent data stored in the memory is displayed in the character input/display area 20. At step e1, the flag G is set for 1, the timer is started and the process moves to step e2. The timer started at step e1 is stopped after the passage of a prescribed time.

At step e2, the display in the input/display area 20 for characters is cleared, and the process moves to step e3. At step e3, the values of the display positions Xc in the X-axis direction and Y coordinate position ROW are set as 0 respectively, and the process moves to step e4. Here, the value of Y coordinate position ROW indicates the line number in the input/display area 20 for characters. At step e4, the cursor 21 is moved to the position set in the previous step e3 i.e. the home position (left top corner in the input/display area 20 for characters), and the process moves to step e5. At step e5, the head address in the storing are inside the memory in which the independent data to be displayed is stored is set in parameter Rp, and the process moves to step e6.

At step e6, judgement is made whether the address in the memory indicated by the parameter Rp is the address in which the last data (end code) of the independent data to be displayed is stored or not, namely whether the independent data to be displayed has all been displayed or not. The process moves to step e30 when it is judged that the independent data to be displayed has been fully displayed, otherwise to step e7.

At step e7, checking is made whether the registration button 17 or 18 has been indicated with the input pen 11 or not and the process moves to step e8. At step e8, the subroutine of FIG. 32 is executed, and judgement is made whether the display of the independent data being displayed at that point in time is interrupted or not. The process moves to step d43 by terminating the operation by the flow chart of FIG. 51 when the display is interrupted, otherwise to step e9.

At step e9, judgement is made whether the data stored in the address in the memory indicated by the parameter Rp is a stroke data i.e. block data or not, and the process moves to step e10 when it is a block data but to step e20 when it is not a block data but a line feed code. At step e10, the value Xdsp of the display position data 51 located at the head of the block data stored in the address indicated by the parameter Rp is taken out from the memory and added to the display position Xc in the X-axis direction, and the process moves to step e11. At step e11, judgement is made whether the display position Xc obtained in the previous step e10 is no less than the maximum coordinate position XL in the X-axis direction or not. The process moves to step e12 when the display position data Xc obtained in the previous step e10 is no less than the maximum coordinate position XL in the X-axis direction, otherwise to step e15.

At step e12, the display position data Xc in the X-axis direction is set at a value of 0, and the process moves to step e13. At step e13, 1 is added to the value of the Y coordinate position ROW, and the process moves to step e14. At step e14, judgement is made whether the Y coordinate position ROW is equal to the maximum Y coordinate position ROWmax in the Y-axis direction or not, the process moves to step e30 when the Y coordinate position ROW is equal to the maximum Y coordinate position ROWmax in the Y-axis direction but to step e15 in the opposite case. At step e15, the position of the cursor 21 is moved to the display position data Xc in the X-axis direction and the Y coordinate position ROW, and the CPU moves to step e16. At step e16, the subroutine of FIG. 19 is executed and the length Xw in the X-axis direction of the block data stored at that point in time in the address indicated by the parameter Rp is determined, and the process moves to step e17. At step e17, the length Xw in the X-axis direction of the block data is added to the display position data Xc in the X-axis direction, and judgement is made whether the value of the sum Xc+Xw is no larger than the maximum X coordinate position XL in the X-axis direction or not i.e. whether that block data can be displayed in the line indicated at that point in time by the Y coordinate position of the cursor 21 or not. The process moves to step e18 when it is judged that the data can be displayed but to step e24 when it judged otherwise.

At step e18, the subroutine of FIG. 21 is executed and the block data is submitted to normalization and displayed in the position indicated by the display position data Xc in the X-axis direction and the Y coordinate position ROW in the input/display area 20 for characters, and the process moves to step e19.

When, in the previous step e17, it is judged that the block data cannot be displayed in the line indicated at that point in time by the Y coordinate position ROW, the process moves to step e24, and judgement is made whether or not the block data can be displayed in the line indicated at that point in time by the Y coordinate position ROW when the length Xw in the X-axis direction of that block data is multiplied by 0.8. When it is judged that the block data can be displayed, the size Xw in the X-axis direction of the block data is multiplied by 0.8 and the process moves to step e25. When it is judged that the display is impossible, the process moves to step e26. At step e25, in the same way as the previous step e18, the block data the length Xw in the X-axis direction of which has been multiplied by 0.8 in the previous step e24 is normalized and displayed in the input/display area 20 for characters, and the process moves to step e19.

At step e19, judgement is made whether the display position Xc in the X-axis direction is no smaller than the maximum coordinate position XL in the X-axis direction or not, and the process moves to step e20 when the display position data Xc is not larger than the maximum coordinate position XL in the X-axis direction. In the case where the display position Xc is larger than the maximum coordinate position XL in the X-axis direction, the address of the next data is set for the parameter Rp and the process moves to step e6.

At step e20, judgement is made whether the Y coordinate position ROW and the maximum Y coordinate position ROWmax in the Y-axis direction are equal or not, and the CPU moves to step e30 when it is judged that they are equal but to step e21 when it is judged otherwise. At step e21, the value "1" is added to the Y coordinate position ROW and the process moves to step e22. At step e22, the value of the display position data Xc in the X-axis direction is set for "0" and the CPU moves to step e23. At step e23, the position of the cursor 21 is moved to the position indicated with the display position data Xc in the X-axis direction and the position indicated by the Y coordinate position ROW, the address of the next data is set for the parameter Rp and the CPU moves to step e6.

When, in the previous step e24, it is judged that the block data cannot be displayed in the line indicated by the Y coordinate position ROW even when the value of the length Xw in the X-axis direction of that block data is multiplied by 0.8, the process moves to step e26, and judgement is made whether the Y coordinate position ROW and the maximum Y coordinate position ROWmax in the Y-axis direction are equal or not, and the CPU moves to step e30 when it is judged that they are equal but to step e27 when it is judged otherwise. At step e27, the value "1" is added to the Y coordinate position ROW and the process moves to step e28. At step e28, the value of the display position data Xc in the X-axis direction is set for "0" and the CPU moves to step e29. At step e29, the position of the cursor 21 is moved to the position indicated with the display position data Xc in the X-axis direction and the position indicated by the Y coordinate position ROW, and the CPU moves to step e18.

At step e30, the value of the display position data Xc in the X-axis direction and the value of the Y coordinate position ROW will be set to be 0, respectively, and the process moves to step e31. At step e31, the position of the cursor 21 is moved to the position indicated with the display position data Xc in the X-axis direction and the position indicated by the Y coordinate position ROW i.e. the home position and the operation indicated by FIG. 51 is terminated, and the CPU proceeds to other operations.

Figure 54:
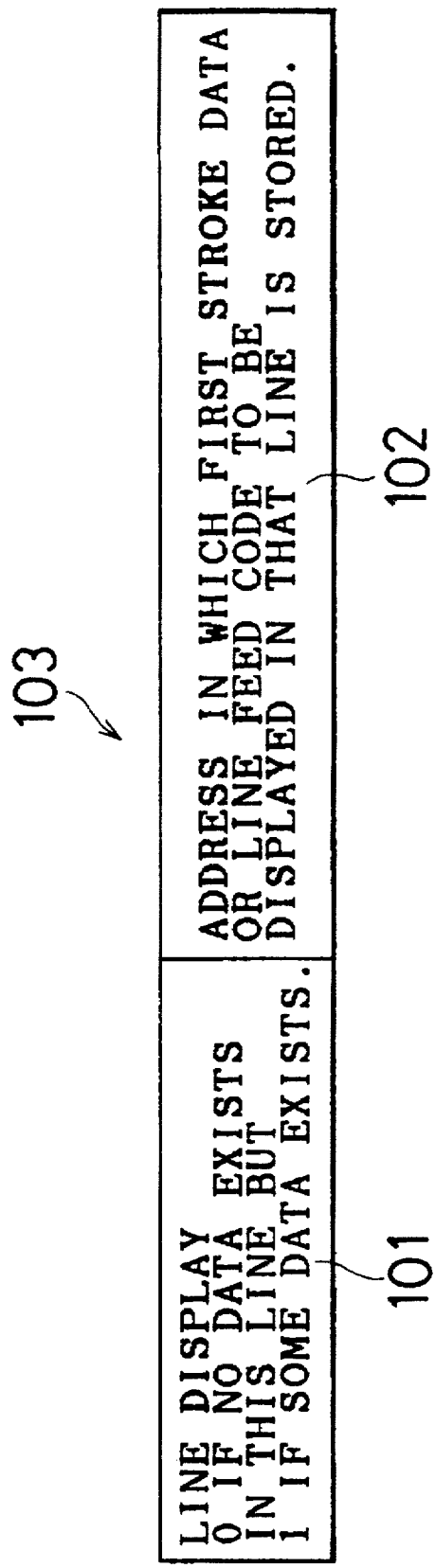
FIG. 54 is a drawing showing the data construction of line information 103 stored in the memory 7 for display.

FIG. 52 is a drawing showing the data construction of the display information 111 of the independent data stored in the memory area inside the memory 7 for display. FIG. 53 is a drawing showing the state in which the independent data is displayed in the character input/display area 20. FIG. 54 is a drawing showing the data construction of the line information 103 stored in the memory 7 for display.

As shown in FIG. 52, independent data is stored individually line by line as display information 111 in the memory area inside the memory 7 for display, sequentially from the head to display information 111a for 1st line, display information 111b for 2nd line, display information 111c for 3rd line, etc. up to display information 111z for last line, and the end code 112 is stored in the last place. As shown in FIG. 53, in the input/display area 20 for characters, information for 6 lines, for example, of the display information of FIG. 52 is displayed while the display information from display information 111c for 3rd line to 8th line of FIG. 52 is displayed in the line 23a of the 1st line to the line 23f of the 6th line.

As shown in FIG. 54, in the memory area inside the memory 7 for display, line information 103 is also stored and this line information 103 is constructed by including data presence information 101 and head address information 102. The line information 103 corresponds to the display information of FIG. 52 and the line information 103 is stored by being put in correspondence individually to the display information 111a for 1st line up to the display information 111z for last line of FIG. 52.

The data presence information 101 indicates the presence or not of any block data or line feed code in the line concerned, and the value 1 is registered when there exists some block data or line feed code while 0 is registered when neither block data nor line feed code exists. As head address information 102, the address of either the block data at the head to be displayed in the line concerned or a line feed code, which is stored in the display memory 7, is registered. In the case where the line concerned is totally blank when 0 is registered as data presence information 101, the address of the block data to be displayed at the head of the next line, which is stored in the display memory 7 is registered.

Figure 55:
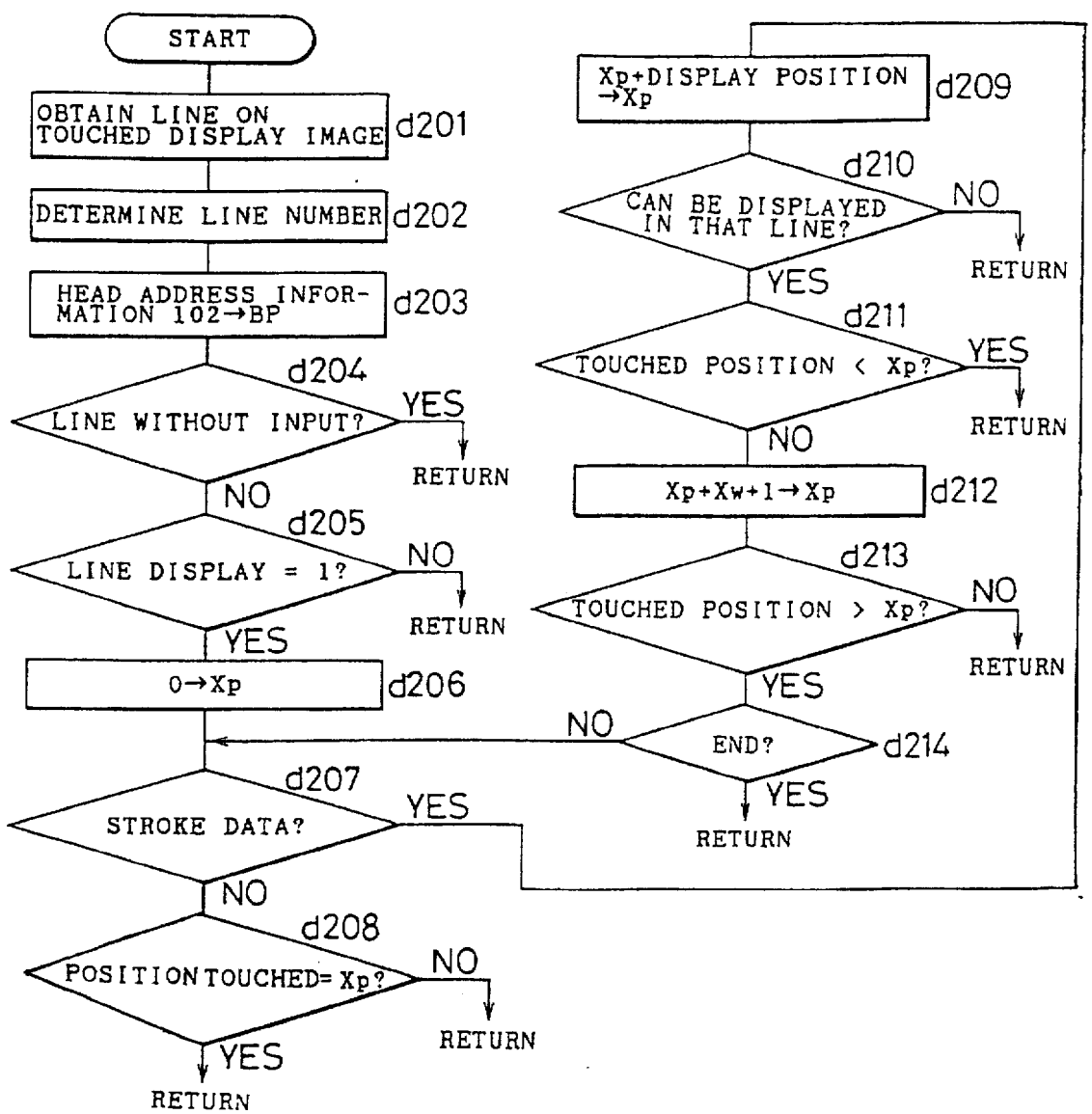
FIG. 55 is a flow chart showing the processing executed between step d105 and step d106 in FIG. 41.

FIG. 55 is a flow chart showing the processing executed between step d105 and step d106 in FIG. 41, and indicates the operation for detecting the position indicated by the input pen 11 in the input/display area 20 for characters. When some position in the input/display area 20 for characters is indicated by the input pen 11, the process moves to step d201 of FIG. 55 through steps d104 and d105 of FIG. 41, and the line on the picture indicated by the input pen 11 i.e. the line in the input/display area 20 for characters is detected at step d201. At step d202, the line number of that indicated line is determined. At step d203, the value of the address indicated by the head address information 102 of FIG. 54 is set in parameter BP.

At step d204, judgement is made whether the position indicated by the input pen 11 is a line without input or not i.e. whether it is a line where neither block data nor line feed code is inputted yet or not. The process moves to step d205 when the position is judged as not a line without input but the operation of FIG. 55 is terminated and the process moves to step d106 of FIG. 41 when it is judged as a line without input. At step d205, judgement is made whether the value "1" is registered as the data presence information 101 of the line indicated with the input pen 11 or not. In the case not "1" but "0" is registered, a blank part is displayed in the line indicated with the input pen 11, and the operation of FIG. 55 is terminated and the process moves to step d106 of FIG. 41.

When, in the previous step d205, "1" is registered as the data presence information 101 of the line indicated with the input pen 11 and either a block data or a line feed code is displayed in that line, the process moves to step d206, the value of the pointer Xp is set to be "0" in order to detect the position indicated by the input pen 11 and the process moves to step d207. Here, the pointer Xp is a variable for indicating the position in the X-axis direction in each line in the input/display area 20 for characters.

At step d207, the data stored in the address indicated by the value of the parameter BP set in the previous step d203 is taken out and judgement is made whether that data is stroke data i.e. block data or not. The process moves to step d209 when it is judged as block data but to step d208 when it is judged otherwise. After the data stored in the address indicated by the parameter BP is read out from the memory at step d207, the value of the parameter BP is renewed to the value of the address in which the stroke data subsequent to the stroke data taken out is stored.

At step d208, the position indicated with the input pen 11 and the value of the pointer Xp are compared with each other and judgement is made whether the position indicated with the input pen 11 agrees with the position indicated by the pointer Xp or not, because the data taken out in the previous step d207 is a line feed code. The process registers the address in which the line feed code indicated with the input pen 11 in the memory and move to step d106 of FIG. 41 when they agree. In the case where the position indicated with the input pen 11 does not agree with the position indicated by the pointer Xp, the address in memory of the line feed code taken out from the memory is stored in the memory and information indicating that the position indicated with the input pen 11 and the position indicated by the pointer Xp do not agree with each other is also stored in the memory, and the process moves to step d106 of FIG. 41.

At step d209, the value of the display position data of the block data taken out from the memory is added to the value of the pointer Xp, the process moves to step d210, and judgement is made, based on the position of the pointer Xp added in the previous step d209, whether the block data taken out from the memory can be displayed in the line indicated with the input pen 11, in the normalization size or the size of 0.8 times the normalization size in the X-axis direction. The process moves to step d211 when it is judged that the data can be displayed but the operation of FIG. 55 is terminated and the process passes to step d106 of FIG. 41 when it is judged otherwise.

At step d211, the position indicated with the input pen 11 and the position indicated by the pointer Xp are compared with each other and judgement is made as to whether or not the position indicated with the input pen 11 is smaller than the position indicated by the pointer Xp, i.e., whether the former is found on the left side or not. When it is judged that the former is smaller than the latter, the address in which the block data taken out from the memory at that point in time is registered in the memory and it is also registered in the memory that the position indicated with the input pen 11 is a blank part included in the block data. Moreover, the operation of FIG. 55 is terminated and the process moves to step d106 of FIG. 41. In the case where the position indicated with the input pen 11 is judged to be larger than the position indicated by the pointer Xp, the process moves to step d212.

At step d212, a value of 1 and the length Xw in the X-axis direction of the block data taken out from the memory are added to the value of the pointer Xp and the process moves to step d213. The position indicated with the input pen 11 and the position indicated by the pointer Xp are compared with each other and judgement is made as to whether the position indicated with the input pen 11 is larger than the position indicated by the pointer Xp or not i.e. whether the former is found on the right side or not. When it is judged that the former is larger than the latter i.e. found on the right side, the process moves to step d214. In the case where the position indicated with the input is judged to be smaller than the position indicated by the pointer Xp i.e. found on the left side, the address in which the block data taken out from the memory at that point in time is registered in the memory, the operation of FIG. 55 is terminated and the process moves to step d106.

At step d214, judgement is made whether some other data exists after the block data taken out from the memory at that point in time i.e. whether the operation of FIG. 55 should be terminated or not. When it is judged that there exists some data after the block data taken out and that the operation of FIG. 55 should not be terminated, the process moves to step d207. When it is judged that no data exists after the block data taken out and that the operation of FIG. 55 should be terminated, it is stored in that memory that the area without input in the input/display area 20 for characters has been indicated with the input pen 11, the operation of FIG. 55 is terminated, the process moves to step d106 of FIG. 41.

As explained above, according to the operation of FIG. 55, with repeated execution of the steps d207, d209, d210, d211, d212, d213 and d214, which block data or line feed code is indicated with the input pen 11 can be detected in the line indicated with the input pen 11.

As we have seen above, according to the input/display apparatus 1 for handwritten characters of the present invention, stroke data consisting of coordinate points extracted on the basis of predetermined references from among a plurality of coordinate points outputted from the touch panel 8 which is the input device at the time of input in handwriting is prepared. This stroke data is displayed on the orthogonal coordinates of prescribed size set after the cursor position displayed on the display surface of the display panel 6 which is the display. A plurality of stroke data are stored as an independent data.

Therefore, it is possible to display in the prescribed size the characters displayed with the stroke data prepared, and this makes the characters inputted in handwriting easy to read and facilitates editing. By changing the size of the orthogonal coordinates set after the cursor position, the size of characters to be displayed with the stroke data can be selected. Because the stroke data is prepared, not in units of a single character, but after the end of the input in handwriting, a plurality of characters can be inputted continuously. The data volume can be reduced since the stroke data is composed of coordinate points extracted on the basis of predetermined references from among a plurality of coordinate points outputted from the touch panel 8. This makes it possible to store a lot of characters inputted in handwriting with a limited storing capacity. Moreover, the manufacturing cost can be reduced because there is no need of any storing device of a large storing capacity.

Moreover, according to the input/display apparatus 1 for handwritten characters of the present invention, it is possible to select the number of coordinate points to be extracted and control the data volume by changing the set value of the approximate angle φ at the time of preparation of the stroke data.

Moreover, according to the input/display apparatus 1 for handwritten characters of the present invention, it is judged that the input in handwriting is over and stroke data is prepared when the coordinate points from the touch panel 8 are not detected for a predetermined time. Therefore, the stroke data can be prepared even without instruction by the operator. By changing the set value of the time for judging the end of input in handwriting i.e. the blank time for input, it becomes possible to set the optimal operating conditions for the operator.

Moreover, it is judged that the input in handwriting is over when the coordinate points included in the predetermined area on the input surface of the touch panel 8 are detected. Therefore, it is possible to prepare stroke data based on the operator's instruction.

Moreover, it is judged that the input in handwriting is over when the coordinate points of the touch panel 8 is larger than the predetermined length. Therefore, it is possible to turn characters inputted in handwriting into stroke data without spoiling their visibility on display.

Moreover, according to the input/display apparatus 1 for handwritten characters of the present invention, a plurality of lines 23 of a predetermined width are set on the display face, and the cursor 21 is displayed along those lines 23. In the case where the stroke data cannot be fully displayed in the area after the cursor position of the line 23 on which the cursor 21 is displayed, that stroke data is displayed in the next line. Moreover, when the stroke data cannot be fully displayed in the area after the cursor position of the line 23 on which the cursor 21 is displayed, that stroke data is displayed by being contracted in length in the direction of the line. Therefore, the stroke data is displayed in a way to be kept within one line. This makes the handwritten characters inputted in handwriting easy to read and facilitates editing.

Moreover, according to the input/display apparatus 1 for handwritten characters of the present invention, a ruled line 22 is displayed between a plurality of lines of a predetermined width which are set on the display surface. Therefore, the operator can easily know the size of the characters displayed after being submitted to normalization. It also becomes possible to input characters in handwriting without distortion by using the ruled line as a reference line, and this facilitates preparation of stroke data and improves the visibility of the prepared stroke data on display.

Moreover, according to the input/display apparatus 1 for handwritten characters of the present invention, it is possible to display stroke data by moving it to a desired position. It is also possible to erase stroke data and displays that data by contracting the interval of the stroke data before and after the erased stroke data. It is further possible to erase stroke data and leave in blank the area where the stroke data was displayed before.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An input/display apparatus for handwritten characters, including a display provided with a display surface in which orthogonal coordinates are defined and an input device having a light transmitting input surface in which orthogonal coordinates are defined, which outputs coordinate points indicated by a special indicating device, on the input surface disposed so as to overlap with the display surface, coordinate points being displayed on the display surface of the display, corresponding to a plurality of coordinate points indicated at a time of handwriting input by the special indicating device, the input/display apparatus for handwritten characters comprising:

cursor display means for displaying a cursor indicating a position for input/display on the display surface of the display;

stroke data preparing means for preparing stroke data, including coordinate points extracted after an end of handwriting input from among a plurality of coordinate points outputted from the input device at the time of handwriting input on the basis of a predetermined reference; and normalization display means for displaying the prepared stroke data at orthogonal coordinates having predetermined dimensions which are defined in an area after the displayed position of the cursor.

2. The input/display apparatus of claim 1, wherein the apparatus further comprises storing means for storing a plurality of stroke data as a set of independent data.

3. The input/display apparatus of claim 1, wherein the stroke data preparing means designates a plurality of coordinate points outputted from the input device as P0 through PN, respectively, in the order of output, the coordinate point P0 being extracted as a starting point, determines angles θ2 to θN contained by a line segment connecting the coordinate point P0 and the coordinate point P1 and a line segment connecting the coordinate point P0 and each of the coordinate points P2–PN, extracts the coordinate point Pi when the angles θ2–θi (i>2) are equal to or less than a predetermined angle φ and the angle θ (i+1) is more than the predetermined angle φ, and repeats the same extraction of coordinate points with the extracted coordinate point Pi as a starting point.

4. The input/display apparatus of claim 3, wherein the stroke data preparing means changes the set value of the predetermined angle φ.

5. The input/display apparatus of claim 1, wherein a plurality of lines having a predetermined width are set on the display surface of the display, the cursor display means displays a cursor along the plurality of lines, and the normalization display means displays the stroke data in a next line after a line on which the cursor is displayed when the stroke data cannot be fully displayed in the area after the cursor position of the line on which the cursor is displayed.

6. The input/display apparatus of claim 1, wherein a plurality of lines having a predetermined width are set on the display surface of the display, the cursor display means displays the cursor along the plurality of lines, and the normalization display means displays the stroke data by contracting the length of the stroke data in the direction of the line when the stroke data cannot be fully displayed in the area after the cursor position of the line on which the cursor is displayed.

7. The input/display apparatus of claim 1, wherein a plurality of lines having a predetermined width are set on the display surface of the display and a ruled line is displayed between pairs of respective lines.

8. The input/display apparatus of claim 1, wherein the stroke data preparing means judges that the handwriting input is over when coordinate points from the input device are not detected for a predetermined time.

9. The input/display apparatus of claim 1, wherein the stroke data preparing means judges that the handwriting input is over when coordinate points, included in the predetermined area of the input surface of the input device, are detected.

10. The input/display apparatus of claim 1, wherein the stroke data preparing means judges that the handwriting input is over when two coordinate points continuously outputted from the input device have a length equal to or greater than a predetermined length.

11. The input/display apparatus of claim 1, wherein the normalization display means changes the dimensions of the orthogonal coordinates set after the position of the cursor displayed on the display surface of the display.

12. The input/display apparatus of claim 1, wherein the normalization display means displays stroke data by moving the stroke data to a position on the display surface corresponding to a coordinate point on the input surface indicated by the special indicating device.

13. The input/display apparatus of claim 1, wherein the normalization display means erases the displayed stroke data, including the coordinate point on the display surface corresponding to the coordinate point on the input surface indicated by the special indicating device, and displays the stroke data before and after the erased data by contracting intervals of the stroke data before and after the erased stroke data.

14. The input/display apparatus of claim 1, wherein the normalization display means erases the displayed stroke data, including the coordinate point on the display surface corresponding to the coordinate point on the input surface indicated by the special indicating device, and leaves the area where the stroke data was displayed before blank.

* * * * *